United States Patent
Moser et al.

(10) Patent No.: US 6,275,789 B1
(45) Date of Patent: Aug. 14, 2001

(54) METHOD AND APPARATUS FOR PERFORMING FULL BIDIRECTIONAL TRANSLATION BETWEEN A SOURCE LANGUAGE AND A LINKED ALTERNATIVE LANGUAGE

(76) Inventors: Leo Moser, 880 Dearborn Pl., Gilroy, CA (US) 95020; Robert Moser, 10631 Dabney Dr., Amber Trail Apt., #54, San Diego, CA (US) 92126

( * ) Notice: Subject to any disclaimer, the term of this patent is extended or adjusted under 35 U.S.C. 154(b) by 0 days.

(21) Appl. No.: 09/215,425

(22) Filed: Dec. 18, 1998

(51) Int. Cl.[7] .................................................. G06F 17/28
(52) U.S. Cl. ........................................ 704/7; 704/2
(58) Field of Search .................... 704/1–8, 277; 707/530, 536

(56) References Cited

U.S. PATENT DOCUMENTS

| | | | |
|---|---|---|---|
| 4,635,199 | 1/1987 | Muraki | 704/2 |
| 4,667,290 | 5/1987 | Goss et al. | 717/7 |
| 4,760,528 | 7/1988 | Levin | 704/2 |
| 4,864,503 | 9/1989 | Tolin | 704/3 |
| 5,418,717 | 5/1995 | Su et al. | 704/9 |
| 5,426,583 | 6/1995 | Uribe-Echebarria Diaz De Mendibil | 704/2 |
| 5,490,061 | 2/1996 | Tolin et al. | 704/3 |
| 5,523,946 | 6/1996 | Kaplan et al. | 704/7 |
| 5,587,903 | 12/1996 | Yale | 704/9 |
| 5,696,980 | 12/1997 | Brew | 704/273 |
| 5,724,593 | 3/1998 | Hargrave, III et al. | 704/7 |
| 5,768,603 | 6/1998 | Brown et al. | 704/9 |
| 5,787,386 | * 7/1998 | Kaplan et al. | 704/8 |
| 6,092,035 | * 7/2000 | Kurachi et al. | 704/2 |

* cited by examiner

*Primary Examiner*—Patrick N. Edouard
(74) *Attorney, Agent, or Firm*—LaRiviere, Grubman & Payne, LLP

(57) ABSTRACT

System with apparatus to improve international and other communication, and to provide easier access to data, especially digitized data, by means of linked alternative languages generated from a source language. As taught by the present invention, a linked alternative language is an especially designed language form quite different in outward format from its source language in that it has been optimized in a plurality of ways to allow targeted populations to comprehend and use it more efficiently than the source language, but which has also been carefully designed to retain full bidirectional machine translation equivalence to the source language. All use of artificial intelligence and computational linguistics for machine translation as taught in the present invention is constrained by these considerations.

21 Claims, 62 Drawing Sheets

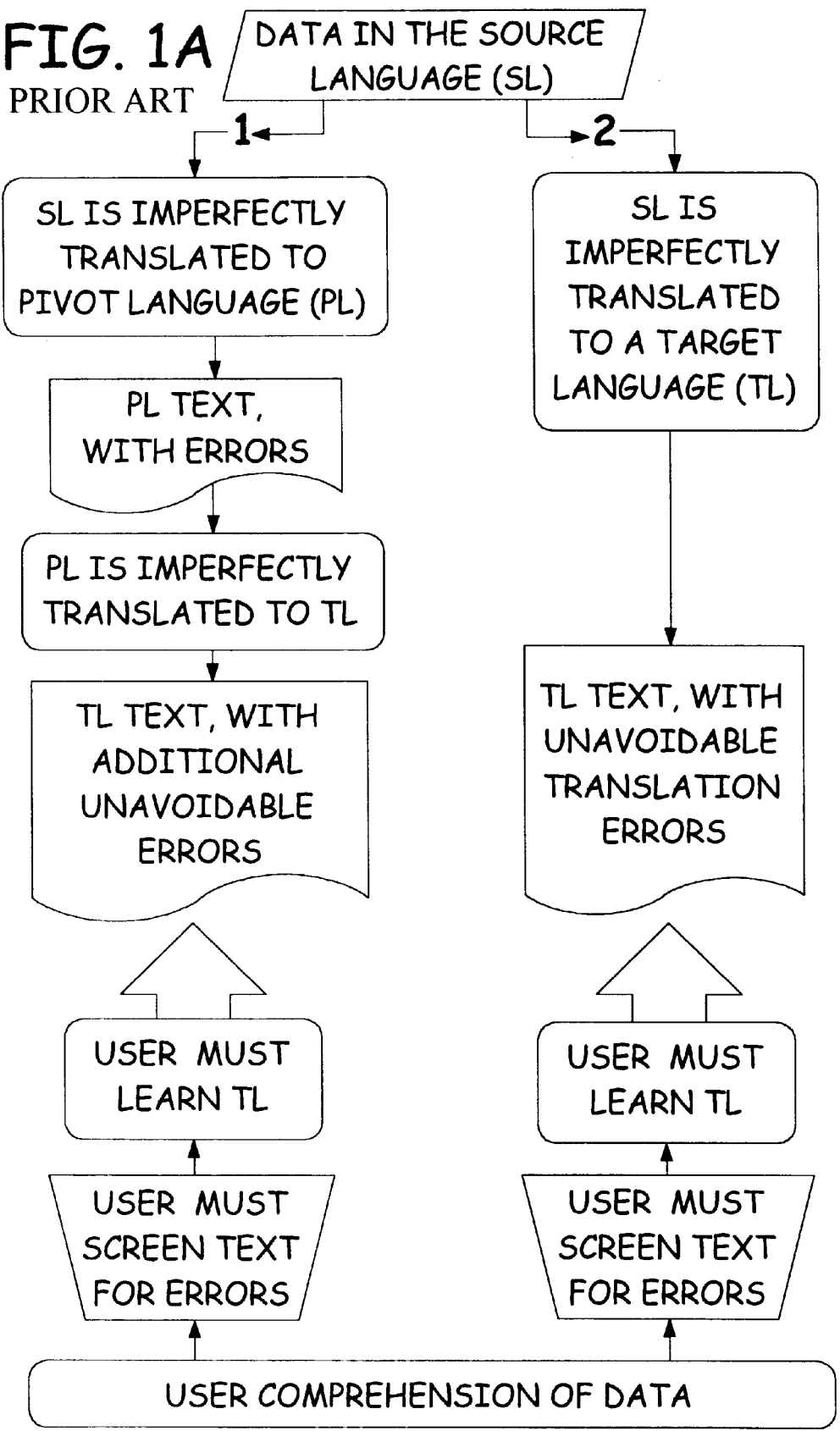

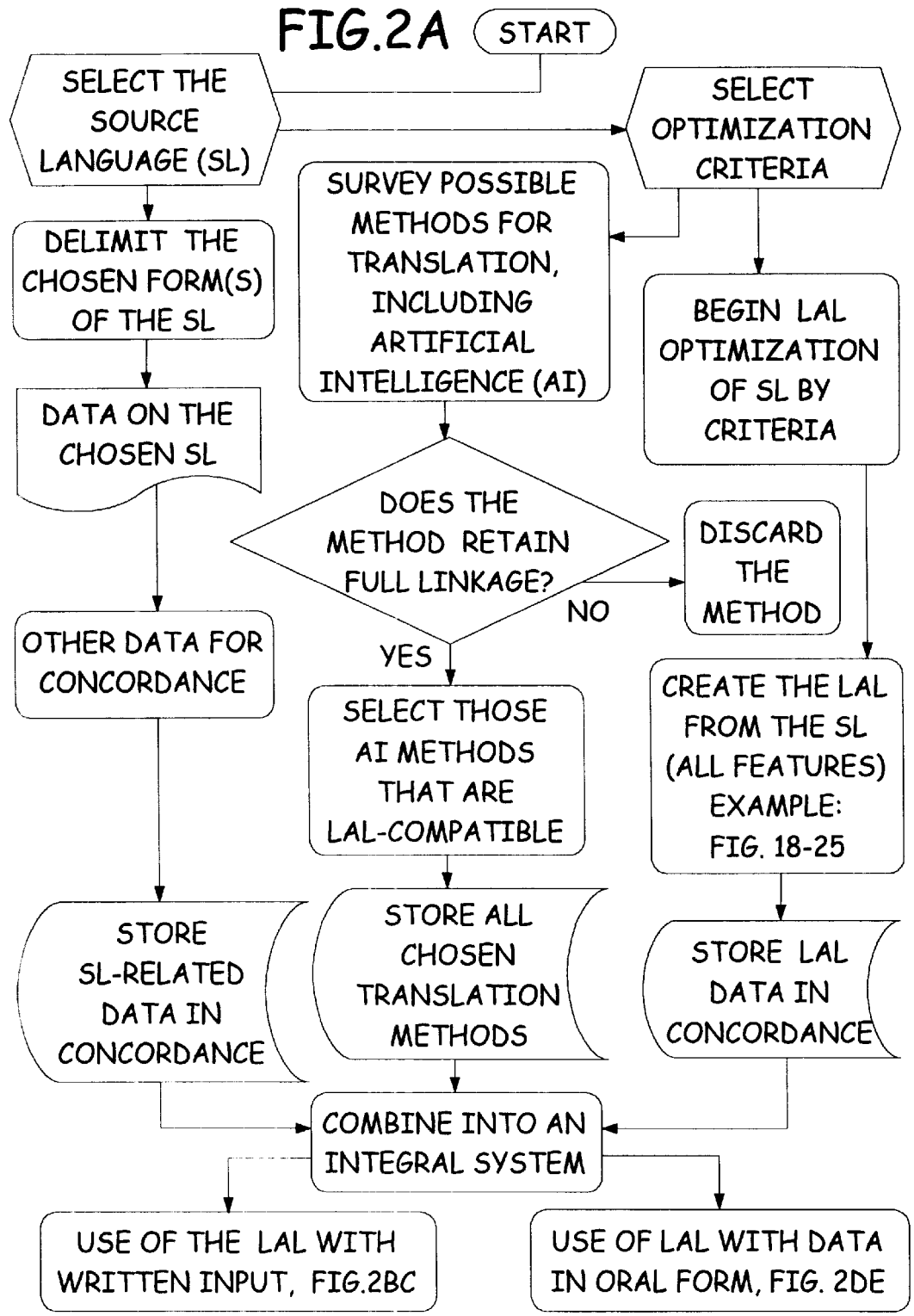

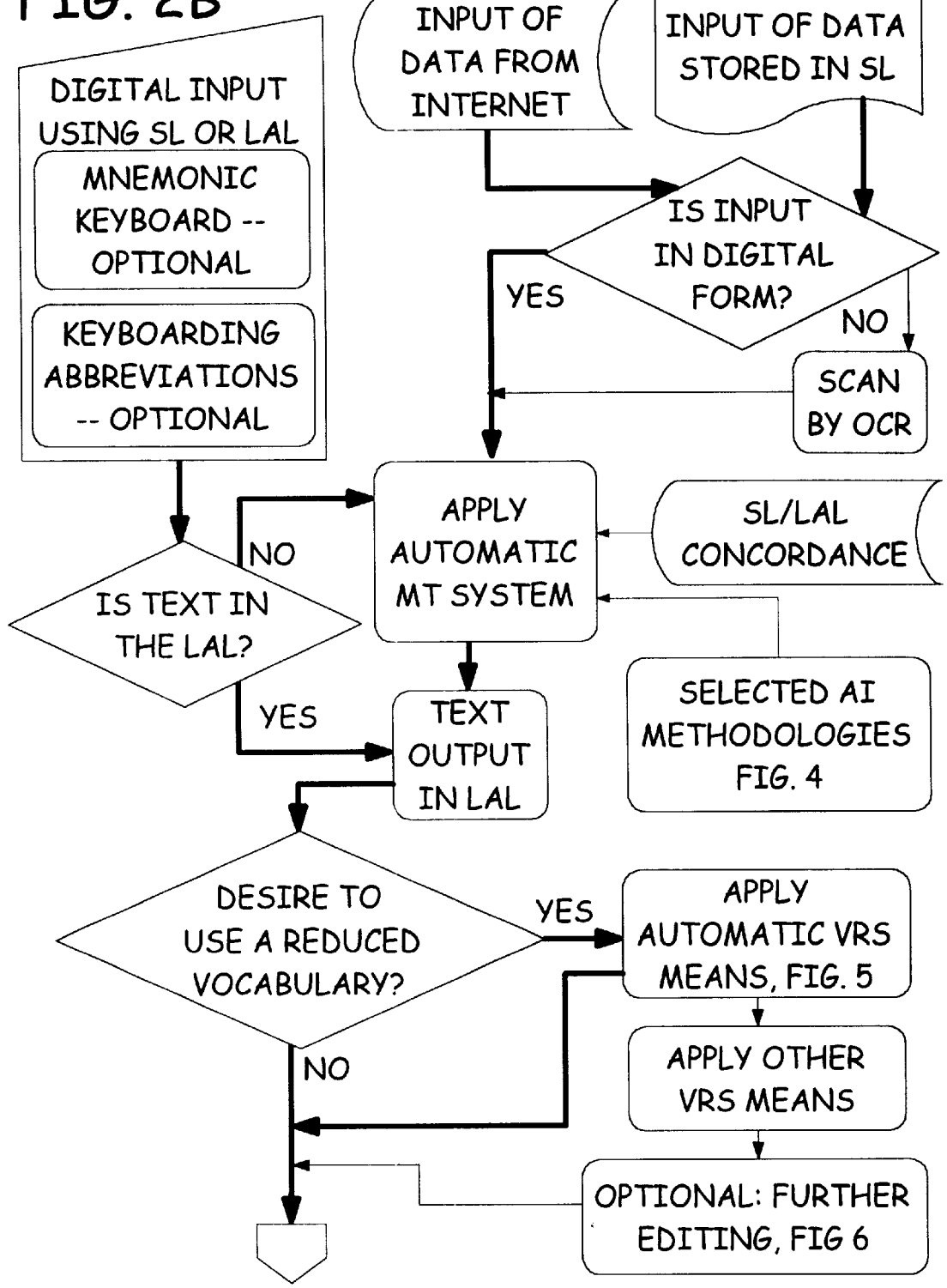

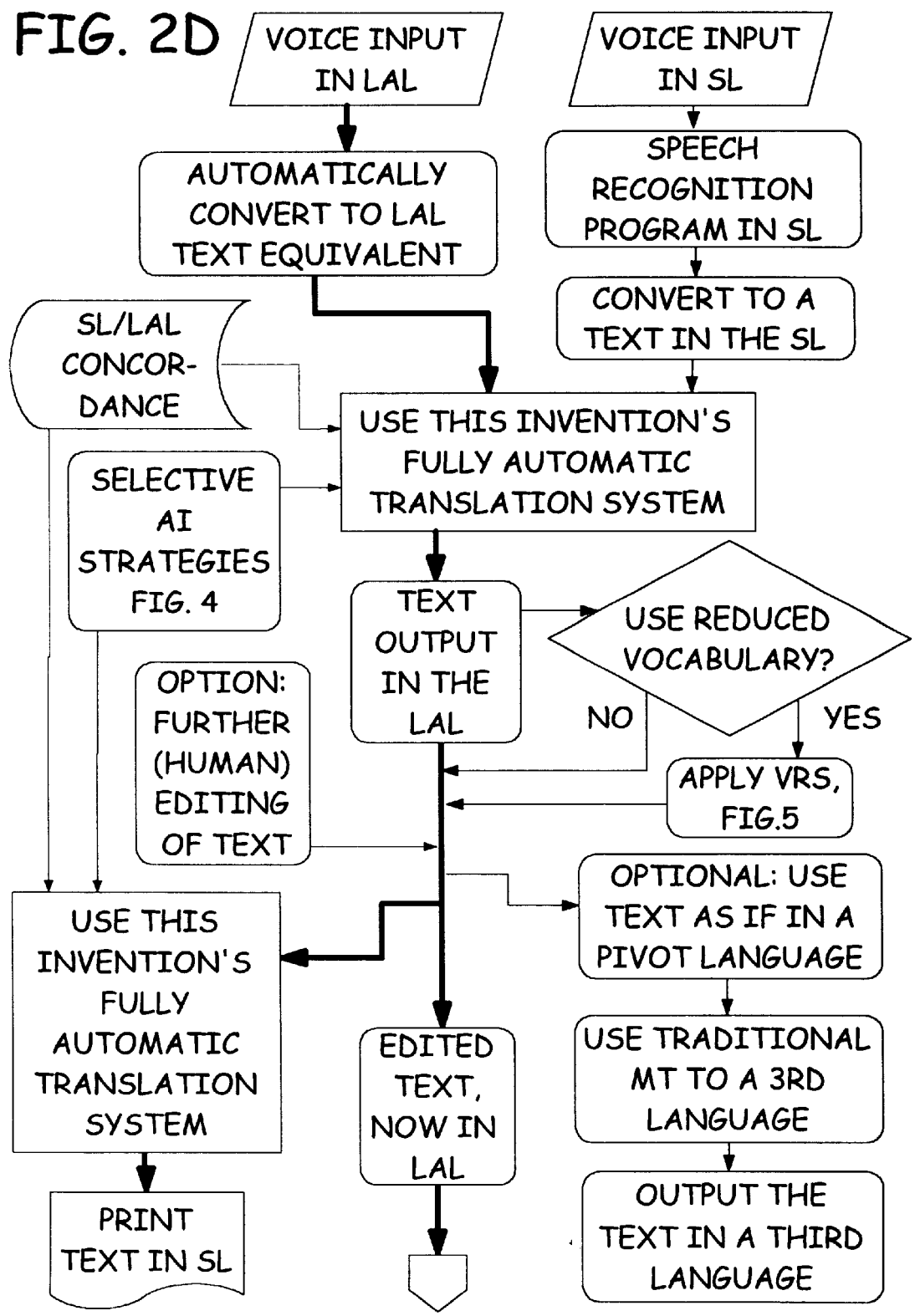

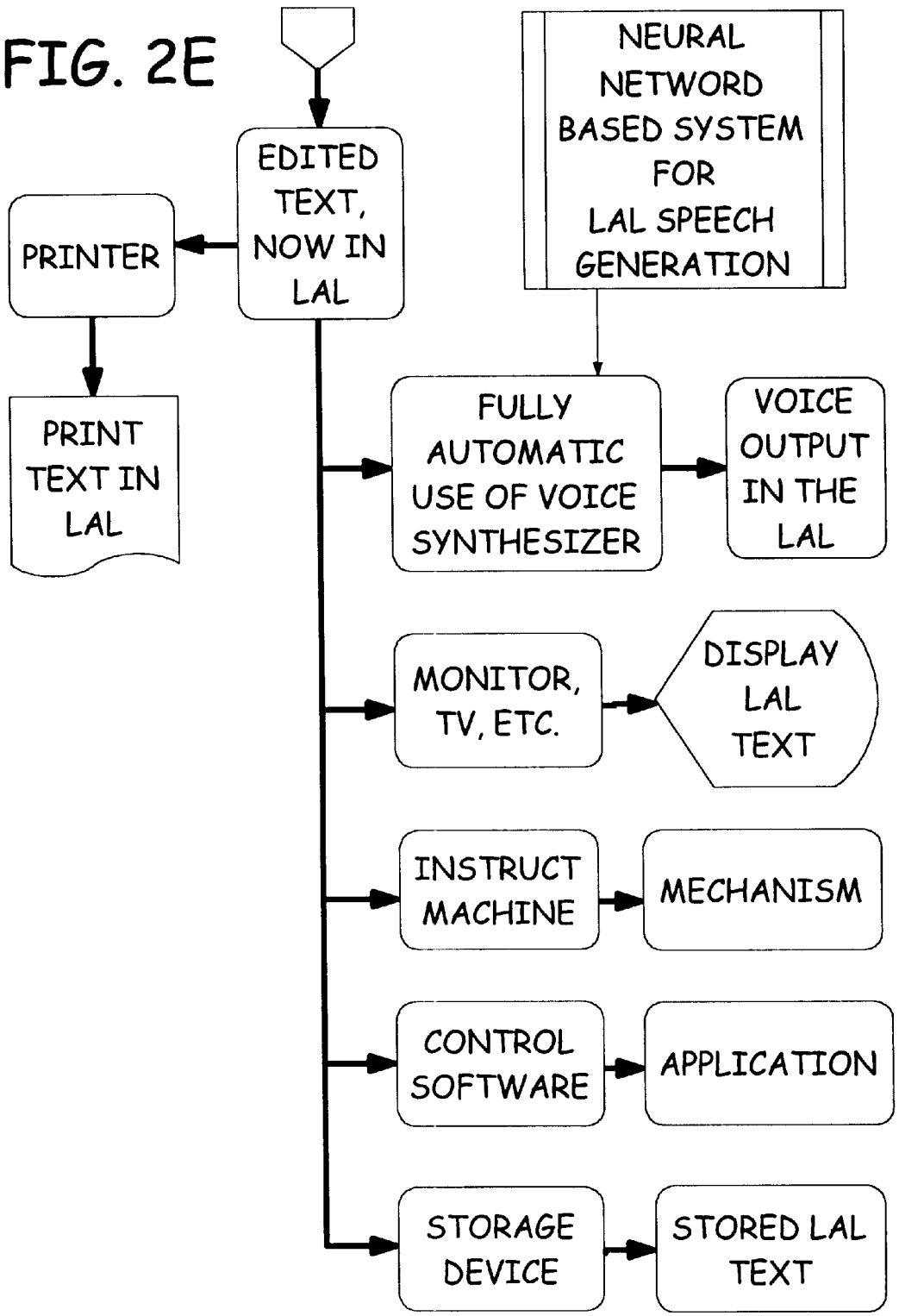

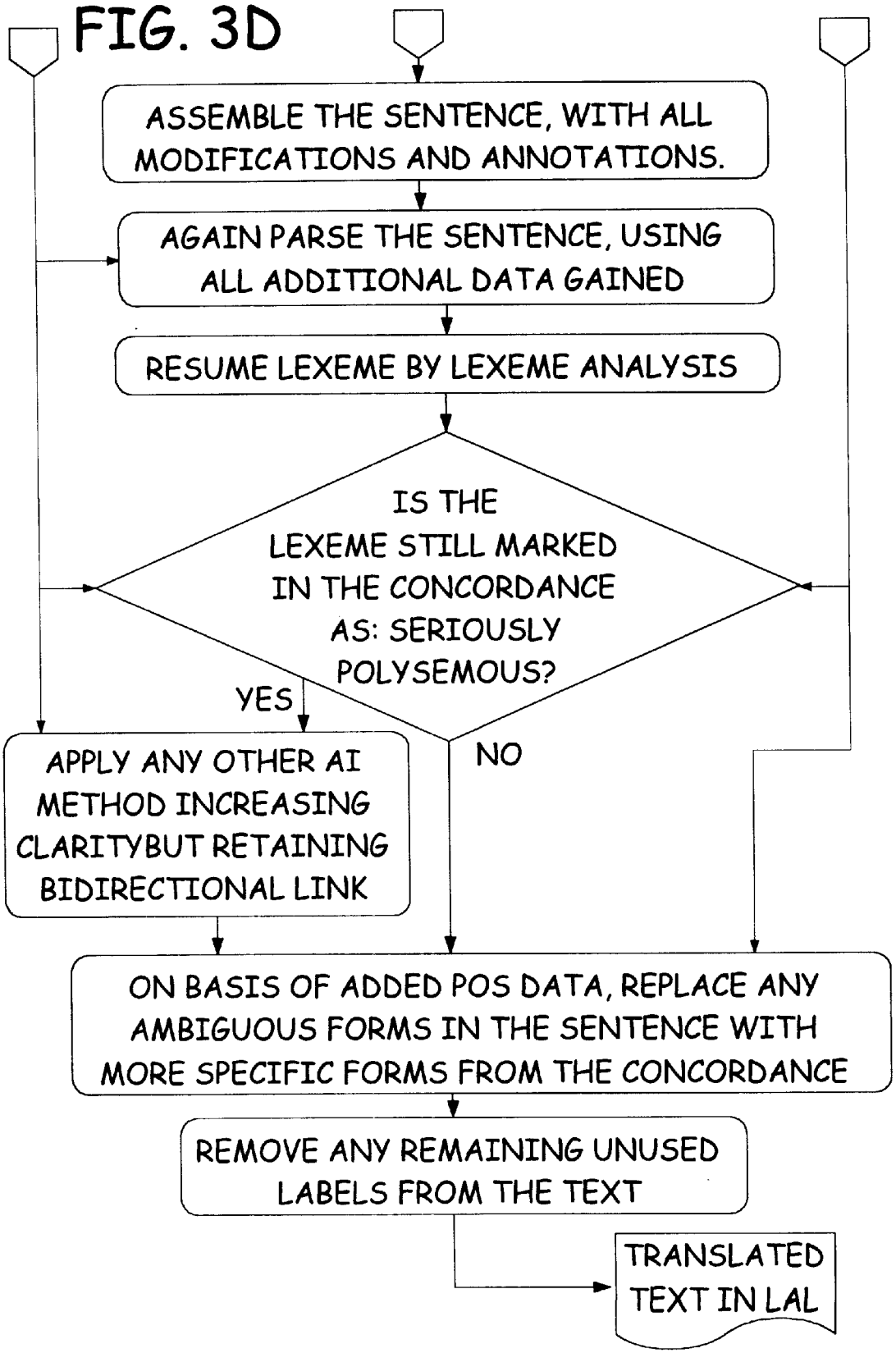

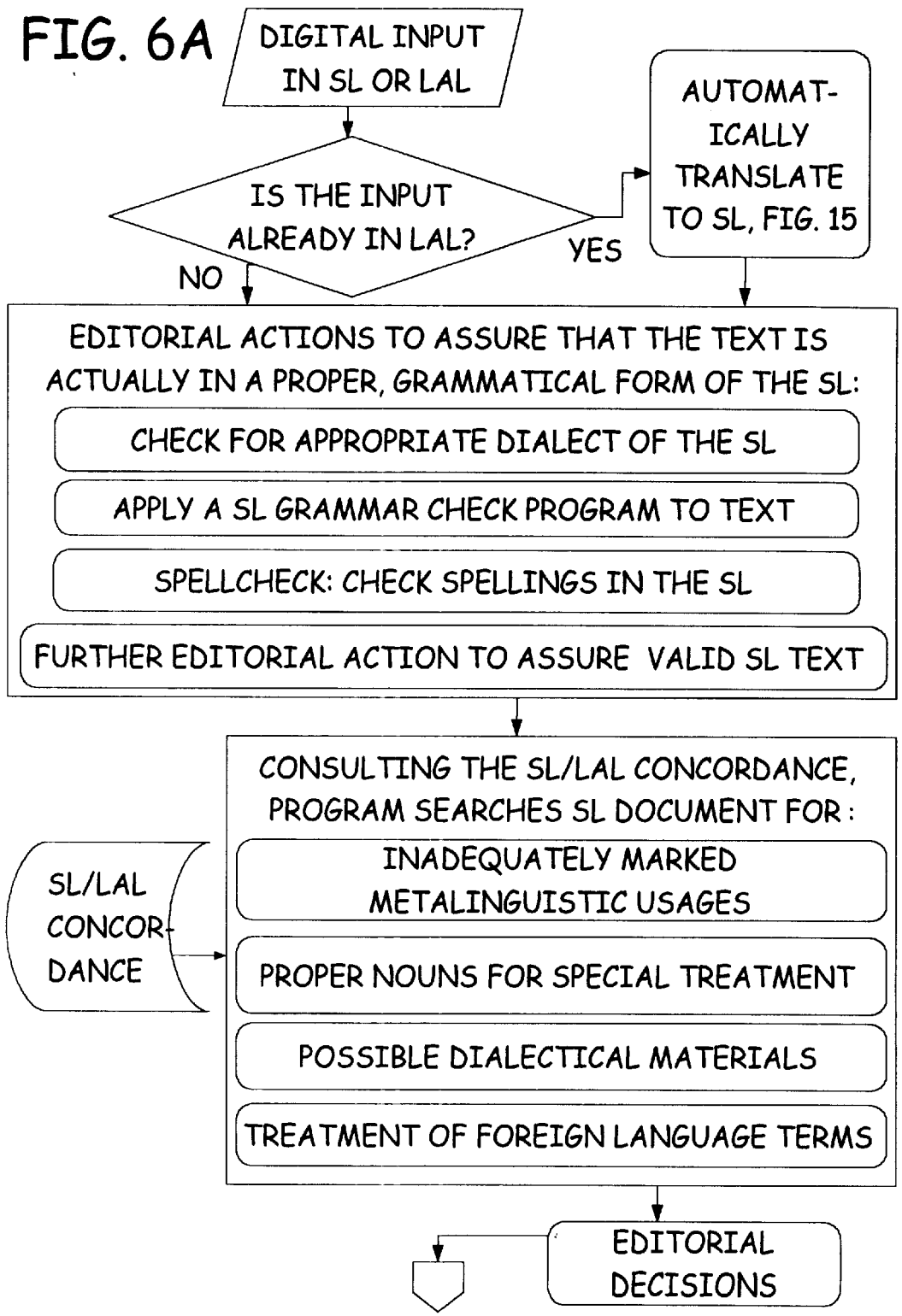

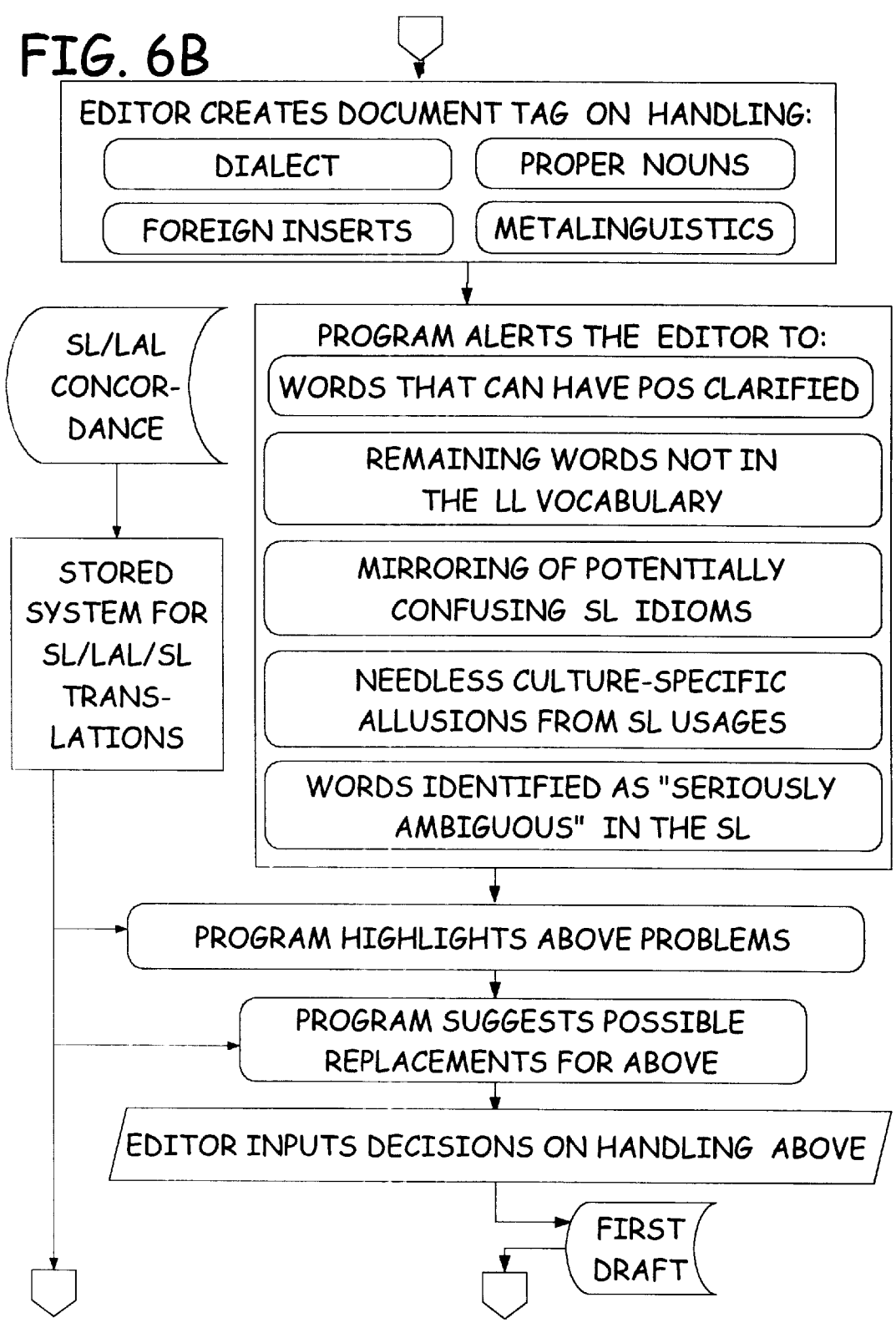

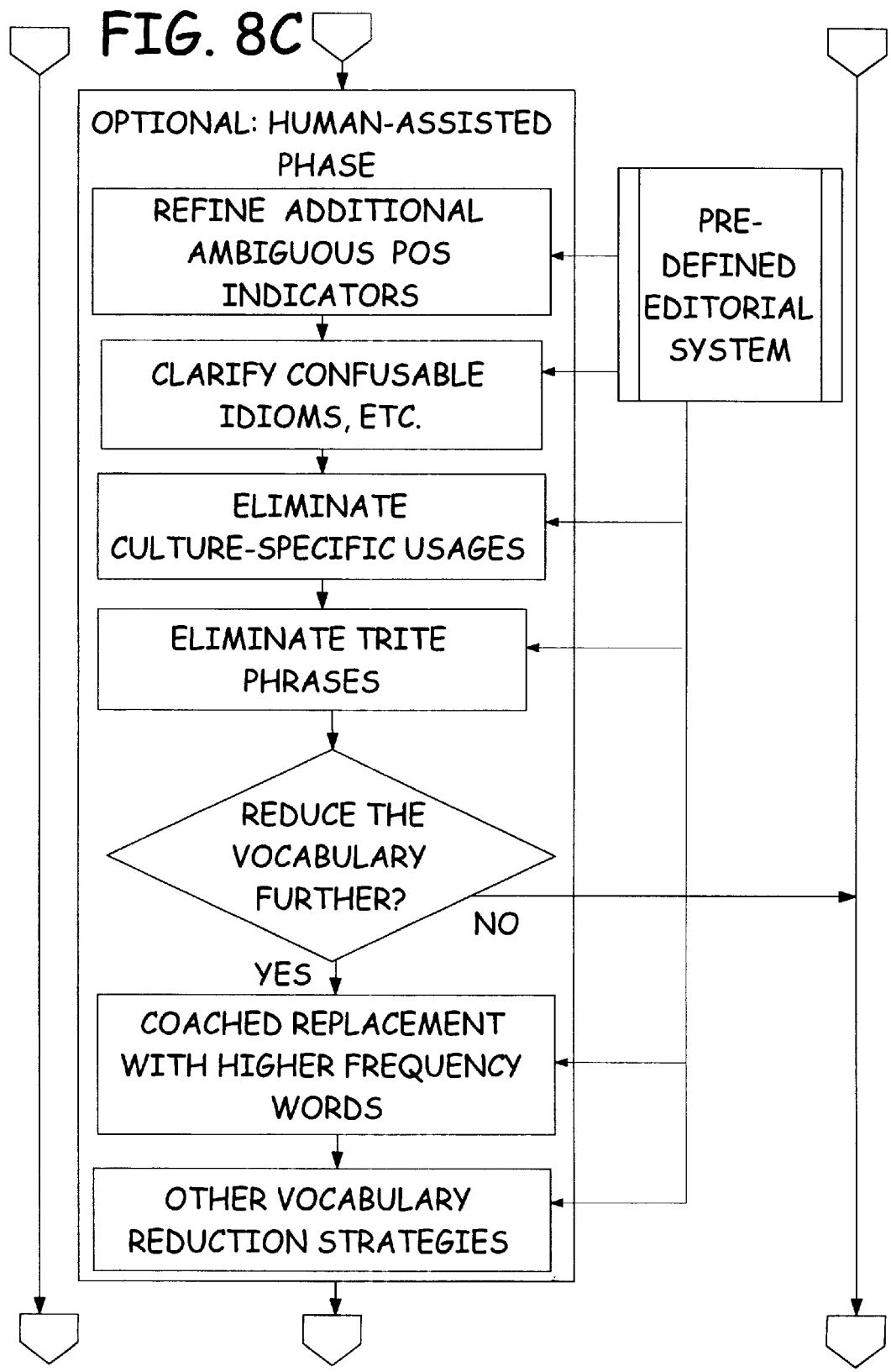

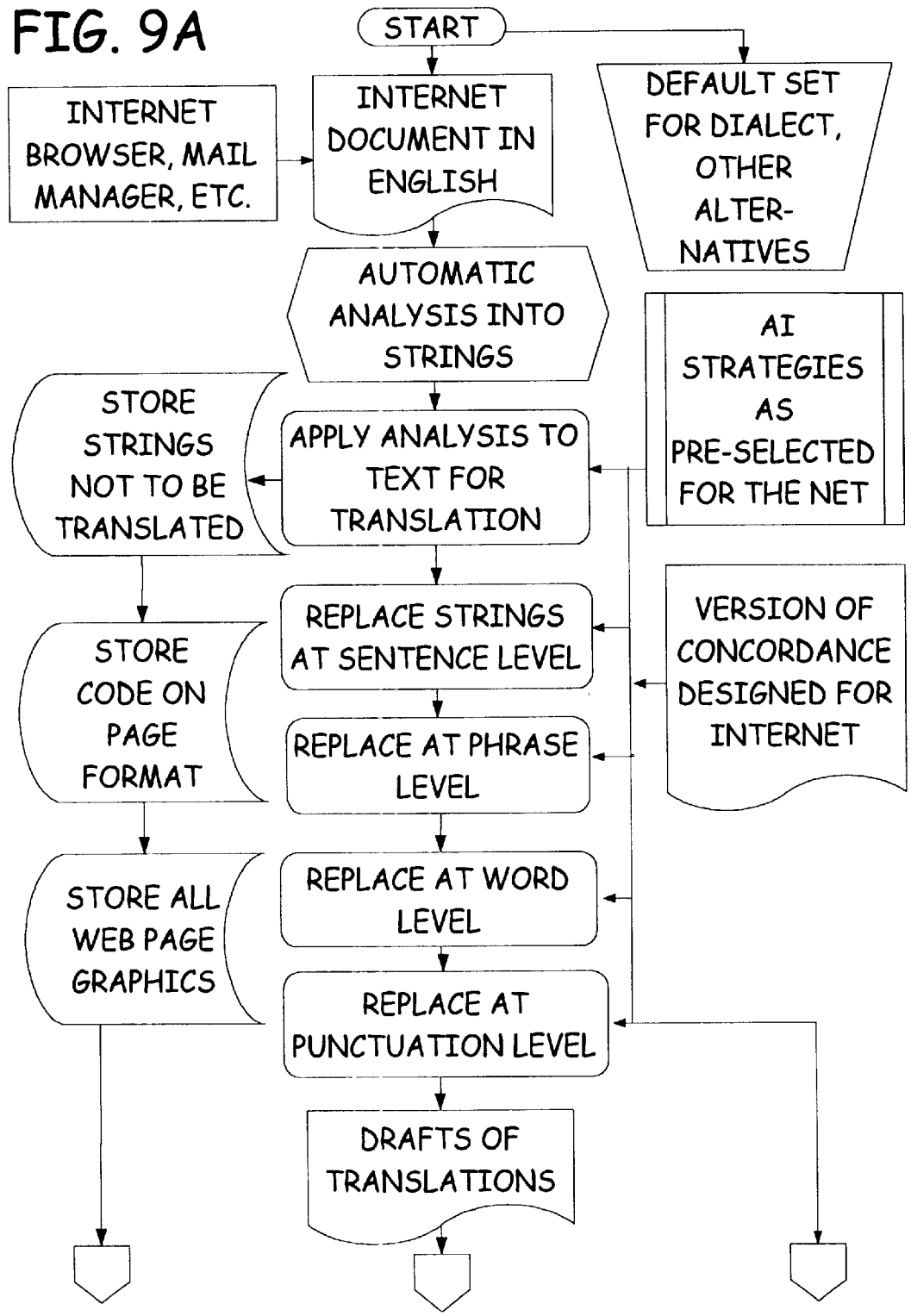

FIG. 10

TEMPLATE 72B: "PEN PAL SERIES" Display: English

Out: Indonesian

In: Swahili

DATE: Gregorian Calendar

Weekday Menu ●
Month Menu ●
Day of Mo. [ ]
Year 2001

Dear [ ]

This is a pen-pal letter, sent by e-mail [More Options]

I hope that you will write back. [More Options]

I am writing form the city of Nairobi in the country/nation Kenya [More Options]

The weather today is rainy [More Options]

My hobbies are hiking and stamp collecting [More Options]

I have never visited Indonesia lthough I have been to Thailand. [More Options]

I am twenty years old, unmarried [More Options]

My occupation is journalist [More Options]

The languages that I know are Swahili and Arabic [More Options] Do you know any Arabic If you do, write to me in that language. I have studied English in school for two years. [More Options] However,

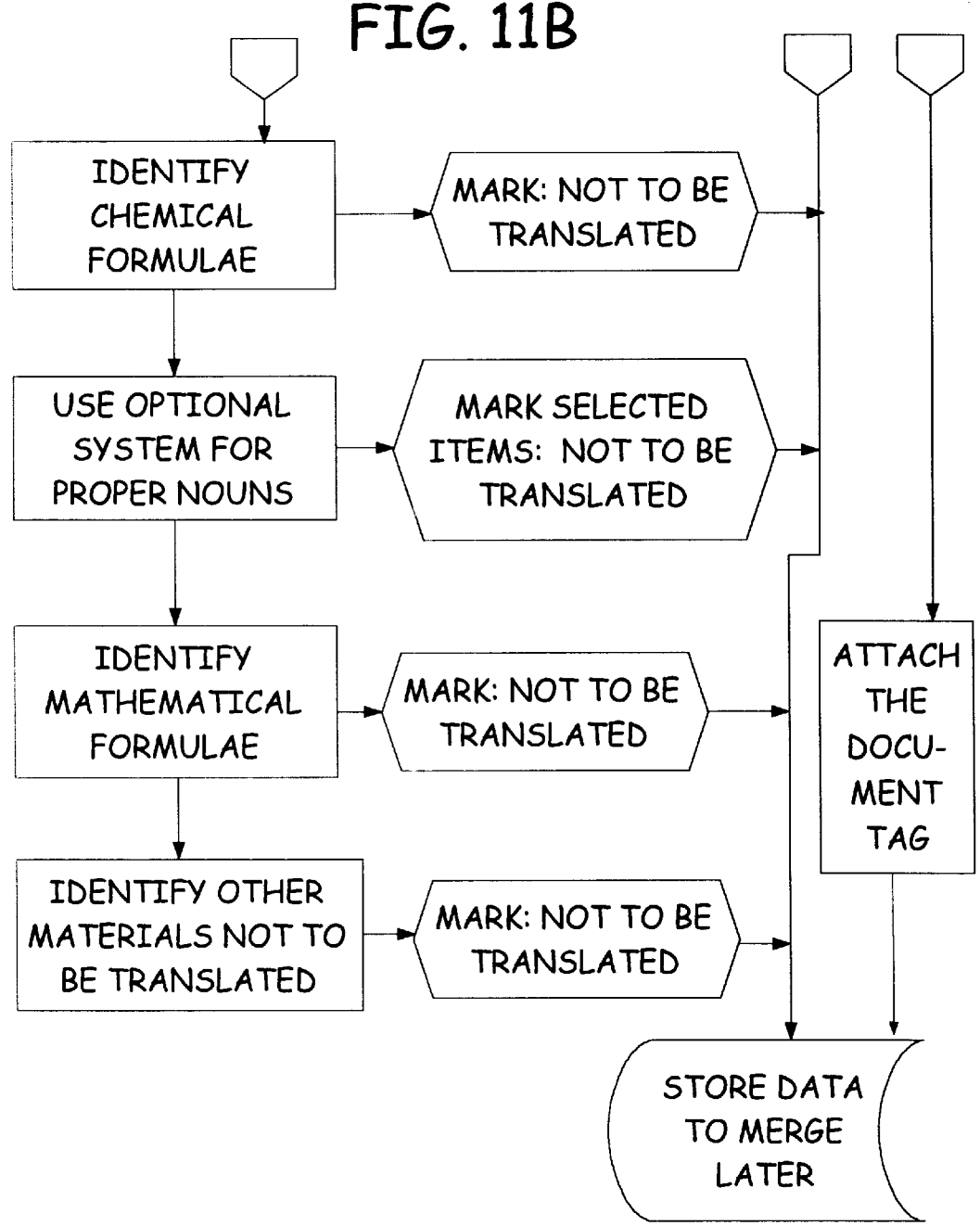

FIG. 12A  CODING FINGERS TO COLORS & ALPHANUMERICS

| NUMERALS | 1 | 2 | 3 | 4 | 5 | 6 | 7 | 8 | 9 | 0 |
|---|---|---|---|---|---|---|---|---|---|---|
| HOME KEYS ↑ | U | T | M | A | P | S | I | E | N | O |
| COLORS | WHITE | GREY | BLACK | RED | BLUE | YELLOW | PURPLE | GREEN | ORANGE | SKY BLUE |

ADDITIONAL DUODECIMAL CODING:

| NUMERALS | 11 | 12 |
|---|---|---|
| LETTER | Y | |
| COLORS | PINK | TAN |

ADDITIONAL LETTER CODING:

| NUMERAL: | LETTERS: | NUMERAL: | LETTERS: |
|---|---|---|---|
| 1 (WHITE) | L | 7 (PURPLE) | H F |
| 2 (GREY) | D Z | 8 (GREEN) | C G |
| 3 (BLACK) | W | 9 (ORANGE) | |
| 4 (RED) | R Q | 10 (SKY BLUE) | X |
| 5 (BLUE) | B V | 11 (PINK) | Y |
| 6 (YELLOW) | J K | 12 (TAN) | |

FIG. 13  SCHEMATIC COMPUTER KEYBOARD WITH FUNCTION KEYS, CODED BY COLOR, VERTICALLY; TWO SEPARATE KEYPADS

| F1 | F2 | F3 | F4 | F5 | F12 |
|----|----|----|----|----|-----|
| 1! | 2@ | 3 | 4$ | 5% | "# |
| L | D | W | R | B | ALT |
| U | T | M | A | P | . |
| ([ | Z | ? | Q | V | SHIFT |
| CTRL | | [AVAILABLE] | | | |

WHITE  GREY  BLACK  RED  BLUE  TAN

KEYPAD FOR LEFT HAND

| F11 | F6 | F7 | F8 | F9 | F10 |
|-----|----|----|----|----|----|
| '* | 6^ | 7& | 8 | 9 | 0 |
| ALT | J | H | C | , | X |
| Y | S | I | E | N | O |
| SHIFT | K | F | G | ; | )] |
| | SPACE BAR | | | | CTRL |

PINK  YELLOW  PURP.  GREEN  ORAN.  SKY-BLUE

KEYPAD FOR RIGHT HAND

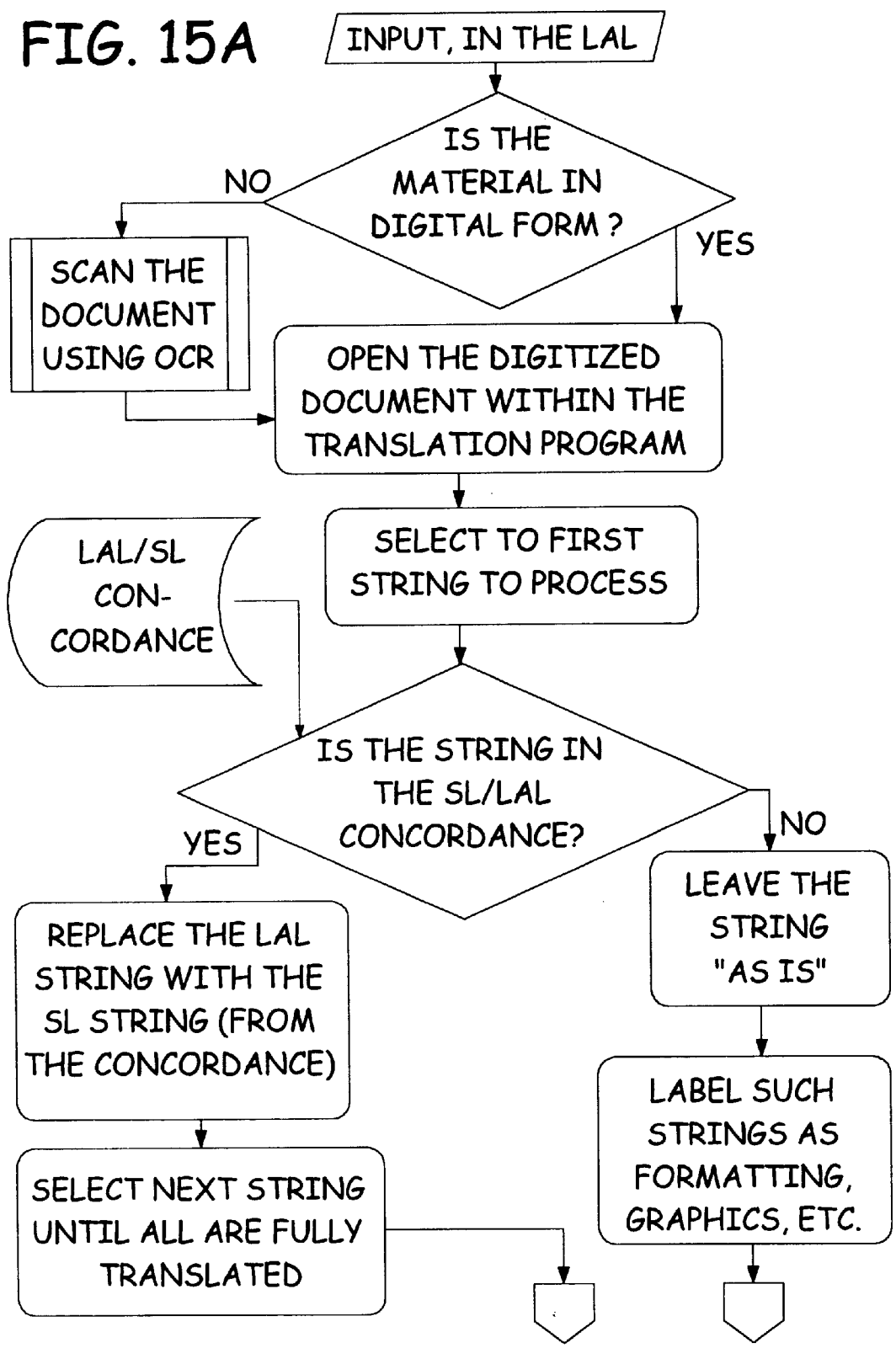

FIG. 16B
IMPLEMENTATION STAGE:   (SURVEY CONTINUED)
2. SL STRING CONTAINING PUNCTUATION LINKED TO LAL STRING WITHOUT PUNCTUATION
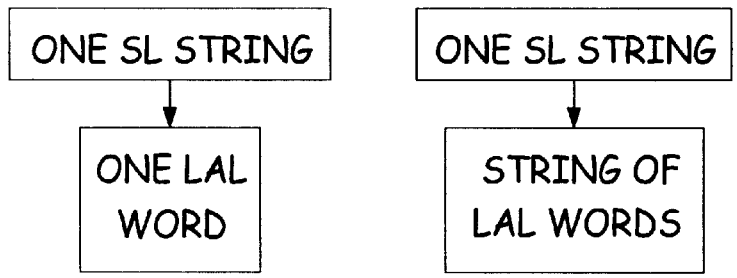
3. SL STRING (POSSIBLY CONTAINING PUNCTUATION) LINKED TO LAL STRING WITH PUNCTUATION
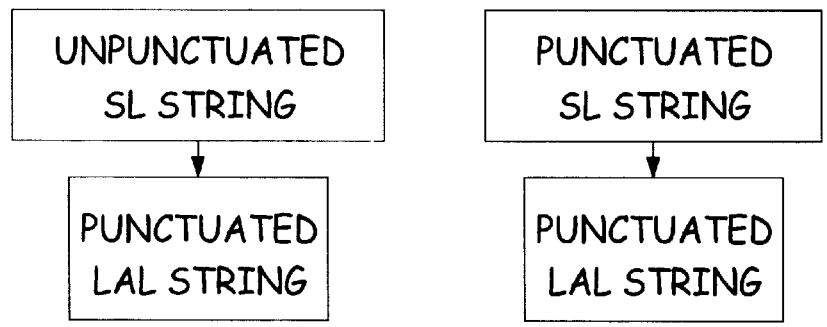
4. SL STRING, POSSIBLY WITH A CAPITALIZED LETTER (CL), LINKED TO LAL STRING WITH OR WITHOUT A CL
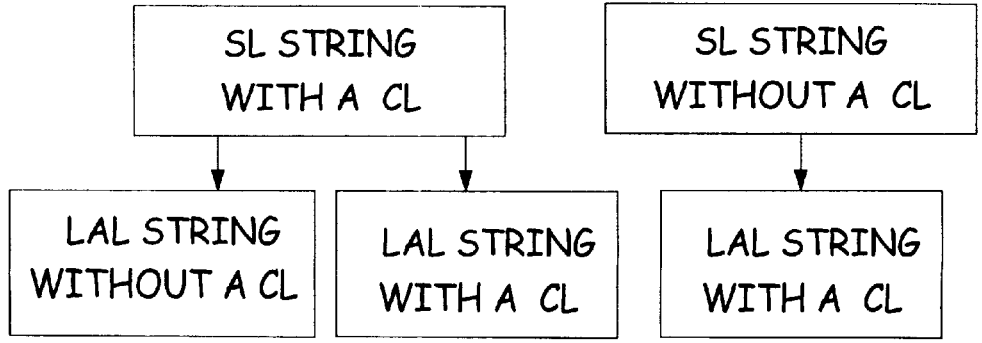

FIG. 16C
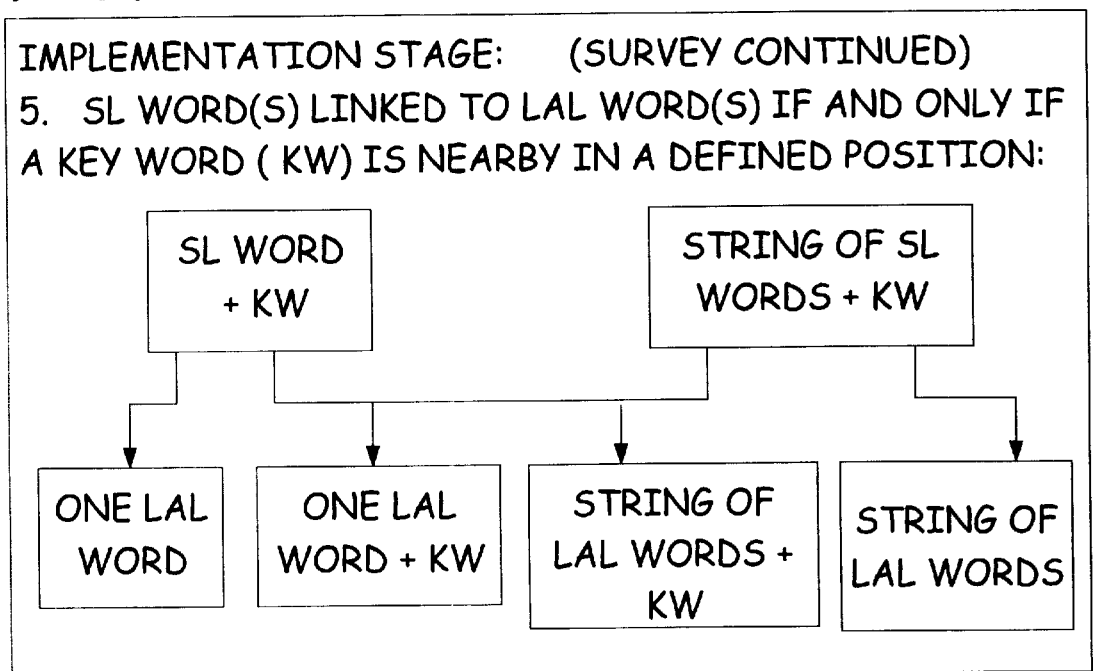
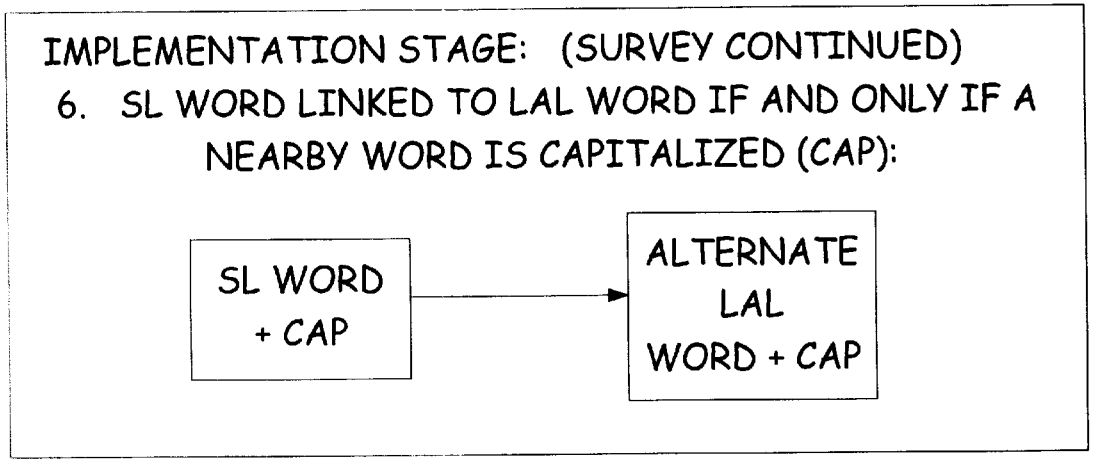

FIG. 16H

MULTIPLE EQUIVALENCY STRATEGIES INVOLVING HUMAN-ASSISTED EDITING PROGRAMS:

SEMANTIC ENHANCEMENT OF A TEXT BY REPLACEMENT OF AN AMBIGUOUS SL TERM WITH A "COINED" ALTERNATIVE LAL TERM (TAGGED IN THE SL) THAT CLARIFIES MEANING

REPLACEMENT OF SELECTED PROPER NOUNS WHICH ARE ALSO COMMON NOUNS WITH UNTRANSLATED FORMS

ALLOWING ALTERNATIVE LAL FORMS THAT REFLECT NON-DEFAULT DIALECTICAL, STYLISTIC, OR "NATIONAL SPELLING STANDARD" FORMS

ALLOWING FOR NON-TRANSLATION OF WORDS IN A TEXT WHICH HAVE BEEN IDENTIFIED AS METALINGUISTIC IN USAGE

SYTEMATIZING NUMERICS AND LIST-FORMING INDEXING

REPLACING WORDS IN A GIVEN TEXT WITH ALTERNATIVE WORDS THAT HAVE BEEN CHOSEN FOR USE WITHIN A REDUCED VOCABULARY SYSTEM

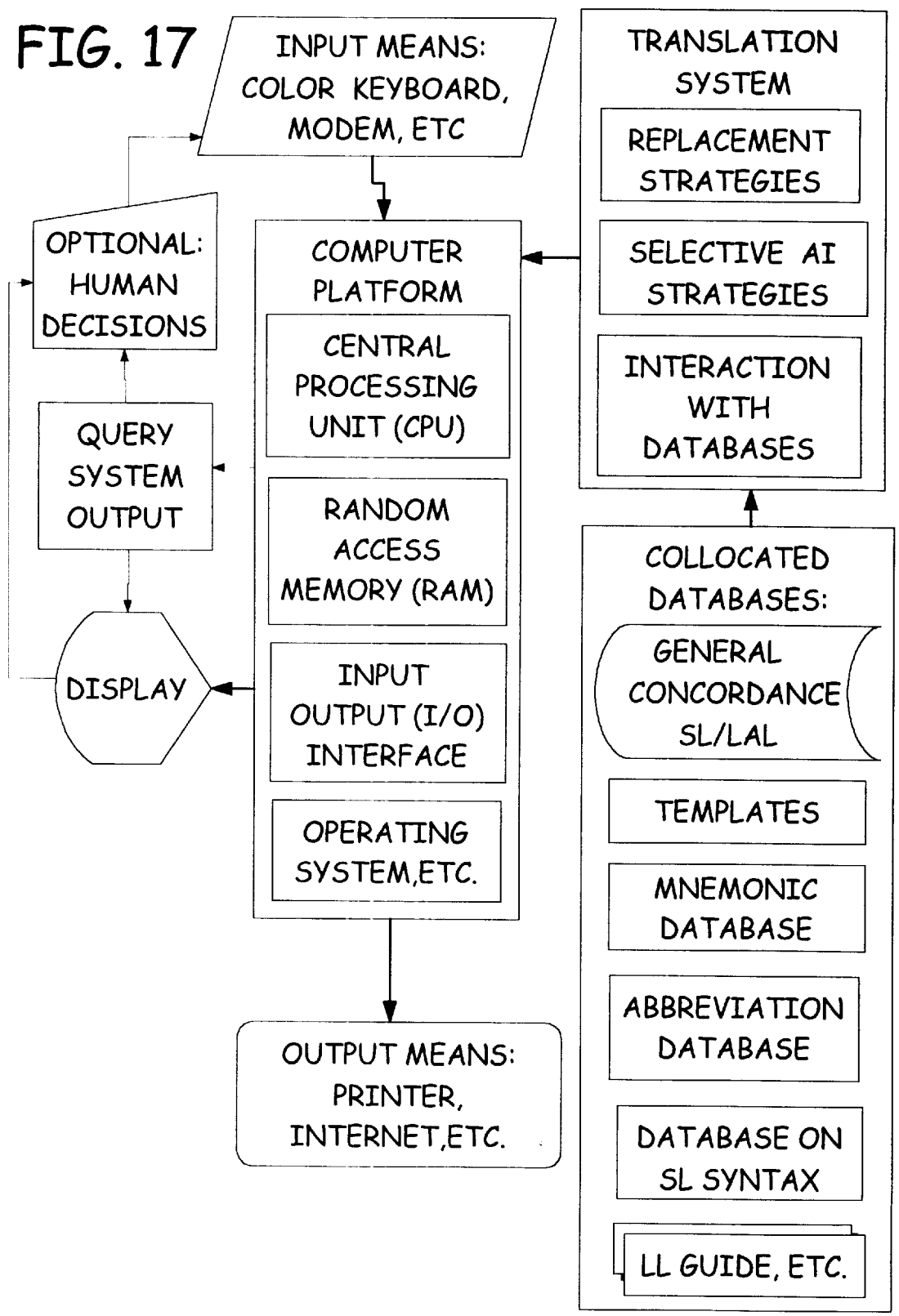

FIG. 19

START GRAPHEMIC SELECTION

ESTABLISH A WRITTEN (AND THEREFORE A DIGITAL) FORMAT FOR THE LAL

ELABORATE THE OPTIMIZATION GOALS

CONSIDER INTERNATIONAL GRAPHEMIC PRACTICES

CONSIDER INTERNET INPUT/OUTPUT SYSTEMS

CONSIDER WORD-PROCESSING SYSTEMS

CONSIDER PRESTIGE FACTORS

CONSIDER LETTER FREQUENCIES

DESIGN THE PHONEMES

FIG. 22A

```
START CONCORDANCE
        │
        ▼
```

CREATE A DATABASE FORMAT SO STRINGS OF DIGITIZED SL DATA CAN BE INDEXED TO STRINGS CHOSEN FOR THE LAL AND TO ADDITIONAL MATERIALS FROM OTHER DATA BASES

DESIGN A CONCORDANCE SYSTEM WITH EASILY FINDABLE LOCI INTO WHICH CAN BE FILED AND FROM WHICH CAN BE QUICKLY RETRIEVED THE FOLLOWING:

- TWO COLLOCATED STRINGS (IN SL AND LAL) WITH BIDIRECTIONAL INDEX ACCESS

- CROSS REFERENCE WITHIN EITHER THE SL OR LAL CORPUS TO MULTIPLE EQUIVALENTS, AND POTENTIAL EQUIVALENTS AVAILABLE UNDER DEFAULT OPTIONS

- ANY ALTERNATIVE LAL WORD TO BE USED WITHIN A VOCABULARY REDUCTION STRATEGY (VRS)

- INFORMATION ON SERIOUS AMBIGUITY IN THE USAGE OF THE SL WORD OR PHRASE

- COMPUTERIZED RECORDINGS OF THE SOUNDS OF THE LAL WORD(S) OR PHRASE

FIG. 22B

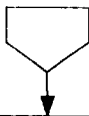

PROVIDE FOR THE CONCORDANCE SYSTEM TO RELATE THE FOLLOWING ADDITIONAL BANKS OF INFORMATION TO ITS BASIC ENTRIES:

A GRAPHIC FILE THAT ILLUSTRATES THE MEANING OF THE COLLOCATED STRING

INFORMATION ON THE SOURCE OF THE LAL WORD OR PHRASE

STANDARD DICTIONARY ENTRY ON THE SL WORD OR PHRASE

STANDARD BILINGUAL DICTIONARY ENTRY ON THE WORD OR PHRASE IN THE SL AND IN ANY OF A PLURALITY OF OTHER LANGUAGES

DATABASE ENTRIES RELATED TO THE DELIMITING TEMPLATE SYSTEM

ILLUSTRATIONS OR APPLETS DISPLAYING A "SIGN LANGUAGE" EQUIVALENT OF THE WORD OR PHRASE IN THE SL

ABBREVIATED (STENOTYPY) FORMS FOR MANY COMMON ENTRIES IN THE LAL

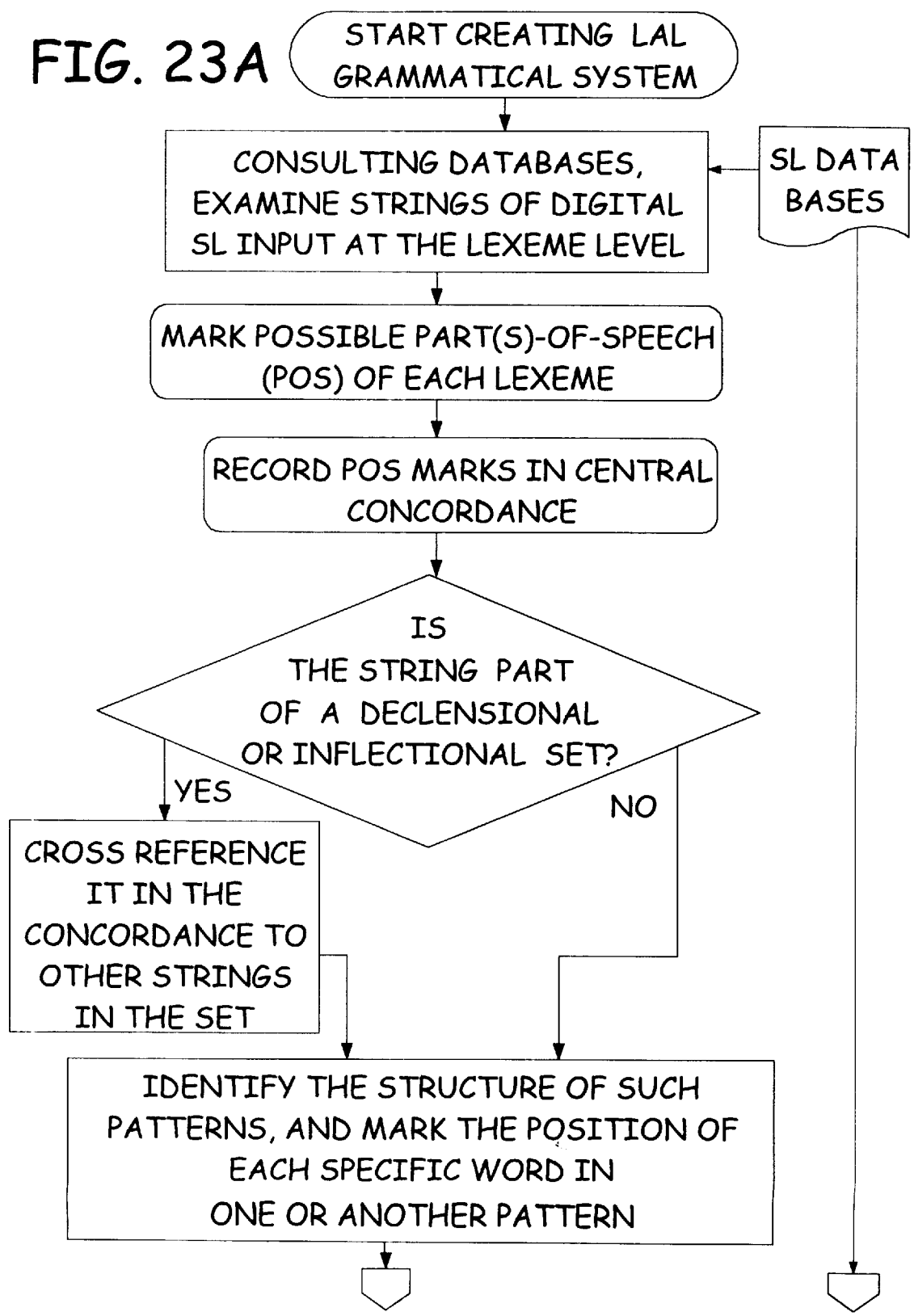

FIG. 23C

1. MARK THE SL STRING AND ITS LAL STRING TO MAKE POS PATTERN EVIDENT

2. SEARCH FOR, ESTABLISH, AND MARK CATEGORIES OF SL WORDS (OTHER THAN POS), WHICH WILL FURTHER HELP CLARIFY USAGE PATTERNS

3. MARK LAL STRINGS TO MAKE USAGE PATTERNS EVIDENT, PROVIDING (FOR EXAMPLE) CHARACTERISTIC WORD ENDINGS FOR CATEGORIES

4. PROVIDE HOMOGRAPHIC WORDS IN THE SL THAT CROSS GRAMMATICAL BOUNDARIES, WITH MARKINGS TO RECORD "HIGHLY AMBIGUOUS" USAGE

5. CREATE A PROTOCOL TO DETERMINE WHICH POSSIBLE WORD ENDING WILL TAKE PRECEDENCE OVER WHAT WORD ENDING IN LAL VOCABULARY FORMATION

6. CREATE LAL WORDS FOR SL WORDS IDENTIFIED UNDER 4. ABOVE, WHICH WILL MINIMIZE THE COGNITIVE DISSONANCE CREATED BY OVERLAPPING GRAMMATICAL AND LEXICAL FUNCTIONS

FIG. 23D 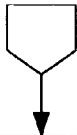

RE-EVALUATE ALL GRAMMATICAL DECISIONS TAKEN ABOVE TO GUARANTEE THAT THEY PROVIDE THE LAL WITH WHAT WILL APPEAR SIMPLE AND CONSISTENT GRAMMATICAL FORMS -- ONES CAPABLE OF MASTERY WITH MINIMAL LEARNING TIME BY GLOBAL POPULATIONS

COMPARE TO NATURAL LANGUAGES WITH A REPUTATION FOR BEING EASY

COMPARE WITH CREOLES AND PIDGINS

COMPARE WITH ARTIFICIAL LANGUAGE PROJECTS

USER TESTS AND CONSULTATIONS

STORE GRAMMATICAL SYSTEM IN THE CENTRAL CONCORDANCE

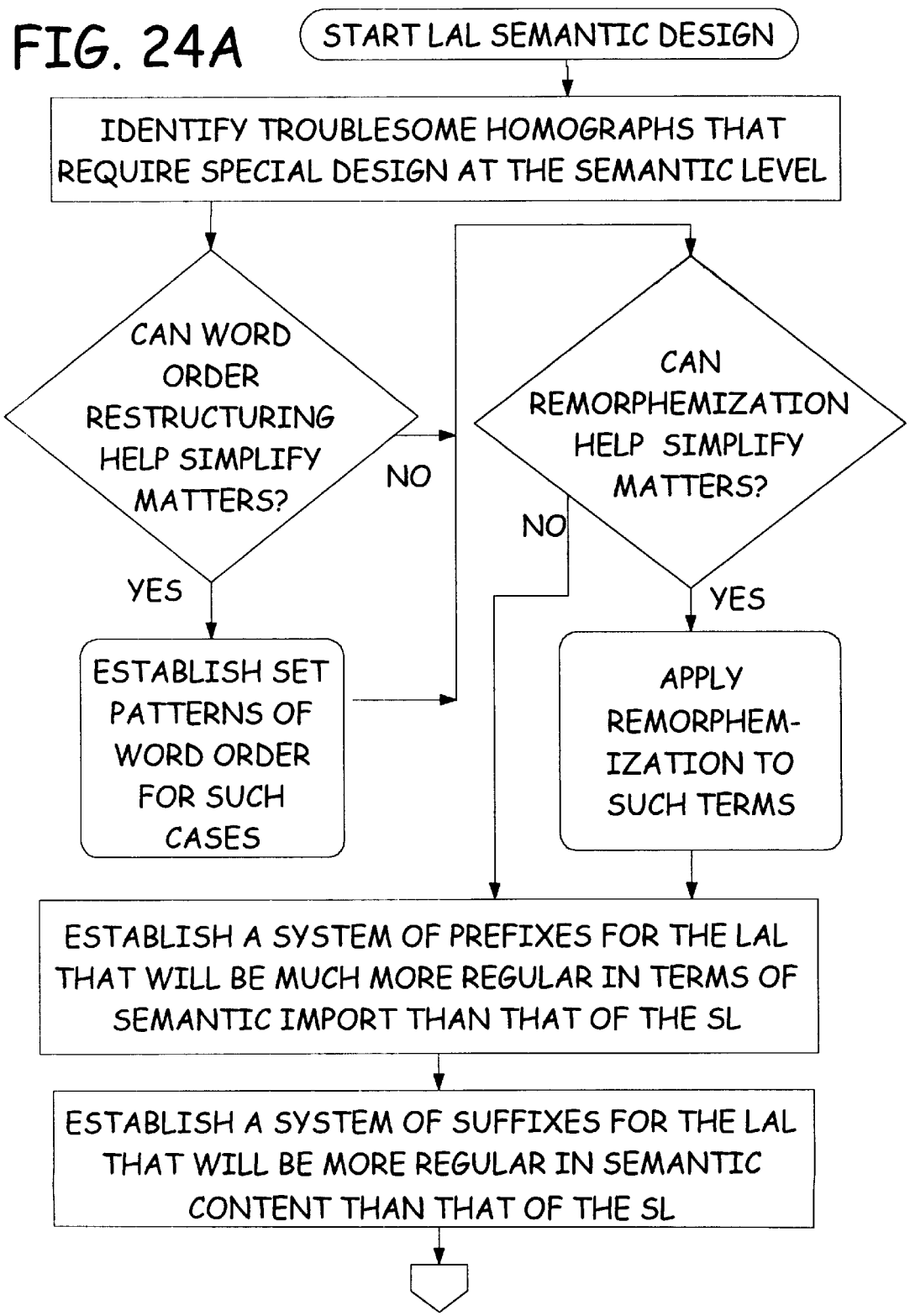

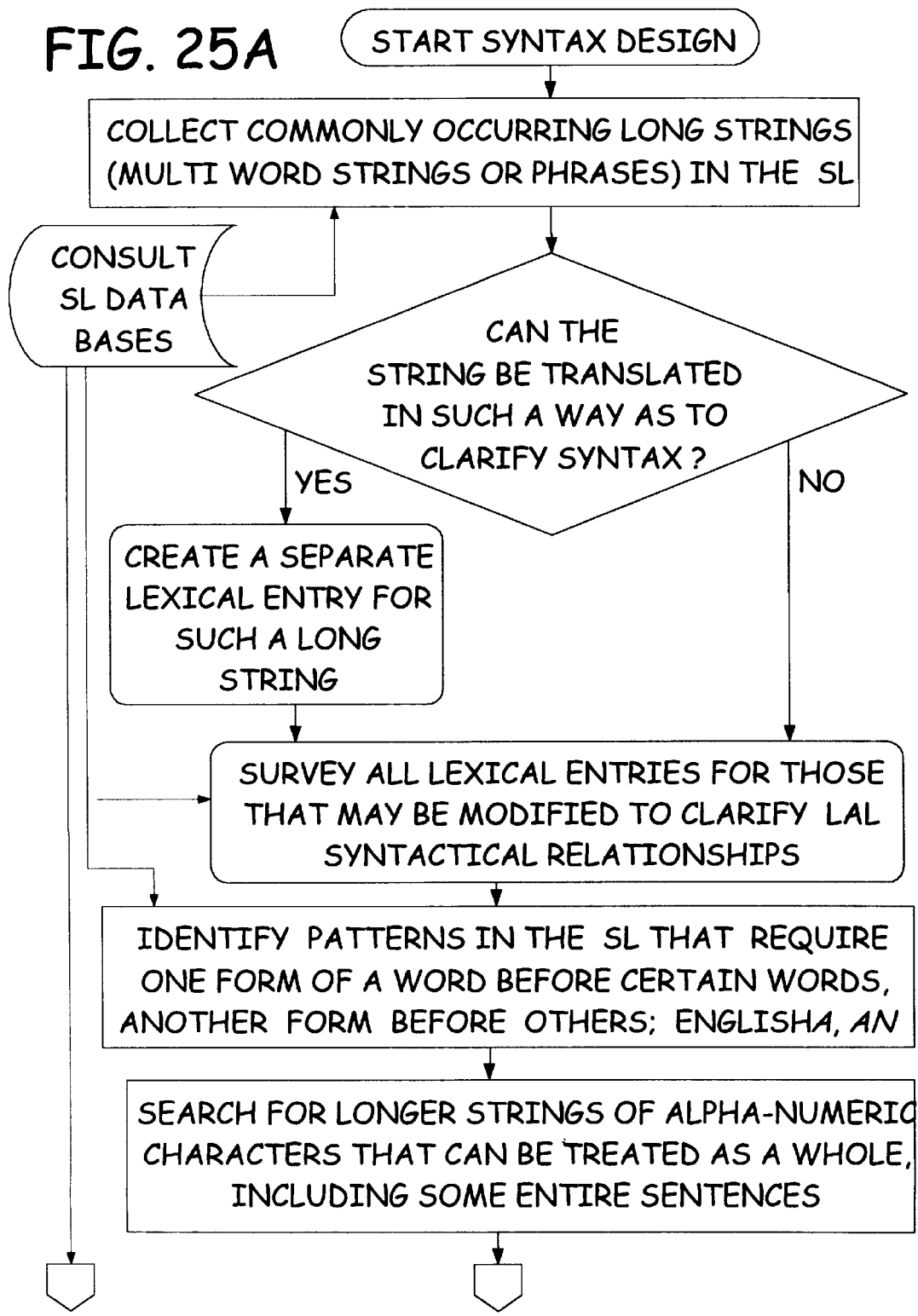

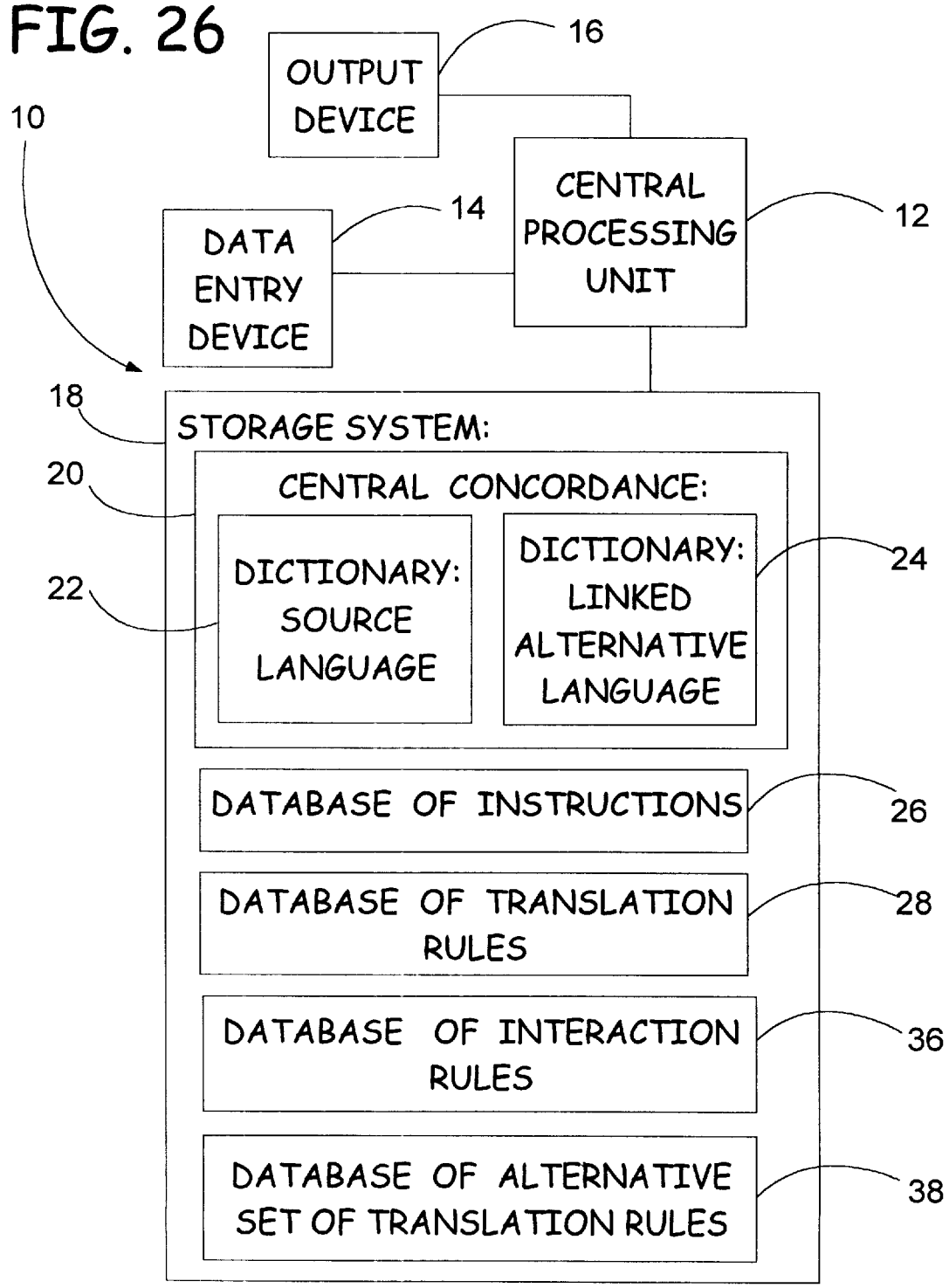

METHOD AND APPARATUS FOR PERFORMING FULL BIDIRECTIONAL TRANSLATION BETWEEN A SOURCE LANGUAGE AND A LINKED ALTERNATIVE LANGUAGE

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Method to improve international and other communication and to provide easier access to digitized data, and apparatus to perform the method. In particular, the present invention provides a means for generating linked alternative languages from a source language. More particularly, the linked alternative language systems taught by the present invention provide especially designed language forms which may be optimized in any of a variety of ways (for example, by rendering a linked alternative language easier to comprehend or by adding mnemonic features), but which has also been carefully designed to retain full bi-directional machine translation equivalence to the source language generally, and to other target languages within certain constrained contextual environments. Implications of the linked alternative language system touch upon many aspects of communication, information management, and human interface with machines.

BACKGROUND OF THE INVENTION

The speed and facility of international communication has greatly increased in past decades, but the content of that communication is still encoded in language forms that make access to that data difficult for a vast majority of the world's population. There has long been an identified need for translation systems that would allow easier access to digitized information.

Much of the world's communication has recently come to depend on the use of the English language, and many of those using English are by no means native speakers. This presents several problems. Among these are:

1) It requires a great amount of time, and thus investment of resources, to teach a person to use English effectively.
2) English has various dialects and national forms.
3) When persons from diverse linguistics cultures who know English only as a second language try to communicate, serious problems often occur.

There is no language spoken by more than a small minority of the world population. Mandarin Chinese, the most widely spoken, is limited in geographic distribution and by a complex written form. Projections vary on the growth of language communities, but it appears that several languages are growing at rates more rapid than English. Thus the linguistic dimension of international communication is likely to remain a barrier—even as mechanical means find solutions to the physical obstacles.

Many aspects of worldwide communication are being rapidly expanded by new technologies, while other aspects lag far behind. The bulk of material in digital form is growing and the use of optical character recognition (OCR) systems and methods of scanning handwriting are making digitalization easier. Much digitalization is however still done by keyboard and with a QWERTY keyboard layout, an arrangement which was intentionally designed to be slow so that mechanical typewriter keys would not stick. The need to ease and to speed the input of digital information has been dramatized by the development of the Internet.

The quality of human to machine interface is becoming an important consideration in many fields. The need for error-free data exchange has become urgent, for mistakes can mean the loss of lives. The technology for "text to voice" operations is rapidly developing, but quality output is prevented by linguistics systems that do not allow an exact correspondence between the two.

The field of Machine Translation (MT) has attracted considerable attention since the late 1940's. Translation by human intervention is slow and expensive, and the quality of the output is difficult to gauge unless one already knows both languages well. By the early 1950's, it was hoped that MT would be able to provide a fully reliable and quicker alternative; the dream was that a computer could be supplied with a digitized text in a source language (SL) like English and automatically render it into a chosen target language (TL) such as Russian.

During the 1950's and 1960's, much of the effort in this field took place in the United States or Russia, with considerable funding from the two governments in the context of the Cold War. Techniques applied to MT in both areas soon went beyond the simple provision of word-by-word translations and contextual analysis to choose among terms, and included various techniques for the parsing of sentences to gain additional information on content from the sentence structure as well as from the individual words.

By the mid-1960's, there was also considerable debate on the values of establishing a universal "pivot-language" to reduce the number of MT processes that would be needed for global communication. Such an idea had been recommended at a 1952 conference at the Massachusetts Institute of Technology (MIT). The idea was that some one language could be chosen into which all potential source languages might be automatically translated; then from that pivot-language, texts could be automatically generated into any target language, saving much effort in the design of systems.

There were those who suggested using a natural language for this purpose (some early Soviet studies used Russian). Others suggested using an artificial language such as Esperanto. Dr. Alexander Gode in 1954 suggested for this purpose "Interlingua," a project that had been developed under his editorship. Soon other researchers were developing complex pivot-languages of various types that were coded in numbers or logical symbols; e.g., I. A. Melchuk in the Soviet Union during the 1960's. But it was discovered that translations to and from such artificial languages were also fraught with error.

By 1959, Bar-Hillel had already shown that "Fully Automatic High Quality Translation" between two natural languages was intrinsically impossible by machine. But it was a U.S. government report in 1966, the ALPAC Report, that highlighted the limitations of MT techniques and ultimately brought an end to U.S. government funding for MT. Research did continue in the Soviet Union and in Japan (and to a reduced degree elsewhere).

Interest in the MT field was revived in Europe in 1977, with the European Community commissioning work on MT. One such project, begun in 1979, was named DLT (Distributed Language Translation) and used Esperanto as its pivot language. The company was the Bureau for Systems Development (BSO) in Utrecht, Netherlands. Early DLT funding came from the European Community; in 1984, there was a grant of US$ 3.5 million from the Dutch government. By the early 1990's, however, the DLT project was over, not having produced the desired results.

Many more recent MT methodologies rely heavily on sequential word frequency considerations and probability databases. Such methods are more likely to produce readable output, since by nature they recreate word sequences that are not only possible but common in the target language. But this very fact is an extremely serious threat to users, who may be seduced into believing in the accuracy of a text by its very normalcy. By their nature, such methods will produce output that is likely to appear very credible, even though full of mistakes. Furthermore, the user has no way to verify the accuracy of such output—unless the user has access to someone who knows both the source and target language and can confirm accuracy and/or make corrections. The fact remains that traditional MT techniques can only approximate the needed translation; and by their nature they must logically remain prone to introducing dangerous errors into the communication process.

In the field of linguistics, there has been a long series of efforts to create artificial languages that would be superior to natural ones. Descartes and Leibniz were among the earlier designers; and there was early hope of language systems with the precision of mathematics. There was some limited success: botanic, zoological, and chemical nomenclatures were the results of such efforts, as were modern symbolic logic, library catalog systems, and even Roget's Thesaurus. The various search machines on the Internet still struggle to make better order of linguistic information.

During the last two centuries, there have been numerous proposals for an "international auxiliary language" (IAL) which could serve as a universal second language. The Esperanto project, launched in 1887, gained a few thousands of devotees over the generations. Subsequent projects like Ido, Otto Jespersen's Novial, Interlingua, and the "logical languages" Loglan and Lojban also have organizations promoting their use. The basic problem, however, remains: there is no incentive to learn a novel language that has no speakers and no literature and will provide no advantage to the learner unless and until it develops a community of users.

The method of employing a linked alternative language as a potential IAL, differs markedly from all prior IAL projects in that it provides specific uses of economic value, such as access to data, which are in no way tied to a prior-existing community of users. A LAL serving as an IAL and linked to English (as is possible under this invention) would provide immediate and perfectly translated access to all digitized data currently available in the English language. And the methods described here can be used to translate all features of the Internet which are digitized in English into that IAL—and could do so as that data is downloaded by browsers. Such features have never been provided by any IAL project or any MT system.

FIG. 1A illustrates prior art interlinguistic routes to access to data in a source language (SL), either a) by the use of a pivot-language or b) by traditional machine translation (MT) methods. It is impossible for such systems to translate without loss of information in the process. The present invention is designed to produce "lossless" translation, i.e., a form of translation in which absolutely no semantic content is lost, and none gained, in the translation process.

U.S. Pat. No. 4,667,290 entitled "Compilers using a universal intermediate language," filed Sep. 10, 1984 and issued May 19, 1987 discloses the design of a universal intermediate language, but not for use with natural language, but with machine language code. U.S. Pat. No. 4,635,199 entitled "Pivot-type machine translating system comprising a pragmatic table for checking semantic structures, a pivot representation, and a result of translation," filed Apr. 30, 1984 and issued Jan. 6, 1987 describes an invention that "relates to a machine translation system of the so-called pivot type." It describes a specific example of a machine translation system using the pivot-language approach, not the methodologies covered in the present invention.

Input by abbreviation is disclosed in U.S. Pat. No. 4,760,528 entitled"Method for entering text using abbreviated word forms" filed Sep. 18, 1985 and issued Jul. 26, 1988, which discloses one specific system for entering digital information into a computer in the form of abbreviations to be automatically expanded, but mnemonic principles are not involved.

U.S. Pat. No. 4,864,503 entitled, "Method of using a created international language as an intermediate pathway in translation between two national languages" filed Feb. 5, 1987 and issued Sep. 5, 1989, refers to the use of a "created international language" as a pivot language.

U.S. Pat. No. 5,587,903 entitled, "Artificial Intelligence Language Program" issued Dec. 24, 1996, discloses traditional MT methods to convert English sentences into Esperanto and then to allow the user to interface with the program to improve quality.

U.S. Pat. No. 5,696,980 entitled, "Machine Translation System Utilizing Bilingual Equivalence Statements," issued Dec. 9, 1997, discloses an MT system using strategies of computational linguistics to improve the quality of output in the target language; it uses traditional error-prone MT. Similarly, U.S. Pat. No. 5,768,603 entitled "Method and system for natural language translation," filed Jun. 2, 1995 and issued Jun. 16, 1998 also discloses an error-prone pattern, although it seeks to reduce the likelihood of such errors. The techniques of U.S. Pat. No. 5,768,603 applies probabilities or scores to various target language translations.

Communication systems worldwide are moving digitized data at unprecedented and rapidly increasing speeds, especially with the Internet. But most of that data is cast in linguistic form, and the multiplicity of linguistic cultures renders most of it useless to most of the world's population. The preferred embodiment of this invention can supply a system which is able at the same time to supply access to all digitized data now in English (including all web pages and electronic mail now in on the Internet in English), provide a viable IAL, supply far more reliable human-machine interface, and meet a wide variety of other communicative and information management needs in the modern world. A related embodiment, one that allows for delimited multilingual translation using a plurality of natural language databases closely linked within the constraints of template format, on a digital-string to digital-string basis, can facilitate use of the IAL while at the same time providing Internet users with a useful tool by which to communicate across linguistic barriers.

DISCLOSURE OF THE INVENTION

This invention involves a system, a method and an apparatus to improve international and other communication and to provide easier access to digitized data by means of generating, from source languages, "linked alternative languages." A linked alternative language (LAL), is a specially designed language form that is quite different in outward format from its source language (SL) and which can be optimized a variety of ways, including making it much easier to learn for persons speaking a target language or languages, but which has also been carefully designed to retain full, bidirectional, machine translation (MT) equivalence to the source language. Linked alternative languages can take the form of fully speakable languages, languages similar in all capabilities to natural languages; or they may be reduced or constrained in any of a variety of ways to serve specific communicative purposes. By such means, they can be designed to serve such purposes significantly better than their source languages.

Insofar as machine translation is involved, this invention is unique in that it generates from a source language (SL) not a text in another existent language, nor a text in a pivot-language (PL), but generates and utilizes an optimized alternative to the source language. In doing so, it applies strategies that only employ such machine translation methodologies in the translation process as will leave unbroken, full, bi-directional translatability between the source language (SL) and the linked alternative language (LAL). As a full system, a LAL can be linked to only one natural language, i.e., its source language (SL). However, within a sufficiently restricted subordinate system, the same LAL may also be more generally linked to a third language (one that is not its source language), and even to a plurality of such languages. This can be done if all strings of data in the third language are inputted, translated, or outputted within a template system that restricts the choice of digital strings of alphanumeric input/output to delimited sets that have been preselected for this purpose, and within a sufficiently delimited context that will allow lexical substitution without significant semantic loss and will set predictable patterns for sentence order transposition.

Over the last five decades, a long series of machine translation systems have been proposed and many have been implemented on computers of increasing sophistication; meanwhile, the technologies of artificial intelligence and computational linguistics employed by such MT systems have proliferated in approach and become increasingly subtle in application. Probabilistic models and statistical approaches have become common. This invention differs from prior efforts in that it focuses not on increasing the probability of a correct translation by adding new and more sophisticated systems for approximation, but rather on strictly delimiting all approaches to be used to only those technologies that will maintain full bidirectional translatability. Between a linked alternative language and its source language, it not only provides "Fully Automatic High Quality Translation," but completely lossless translation.

Linked alternative language (LAL) systems can be designed to serve a variety of other needed communicative purposes. These modifications, i.e., built-in features lacking in the source language, can make a LAL more effective in many ways; these design features are termed here "optimizations."

A preferred embodiment of this system uses English as the SL and then designs and utilizes a LAL that would be optimally useful to the entire world population in gaining immediate access to all the data currently digitized in the English language. This LAL would take the form of a potential international auxiliary language, heavily internationalized in many ways, with quite different morphemes than English. In addition to such a embodiment, LAL technology might also be utilized to formulate and implement a more neutral and carefully standardized form of the contemporary English language for worldwide use on the Internet. The latter embodiment would meet more limited goals, but would have the advantage of immediate readability for those already knowing English; its comparative disadvantage would be that it would retain many of the difficulties of the English language. It could, however, be used as the basis for industrial "controlled languages" and for other reduced vocabulary systems based on English.

Additionally, the system and method disclosed here encompasses similar embodiments that might be designed by the same general procedures with Arabic, French, or any other language as SL, and with a LAL designed for narrower usage. Thus the system and method of this invention might, for example, be used to provide Chinese users with access to Russian data by creating and employing a LAL linked to Russian, but expressed in a sub-set of Chinese characters—or in romanized Mandarin. A version of the invention could be used to present data in English in a LAL designed specifically for Spanish speakers alone.

The system need not, moreover, address an entire natural language as its SL, but may address any sub-set. The invention could be used, for example, to access chemical information alone in the German language, using a LAL specifically designed to optimize ease of access for Japanese, i.e., the output in a LAL would mirror, in a constrained mode, the written norms of Japanese as closely as possible, and the rules for which could be rather readily learned by Japanese speakers. In addition to its use with fully natural languages, the invention may also be used with any artificial language which is designed to take the form of a natural language, such as Esperanto or Interlingua.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawings taken in conjunction with the following detailed description of the Best Mode of Carrying Out the Invention. In the drawings:

FIGS. 1A–B chart three possible interlinguistic routes to access to data in a source language (SL), using machine translation (MT) capabilities with FIG. 1A illustrating the prior art and FIG. 1B illustrating the invention.

FIGS. 2A–E illustrate an overall method and apparatus for structuring and managing human communication by the generation and use of a linked alternative language (LAL).

FIGS. 3A–D illustrate the type of methods that might be applied when using artificial intelligence (AI), computational linguistics, and related techniques within the fully automated translation system provided by this invention.

FIGS. 6A–C form an illustrative diagram explaining more specific procedures for editing and enhancing texts and documents as they are translated from the SL to the LAL. The exact order of these steps can be altered without affecting the program. Other traditional editing steps can be added.

FIGS. 8A–D provide more detail on a "basic text translator."

FIGS. 9A–C provide more detail on an "Internet translator."

FIG. 10 is a diagram illustrating a display of a delimiting template.

FIGS. 11A–B relate to the identification of materials in texts that are not to be translated.

FIGS. 12A–B form a diagram showing an embodiment of a mnemonic keyboard which forms part of this invention.

FIG. 13 is a diagram showing another embodiment of the mnemonic keyboard.

FIGS. 15A–B is a diagram describing the methodology of translating from a LAL text into the SL.

FIGS. 16A–H is a survey of the various subsets of the multiple equivalency strategy.

FIG. 17 is a diagram showing the basic components of the apparatus.

FIG. 19 describes a stage in the system to design a "linked alternative language" for the selection of graphemes for a LAL.

FIGS. 22A–B describe a stage in the system to design a "linked alternative language" for the establishment of a Central Concordance.

FIGS. 23A–D, describe a stage in the system to design a "linked alternative language" for the creation of a grammatical system for a LAL.

FIGS. 24A–B, describe a stage in the system to design a "linked alternative language" for semantic features to be considered in the design of a LAL.

FIGS. 25A–B, describe a stage in the system to design a "linked alternative language" for syntactic features to be taken into consideration in LAL design.

FIG. 26 is a schematic illustration of a translating device for practicing the invention.

BEST MODE OF CARRYING OUT THE INVENTION

Figure 1B:
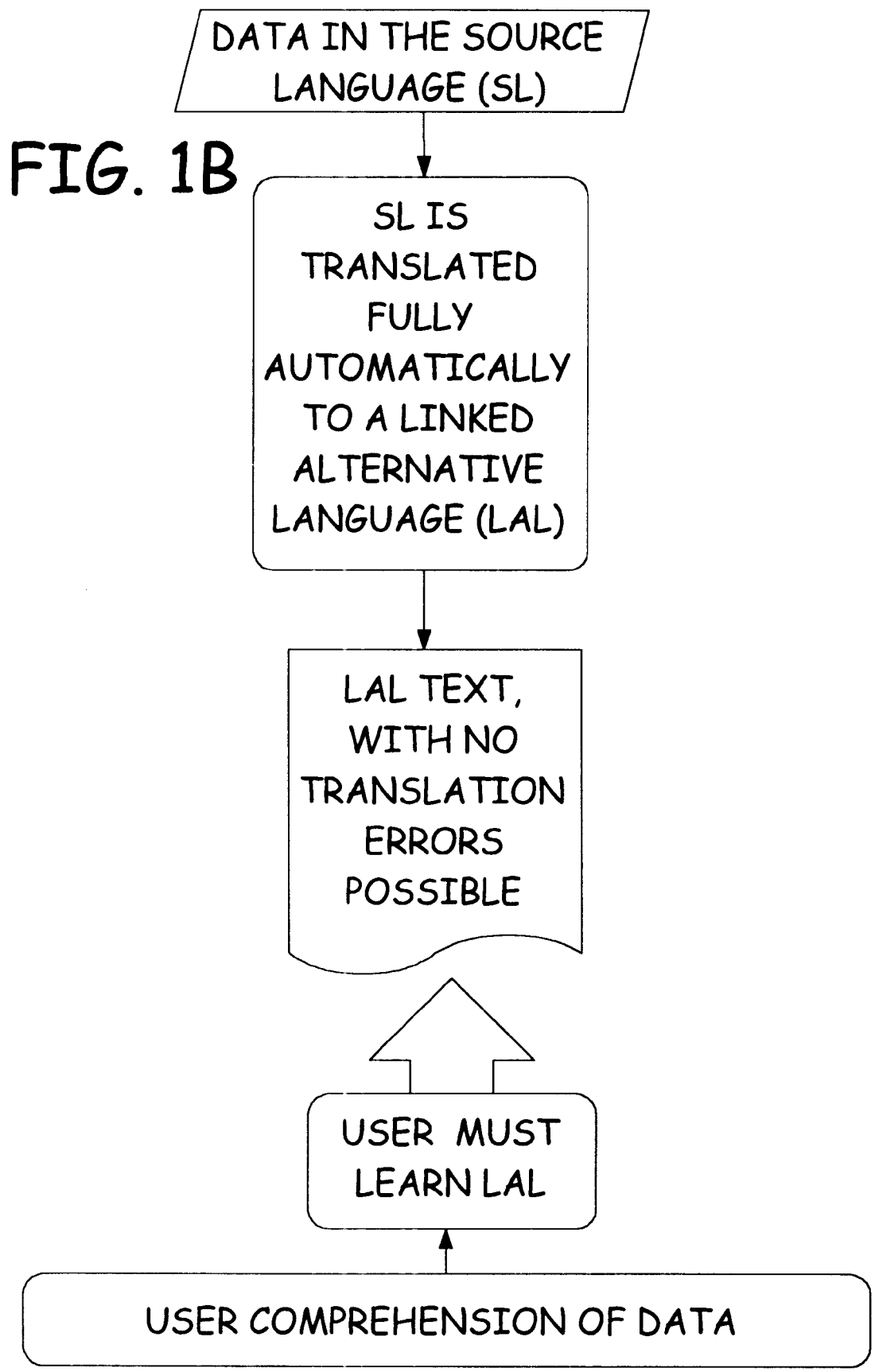

This invention centers on the gains for communication that can be achieved by the use of techniques involving specially designed "linked alternative languages." Two prior-art methods for machine translation are shown in FIG. 1A. The present invention is the first to employ a third method, use of a linked alternative language (FIG. 1B).

Figure 2C:
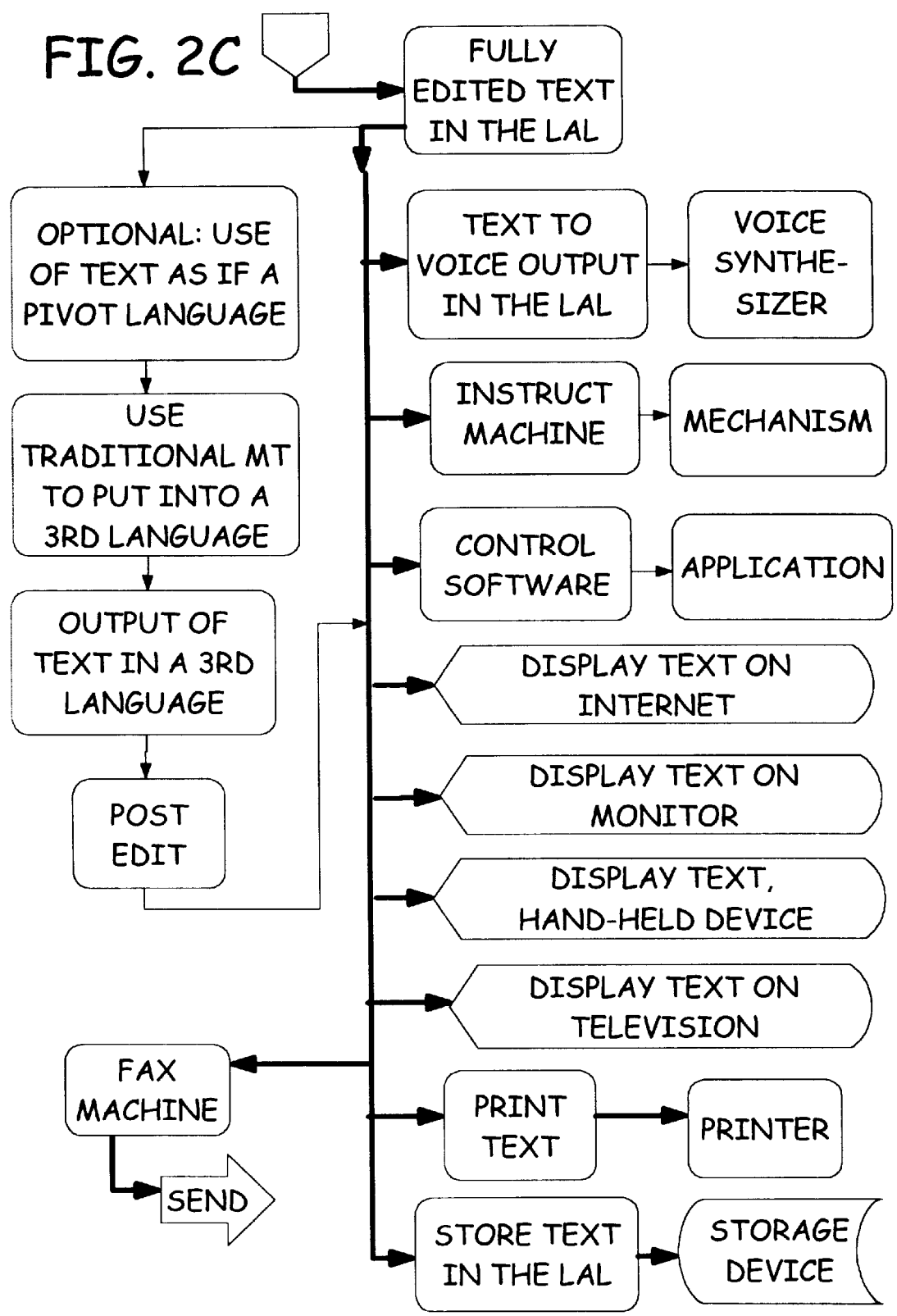
Figure 3A:
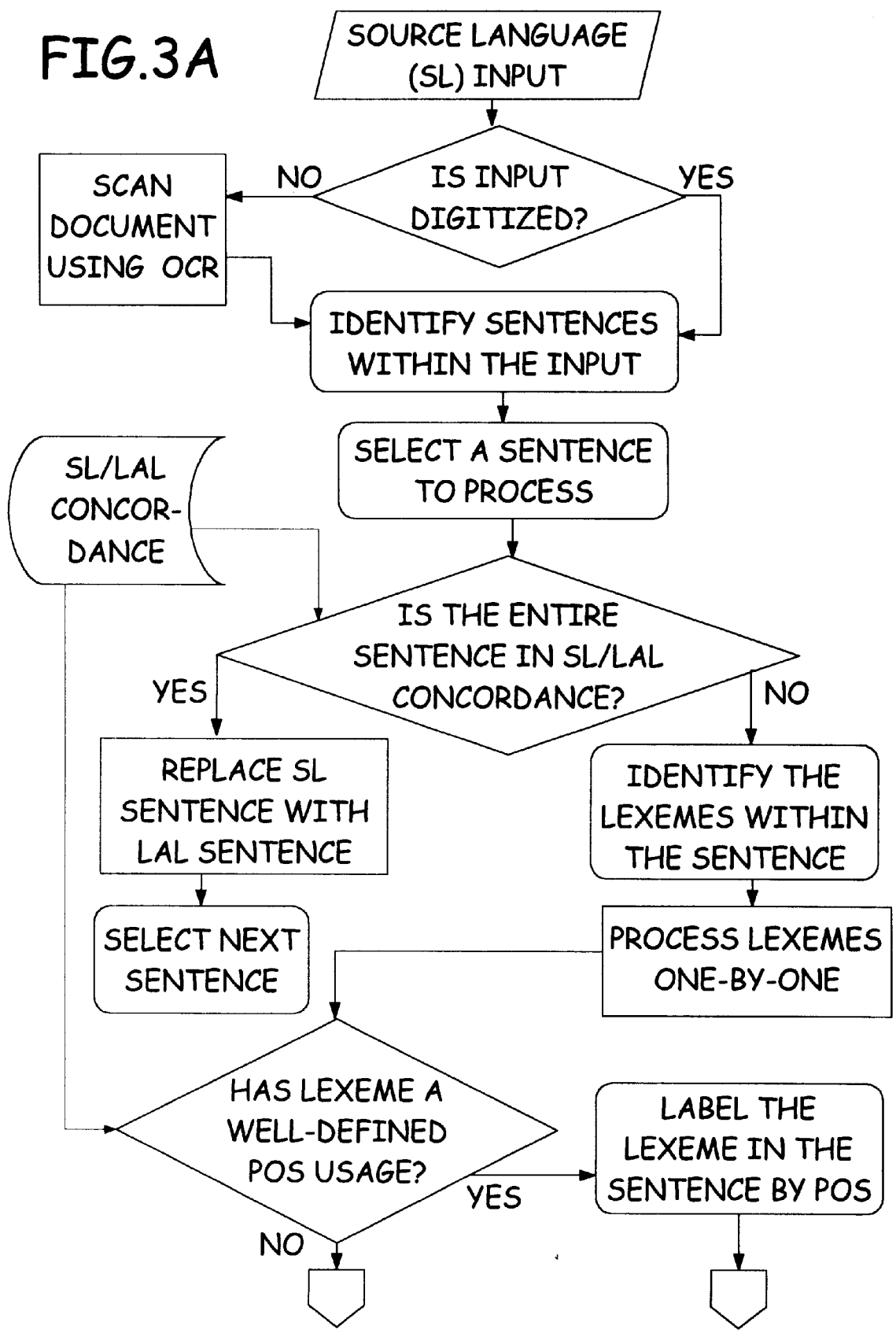
Figure 3B:
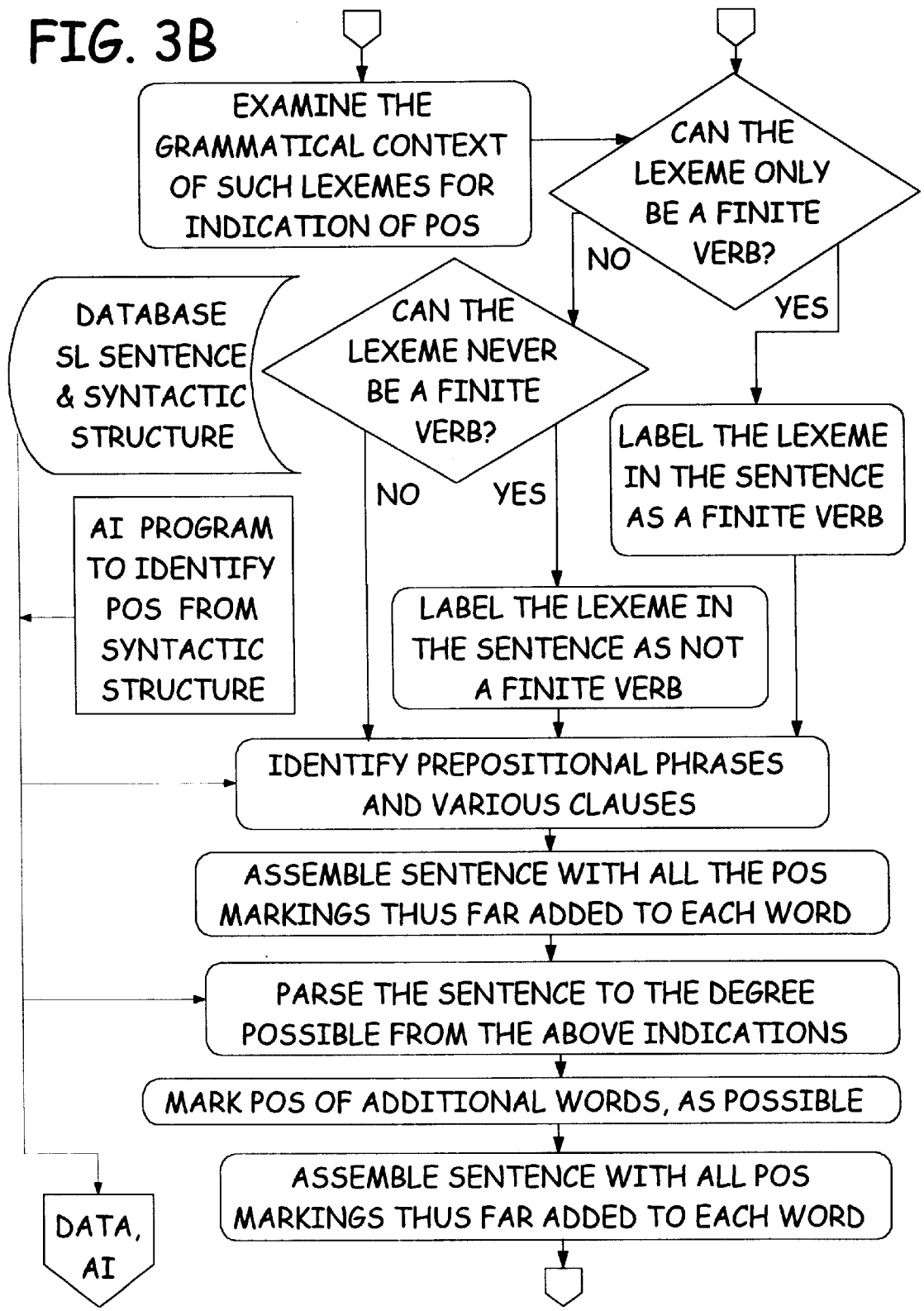
Figure 3C:
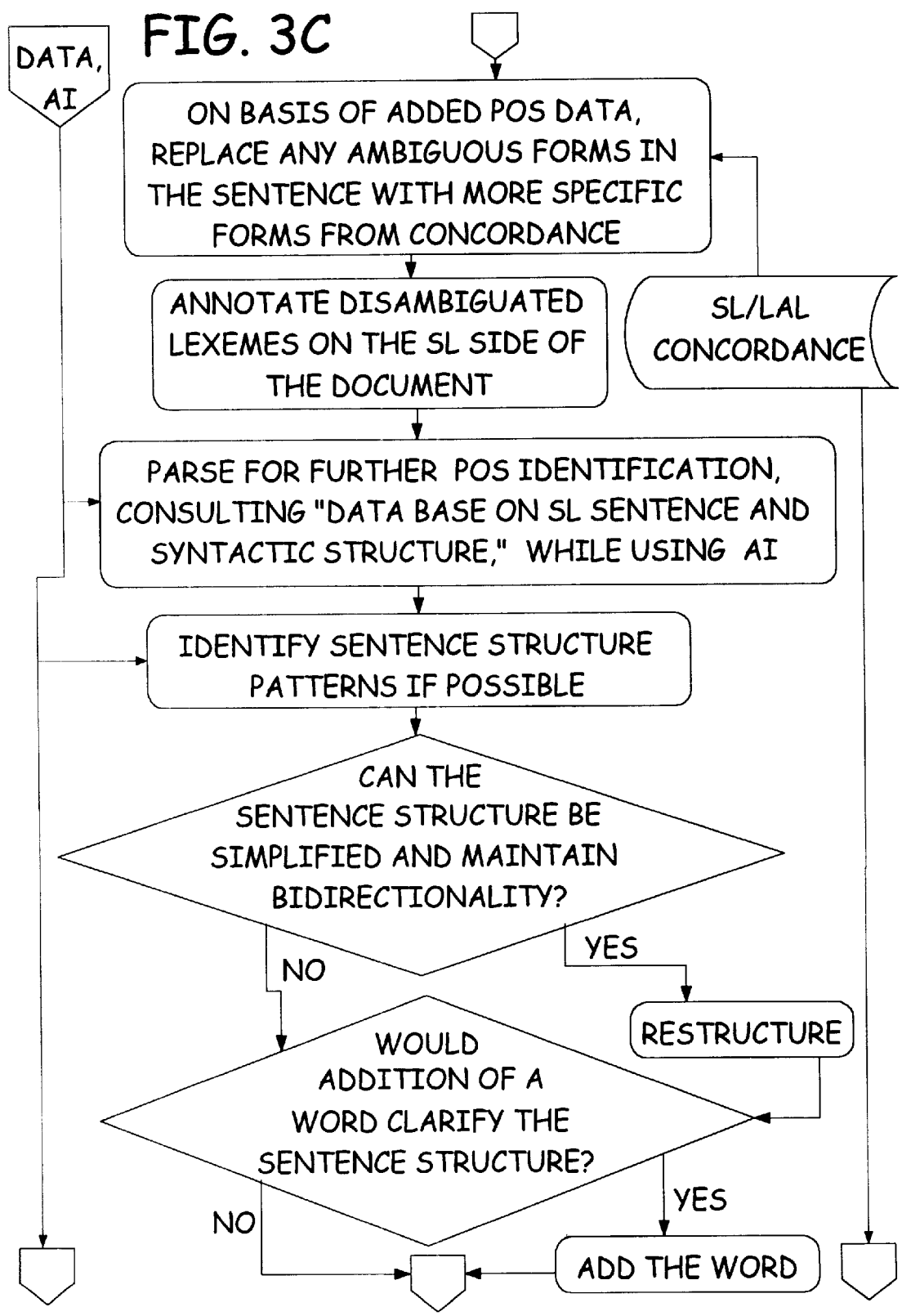

The overall method and apparatus for structuring and managing human communications by the generation and use of a linked alternative language (LAL) is illustrated in FIG. 2. The concept of linking, as used here, involves planning the LAL in such a way as to maintain fully accurate and bidirectional automatic translation with its source language (SL). The usefulness of such a system is dependent on the LAL being so designed.

The system replaces a SL vocabulary with a new vocabulary that has been optimized, i.e., reformatted into a new and/or standardized vocabulary that provides a simpler or otherwise more useful system of communication, customized to meet the identified communicative needs of a specified set of targeted users.

The specific nature of a LAL to be generated from a source language will vary, depending on the targeted users and the purposes that the LAL is to serve. In most cases, ease of learning the new form will be a major consideration. TABLE 1, below, summarizes some of the typical ways in which a LAL might be made easier to learn and use than the source language to which it is linked. These are possible design considerations and all features need not be implemented in every case.

TABLE 1

LAL features conducive to ease in learning

102 FEWER PHONEMES
104 PHONEMES EASIER TO PRONOUNCE FOR USER COMMUNITY
106 REGULAR SPELLING (A SIMPLER GRAPHEMIC SYSTEM)
108 MORE REGULAR GRAMMAR
110 MORE EASILY RECOGNIZABLE SENTENCE STRUCTURE
112 WORD ORDER MORE PREDICTABLE
114 VOCABULARY MORE REGULARLY STRUCTURED FROM MORPHEMES
116 FEWER MORPHEMES IN TOTAL VOCABULARY
118 MORPHEMES MORE FAMILIAR TO USER COMMUNITY
120 FLOW OF SPEECH EASIER TO UNDERSTAND BY USER COMMUNITY
122 DIALECTICAL DIFFERENCES MINIMIZED

TABLE 2, below, summarizes some of the typical ways in which a LAL might be made more accurate and more useful than the source language to which it is linked. There are many additional possibilities. These items listed are only possible design considerations and all features need not be implemented in every case.

TABLE 2

LAL features conducive to increased accuracy and flexibility of use compared to the SL 202 SYSTEMATIC METHODOLOGIES FOR REDUCING AMBIGUITIES
204 CLEARER MARKING OF PART-OF-SPEECH
206 MNEMONIC SYSTEMS TO SPEED DIGITAL INPUT
208 ADAPTATIONS FOR REDUCED VOCABULARY STRATEGIES
210 NEW INFORMATION MANAGEMENT CAPABILITIES
212 NEW TERMINOLOGY FOR LOGICAL STATEMENTS
214 INTEGRATION OF TERMINOLOGY FROM CULTURES BEYOND THAT OF THE SL.
216 AVOIDANCE OF OBSCURE IDIOMS
218 LOSSLESS TEXT-TO-VOICE CONVERSION IN THE LAL
220 LOSSLESS VOICE-TO-TEXT CONVERSION IN THE LAL
222 MORE RELIABLE VOICE TO MACHINE INTERFACE The capability for performing lossless translation from a source language to a linked alternative language is a key aspect of the system and requires proper design, both of the LAL and of the translation means applied. The system for choosing the methods to be applied when using artificial intelligence (AI) and the techniques of computational linguistics within the translation system provided by this invention are illustrated in FIGS. 3A–D and in Table 3, below:

TABLE 3

A method to be applied when using AI and related techniques within the fully automated translation system

| | |
|---|---|
| 300 | CREATE A DOCUMENT TAG, RECORDING SYSTEM DEFAULTS |
| 302 | IS THE MATERIAL IN DIGITAL FORM? |
| 304 | IF NOT, SCAN THE DOCUMENT BY USE OF AN OPTICAL CHARACTER RECOGNITION (OCR) SYSTEM. PROCEED WITH DIGITIZED TEXT. |
| 306 | IF TEXT IS DIGITIZED, IDENTIFY THE SENTENCES THAT EXIST WITHIN THE INPUT. (USUALLY BY PUNCTUATION.) |
| 308 | SELECT THE FIRST SENTENCE (OR THE NEXT SENTENCE, IF YOU ARE RETURNING TO THIS STEP). |
| 310 | IS THE ENTIRE SENTENCE TO BE FOUND IN THE "SLILAL CENTRAL CONCORDANCE" (312) AS A SINGLE LEXEME? |
| 314 | IF SO, REPLACE THE ENTIRE SENTENCE WITH ITS LAL EQUIVALENT AND MOVE TO NEXT SENTENCE (SEE 308). |
| 316 | IF NOT, IDENTIFY THE LEXEMES WITHIN THE SENTENCE, USING THE LIST OF STRINGS THAT ARE FILED IN THE SL/LAL CONCORDANCE (312). |
| 318 | FROM SLILAL CONCORDANCE (312), IDENTIFY ALL LEXEMES IN THE SENTENCE THAT HAVE WELL-DEFINED POS USAGES. (LABEL SUCH WORDS WITH THEIR PsOS.) |
| 320 | LABEL ALL LEXEMES WITH THEIR INDICATED POS LIMITATIONS. |
| 322 | ARE THERE ANY LEXEMES PRESENT THAT CAN ONLY BE FINITE VERBS AND NEVER ANYTHING ELSE? |
| 324 | IF SO, LABEL THEM AS SUCH. |
| 324 | ARE THERE ANY LEXEMES PRESENT IN THE SENTENCE THAT THE CONCORDANCE (312) RECORDS AS NEVER APPEARING AS FINITE VERBS? |
| 326 | IF SO, LABEL THEM AS SUCH. |
| 328 | IDENTIFY THOSE ADDITIONAL LEXEMES THAT CANNOT BE FINITE VERBS. GIVEN THEIR POSITION IN THE SPECIFIC SENTENCE. |
| 328 | EXAMINE THE IMMEDIATE GRAMMATICAL CONTEXT OF EACH LEXEME IN THE SENTENCE FOR INDICATION OF THE POS OR PSOS IT MIGHT FUNCTION AS IN THE SENTENCE. |
| 330 | BLOCK OUT (FOR PARSING) ANY PREPOSITIONAL PHRASES OR OTHER CLAUSES THAT CAN BE FIRMLY IDENTIFIED BY THE ABOVE MEANS OR BY PUNCTUATION. |
| 332 | DOES THE ABOVE PROCESS RESULT IN THE CLARIFICATION OF THE POS OF ANY ADDITIONAL TERMS? |
| 334 | IF SO, MARK THE WORDS AND REPLACE THEM WITH CLEARER LAL FORMS FROM THE CONCORDANCE (312). |
| 336 | PARSE THE SENTENCE TO THE DEGREE POSSIBLE FROM THE ABOVE AND BY THE APPLICATION OF ANY OTHER METHODS OF AI WHICH WOULD PRODUCE A RESULT THAT IS ABSOLUTELY NECESSARY TO BE THE CASE IN TERMS OF LOGIC. |
| 338 | CONSULT "DATA BASE ON SL SENTENCE STRUCTURE" (340) TO FURTHER CLARIFY PARSING AND POS IDENTIFICATION. |
| 340 | FROM THE FORGOING, IDENTIFY SENTENCE STRUCTURE PATTERNS TO THE EXTENT POSSIBLE, MARKING SUCH STRUCTURAL FACTORS AS INVERSION IN WORD ORDER THAT CARRY MEANING, AND WHICH MIGHT BE REPLACED BY LESS COMPLEX AND EASIER TO LEARN SYSTEMS IN THE LAL. |
| 342 | SIMPLIFY AND CLARIFY THE SENTENCE STRUCTURE IN THE LAL OUTPUT TO THE EXTENT MADE POSSIBLE BY THE ABOVE (AND ANY OTHER METHODS USING AI WHICH WOULD PRODUCE A LOGICALLY NECESSARY RESULT) PERHAPS BY THE ADDITION OF A WORD OR WORDS. |
| 344 | ON THE BASIS OF PARSING, IDENTIFY ANY FURTHER WORD FUNCTIONS IN THE SENTENCE THAT WOULD ALLOW RELIABLE DISAMBIGUATION OF ADDITIONAL LEXEMES IN ACCORDANCE WITH THEIR USAGE IN THE SPECIFIC SENTENCE. LABEL THEM. |
| 346 | ON THE BASIS OF THE ADDED DATA SUPPLIED BY THE LABELS, ONCE AGAIN PARSE THE SENTENCE TO THE DEGREE POSSIBLE FROM THE ABOVE AND ANY OTHER METHODS OF AI WHICH WOULD PRODUCE A RESULT THAT IS LOGICALLY NECESSARY. |
| 348 | IF THE ABOVE RESULTS IN THE CLARIFICATION OF THE POS OF ANY ADDITIONAL TERMS, MARK THE WORDS AND REPLACE THEM WITH CLEARER FORMS FROM THE CONCORDANCE (312). |
| 350 | DURING THE ABOVE STEPS, OR FOLLOWING, REVIEW EACH (LABELED) LEXEME OF THE SENTENCE. |
| 352 | IS THE LEXEME MARKED IN THE SL/LAL CONCORDANCE (312) AS "SERIOUSLY POLYSEMOUS" OR AS "HOMOGRAPHIC"? |
| 354 | IF SO, ARE ANY OF THE DISTINCTIONS POS DEPENDENT? |
| 356 | IF SO, EXAMINE THE LEXEME'S CONTEXT IN THE SENTENCE FOR ANY ASSURED INDICATION OF POS, AS DESCRIBED ABOVE. |
| 358 | IF POLYSEMY IS RESOLVABLE, GIVEN KNOWLEDGE OF THE POS, CONSULT THE CONCORDANCE (312) FOR A FORM THAT WILL DISAMBIGUATE THE MEANING. |
| 360 | REPLACE THE POLYSEMOUS OR HOMOGRAPHIC FORM WITH THE LESS AMBIGUOUS FORM. |
| 362 | APPLY TO THE TEXT ANY OTHER METHODS OF AI WHICH WOULD PRODUCE A RESULT OF VALUE IN ADDING CLARITY AND THAT WILL RETAIN LOSSLESS BIDIRECTIONAL AUTOMATIC TRANSLATION UNDER ALL CIRCUMSTANCES. |
| 364 | REMOVE ANY REMAINING UNUSED LABELS FROM THE TEXT. |
| 366 | OUTPUT THE TEXT AS TRANSLATED. |

All actions beyond 304, including the decisions indicated, are made not by a person, but by automatic mechanisms directed by the invention and which produce a lossless translation. The only limitations on the system are those that require that the input actually be in the SL chosen, i.e., not in some other language or in an un-accounted-for dialect or irregular spelling norm of the SL, that it be structured according to the grammatical rules of the SL, and that metalinguistic materials be appropriately marked as such. These are unavoidable limitations for any rational system of translation. If a text meets these minimal qualifications, it can be input into the system as SL and translated to the LAL without any pre-editing, without any in-process human query interface, and without needing any post-editing at all. Decisions taken on such marking are recorded in a footnote or "document tag."

The concept of "grammatical rules" is not a reference to concepts of "proper grammar" as may be traditional in the SL, but to grammatical sense itself. For example: "That old dog ain't got nothing" is an English statement that carries meaning and can be analyzed by means of grammatical parsing, et al. However, a jumbled string of words such as "Dog old that have does anything not" is simply not a grammatical statement in the English language.

The rule that the input text should not use "metalinguistic" terms without appropriate marking, means primarily that foreign words or SL words taken out of grammatical context and spoken of as entities should be marked in some way. Most texts do this in some way. For example, the sentence "Go and see are both shorter than anyone" is most likely to be written in some manner as the following: "'Go' and 'see' are both shorter [words] than 'anyone.'" or "Go and see are both shorter than anyone." The "document tag" will record the type of marking system being used in the document for metalinguistic inserts of this type.

Depending on the grammatical structure and other features of the SL, additional steps may be productive or otherwise called for in the above methodology, but the same care must be exercised to maintain, at all times, fully automatic and completely bidirectional compatibility between the SL and LAL. In other word, the translation must be semantically lossless.

The order and detail of the steps illustrated in FIGS. 3A–D may be varied, provided that fully automatic translation is guaranteed. It may be expeditious to apply some of the processes to larger blocks of texts than a single sentence, storing the result for later sentence-by-sentence analysis. For speed in producing an LAL translation, or for use within applications with limited capabilities, e.g., reading SL web pages on the Internet, some of the more sophisticated process mentioned above may be simplified or passed over. Options may be supplied the user by means of a menu. Texts in the LAL that have not been subjected to all available processing subsystems remain grammatically correct, although they may be expressed in terms somewhat more ambiguous or difficult in style. Such stylistic variations exist within all languages.

Note that the concept of "context" may be used in two quite different ways in describing these processes. The immediate "grammatical context" of a word is taken note of and used in the system utilized by this invention, e.g., the grammatical ending on a LAL word for the English word "crowns" may show that it is a verb when it appears in the sentence "The archbishop usually crowns the king." This is not a guess, but the only possibility that is grammatically sound. On the other hand, "thematic context" is never applied under the methodology of this invention, e.g., the word "duck" in the sentence "He saw her duck." must be left ambiguous—even if the remainder of the text makes numerous references to ducks and geese owned by a female person. A possibility of error would exist, even if remote. The system as applied by this invention allows no such possibility.

The above does not mean that authoring and editing procedures may not be made available for text enhancement and the resolution of ambiguities in the SL or LAL, with machine-aided queries proposed to a human. Such procedures are, however, optional and are not an essential part of the automatic translation system.

The following clarifications are added for the procedures outlined by FIGS. 3A–D: In step 310, examples of entire sentences that might be found in the "SL/LAL Central Concordance" (FIGS. 22A–B) would be "How are you?" or "Not on your life!" In step 318, lexemes that have well-defined part-of-speech usages might include most pronouns, prepositions, conjunctions, and many adverbs.

In respect to step 322, the Central Concordance must supply meticulously correct data on usage of alphanumeric strings in order to avoid a possible breakdown in the perfection of the system; note, for example: the common word "does" cannot be assumed to be a finite verb, since it can also be the plural of the noun "doe." The special attention paid to finite verbs in 322 and 328 is a reflection of the key role that they often play in sentence analysis.

In respect to step 328, the immediate grammatical context of a lexeme in the sentence may further clarify the part-of-speech role that it plays in the sentence. For example, the English word "crown" can be a verb—but not after the word "the." In such a position, it is a noun or adjective only.

In step 336, parsing and word labeling by part-of-speech is to be done only to the degree possible from the above and by the application of those other methods of AI which will produce a result that is absolutely necessarily the case in terms of logic, i.e., not based on probabilities, nor on any analysis of the "theme" or context of the input, nor on semantic guessing in any form.

At step 340, the effort is to identify difficult sentence structure patterns which might be replaced by less complex and easier to learn systems in the LAL. Thus a LAL might differ from English in having a word that can simply be added at the beginning of a sentence to indicate a question, and also one that can be added at the end of the sentence to replace the many forms of "tag questions" used in English.

At step 342, the objective is to clarify the sentence structure in the LAL when possible by methods using AI; this may involve the addition of a word or words. For example, the system might insert the conjunction "that" to introduce clauses where it has been omitted in English; thus one might expand "He said he would come" to the LAL equivalent of "He said that=c he would come."

It is necessary to note at step 348 that many sentences cannot be fully parsed and analyzed by the methods outlined here—or by any fully automatic method. Examples are: "Time flies," or "We saw her duck." In the automatic operation of this system, no probability analysis on the base of the proximity of other theme words is ever be applied in such cases. Such ambiguities in the SL are mirrored into the LAL if only automatic means of translation are applied. They may often be resolved, however, by the system of "invented SL words," reflecting new LAL terms coined to disambiguate the meaning in enhanced texts.

The concept of "seriously polysemous" words is mentioned a step 352. An example of this might be the English word "dove" which can be the past tense of the verb "to dive" or a noun standing for a variety of bird. If something in the sentence makes the part-of-speech usage clear, it may be possible to resolve such ambiguities by automatic means. However, many polysemous usages cannot be resolved by the above methods—or by any fully automatic method using AI. For example: "The bat flew out of his hand." cannot be translated into Spanish without knowing more about the kind of "bat" involved. The word "bat" could be a flying mammal or something in the nature of a baseball bat—both singular nouns. No clue in the sentence clarifies this. In the automatic operation of the system used by this invention, no probability analysis on the basis of the text's presumed topic or the proximity of "key words" is ever mechanically applied.

This invention can apply to the text any other methods of AI which would produce a result of value in adding semantic clarity (362), provided that the methodology used will guarantee lossless and bidirectional automatic translation between SL and LAL under all circumstances and without human interface. (The term AI as used here will be taken to include all automatic systems of analysis that can be applied to a text, including those of computational linguistics.)

Figure 4A:
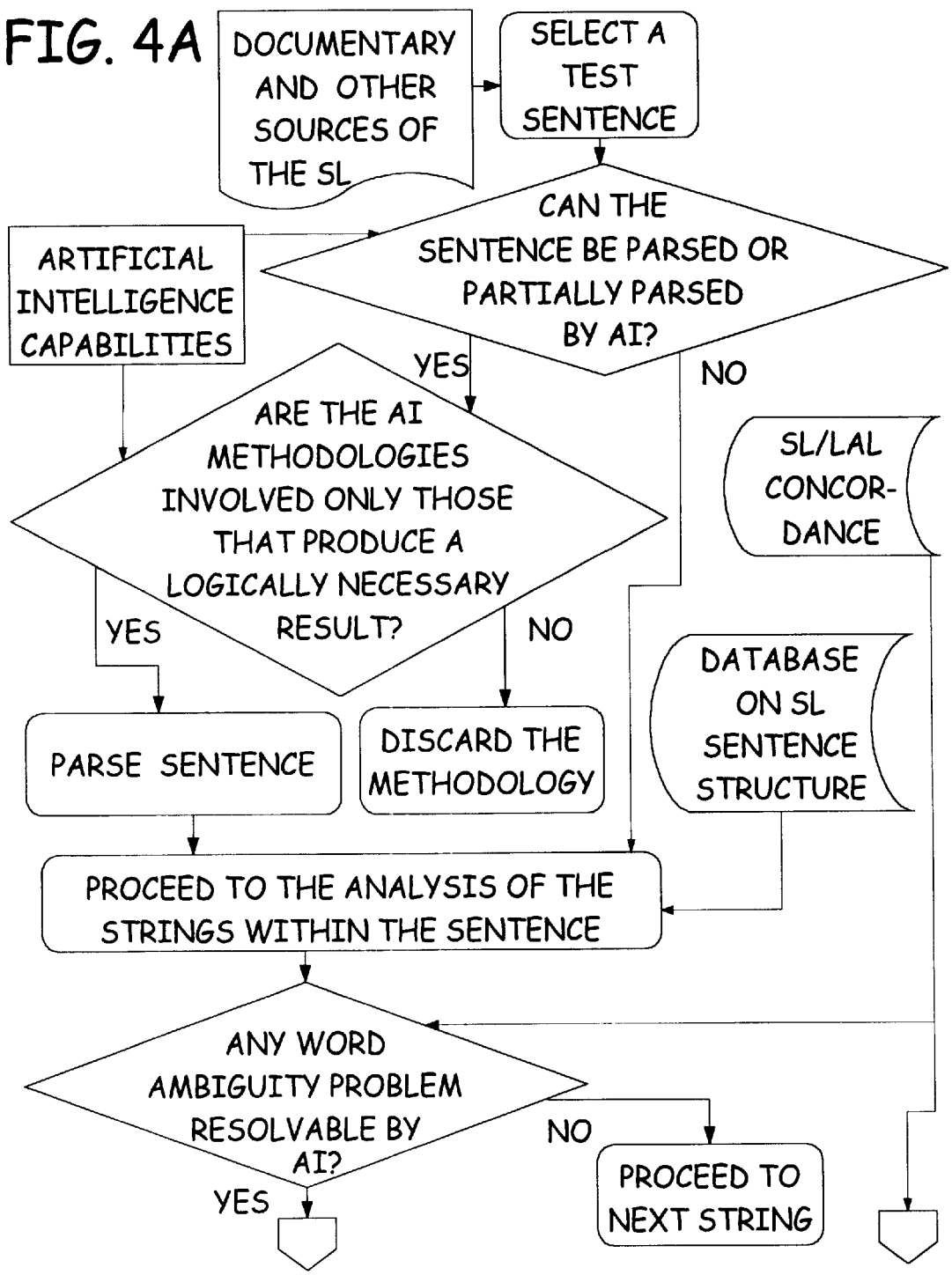
FIGS. 4A–C form a diagram explaining the criteria and methods for evaluating the specific artificial intelligence (AI) and computational linguistics techniques that are to be applied to the translation process when designing and using a linked alternative language (LAL).
Figure 4B:
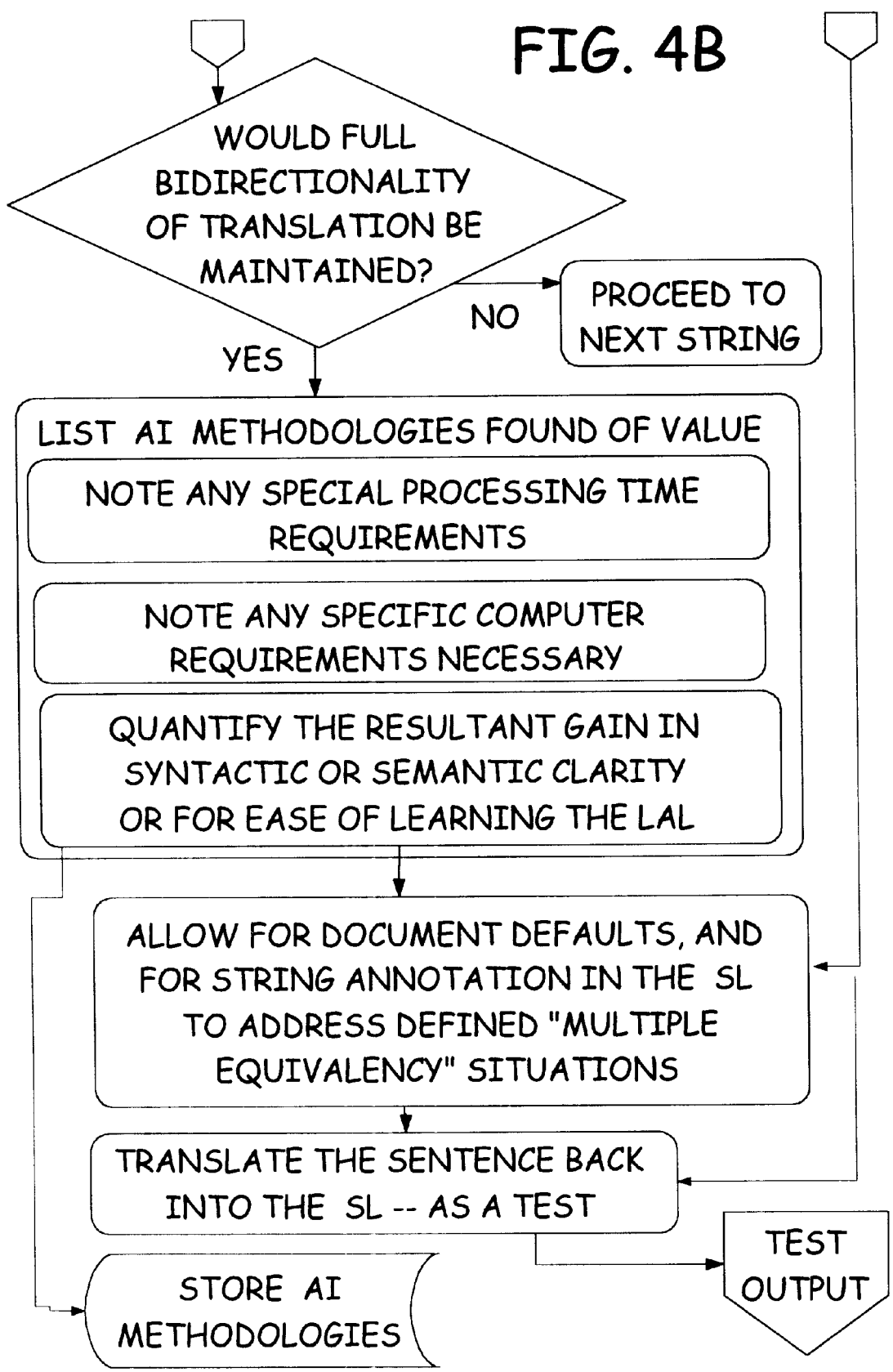
Figure 4C:
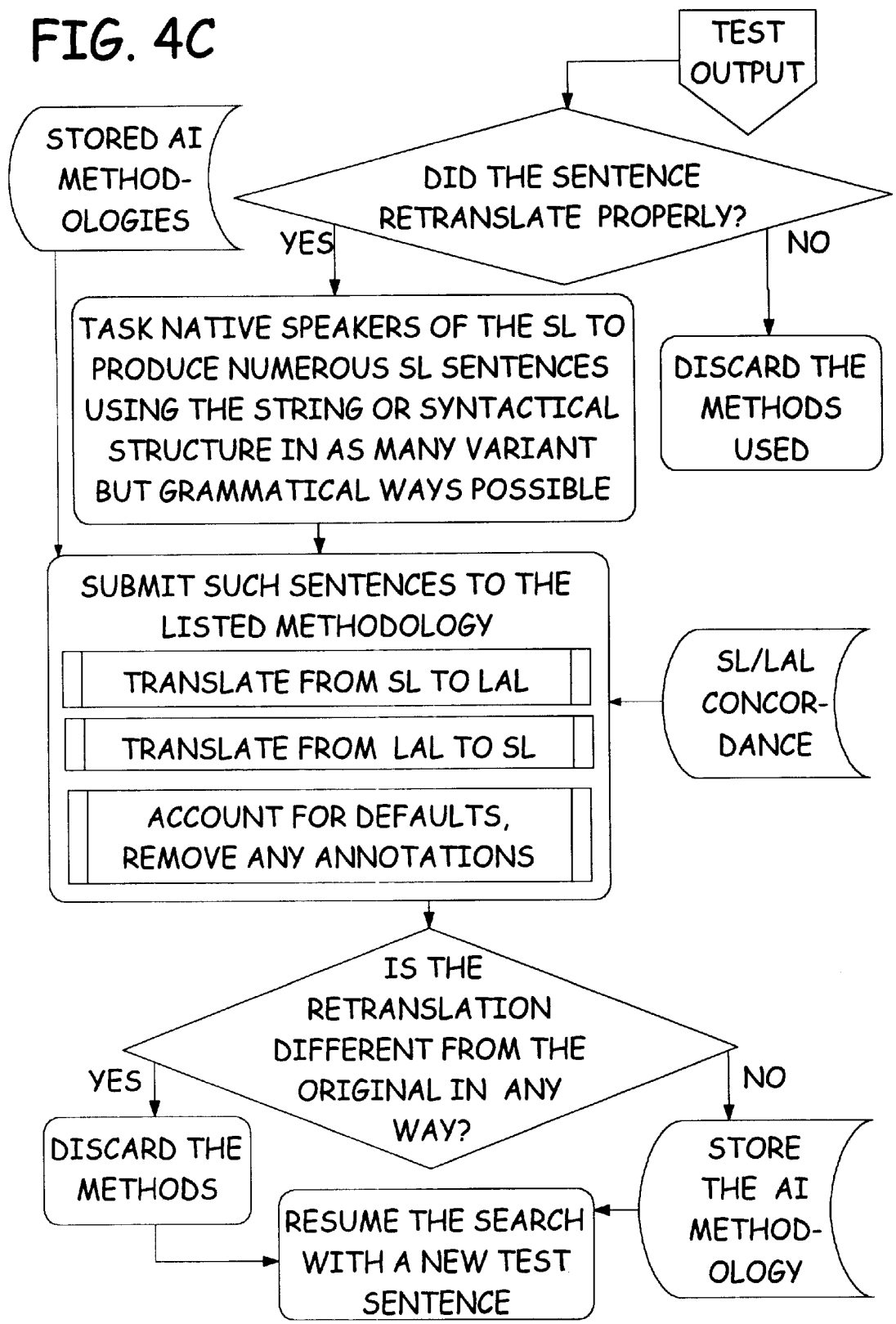

A principal feature of the methodology used in this invention is the imposition of very specific pre-determined strictures on the types of artificial intelligence that are to be employed and the circumstances of that employment in the translation process. No other invention in the field of MT specifies such strictures. Criteria and methods for evaluating the specific techniques of artificial intelligence (AI) that may be applied to the translation process are illustrated in FIGS. 4A–C and more fully described in Table 4:

TABLE 4

Criteria and methods for evaluating what AI techniques shall be applied to the translation process:

| | |
|---|---|
| 402 | CAN THE SBNTENCE BE PARSED OR PARTIALLY PARSED BY THE USE OF AI (INCLUDING THEREIN THE METHODS OF COMPUTATIONAL LINGUISTICS)? |

TABLE 4-continued

Criteria and methods for evaluating what AI techniques shall be applied to the translation process:

| | |
|---|---|
| 404 | IF NOT, PROCEED TO THE ANALYSIS OF THE STRINGS WITHIN THE SENTENCE. |
| 406 | IF SO, IS THE AI PROCESS BEING USED SUCH THAT IT CANNOT UNDER ANY CONCEIVABLE CIRCUMSTANCE RESULT IN INCORRECT PARSING? |
| 408 | IF NOT, APPLY ONLY THOSE PROCESSES THAT WILL LEAD TO COMPLETELY RELIABLE PARSING. |
| 410 | PROCEED TO THE ANALYSIS OF THE STRINGS WITHIN THE SENTENCE. |
| 412 | IS THERE A PROBLEM OF WORD AMBIGUITY IN THE SENTENCE THAT CAN BE RESOLVED BY ANY OF THE TECHNIQUES OF AI? |
| 414 | IF NOT, PROCEED TO THE NEXT STRING. |
| 418 | IF SO, IS THE AI SOLUTION SUCH THAT IT CANNOT UNDER ANY CONCEIVABLE CIRCUMSTANCE RESULT IN A MISTRANSLATION? |
| 420 | IF MISTRANSLATION IS AT ALL CONCEIVABLE, PROCEED WITHOUT APPLYING M TO THE ANALYSIS OF THE STRING. |
| 422 | IF MISTRANSLATION APPEARS LOGICALLY IMPOSSIBLE, LIST AND LABEL THE SPECIFIC AI METHODOLOGY FOUND OF VALUE, NOTING THE PROCESSING TIME NEEDED, COMPUTER REQUIREMENTS, AND QUANTIFYING THE RESULTANT GMN IN CLARITY OR EASE OF LEARNING OF THE LAL. |
| 424 | TRANSLATE THE SENTENCE BACK INTO THE SOURCE LANGUAGE. |
| 426 | IF MEANING IS DISTORTED IN ANY WAY, NO MATTER HOW SLIGHTLY, DISCARD THE LISTED METHODOLOGY AND START THE PROCEDURE OVER. |
| 428 | IF THE SENTENCE RETRANSLATES PROPERLY, TASK NATIVE SPEAKERS OF THE LANGUAGE TO PRODUCE NUMEROUS SENTENCES USING THE STRING OR STRUCTURE IN AS MANY DIFFERENT WAYS AS POSSIBLE (THESE MAY BE QUITE EXOTIC AND BIZARRE, BUT MAY NOT BE UNGRAMMATICAL.) |
| 430 | SUBMIT SUCH SENTENCES TO THE LISTED METHODOLOGY, RETRANSLATING THE RESULTS BACK TO THE SL. |
| 432 | IF MEANING IS DISTORTED IN ANY WAY, NO MATTER HOW SLIGHTLY, DISCARD THE LISTED METHODOLOGY AND START THE PROCEDURE OVER. |
| 434 | IF THE RBSULTS ARE SATISFACTORY, THE METHODOLOGY IS ACCEPTED FOR THE SYSTEM. |

The automatic translation system is designed on the basis of considerations such as those listed in the above table. This is a machine-based evaluative process, one which takes place during the creation of the system. Persons knowledgeable in AI and computational linguistics are evolved in the evaluation. The design of such a system involves testing alternative processes by automatic means.

All the methodologies that are accepted for the system need not be applied in every translation process. Options may also be offered by menu. The time element, system memory, and other factors may be considerations. A text in the LAL that is the result of the application of only part of the AI methodologies that are found acceptable is still a proper and fully grammatical text in the LAL.

REDUCED VOCABULARY SYSTEMS

For certain potential usages, sub-sets of a LAL with reduced (smaller) vocabularies would be useful. Multinational corporations and industries often feel the need to create their own "controlled languages" to better govern operations. Graded vocabularies for learners and children can be established and supported by optional programs. A "document tag" attached to the text would record the form of reduced vocabulary applied to the text. For simplicity, however, only one sub-set of a reduced vocabulary system is described here: A model of a reduced vocabulary form for adults, using a vocabulary of 1200 words, and called here the "Little Language" (LL). As a sub-set of the LAL, it would, of course, map to a sub-set of the SL as well.

Figure 5A:
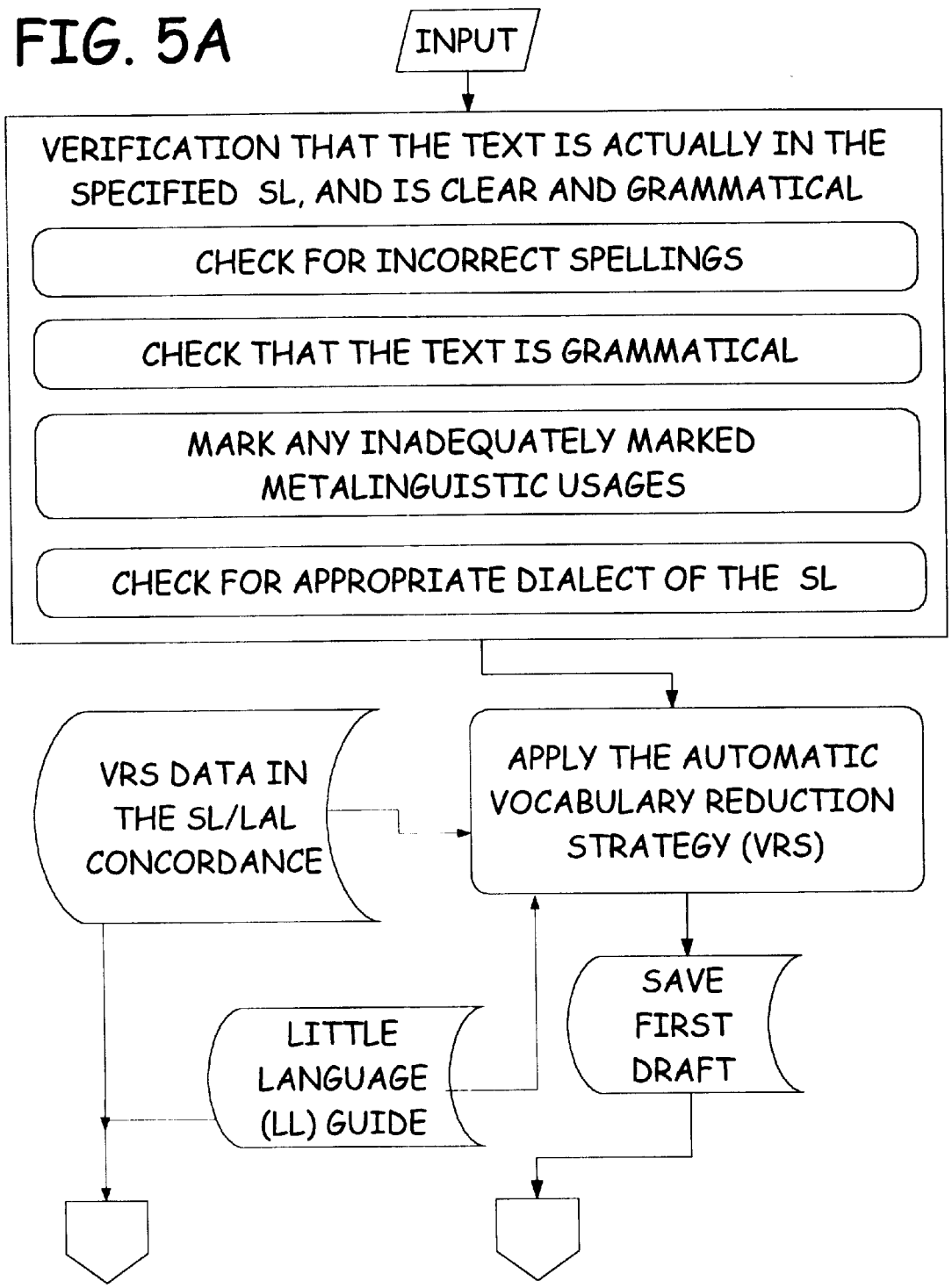
FIGS. 5A–C form a diagram explaining a possible set of procedures for authoring texts under a reduced vocabulary strategy; the example is a sub-set of a LAL, called the "Little Language" (LL).
Figure 5B:
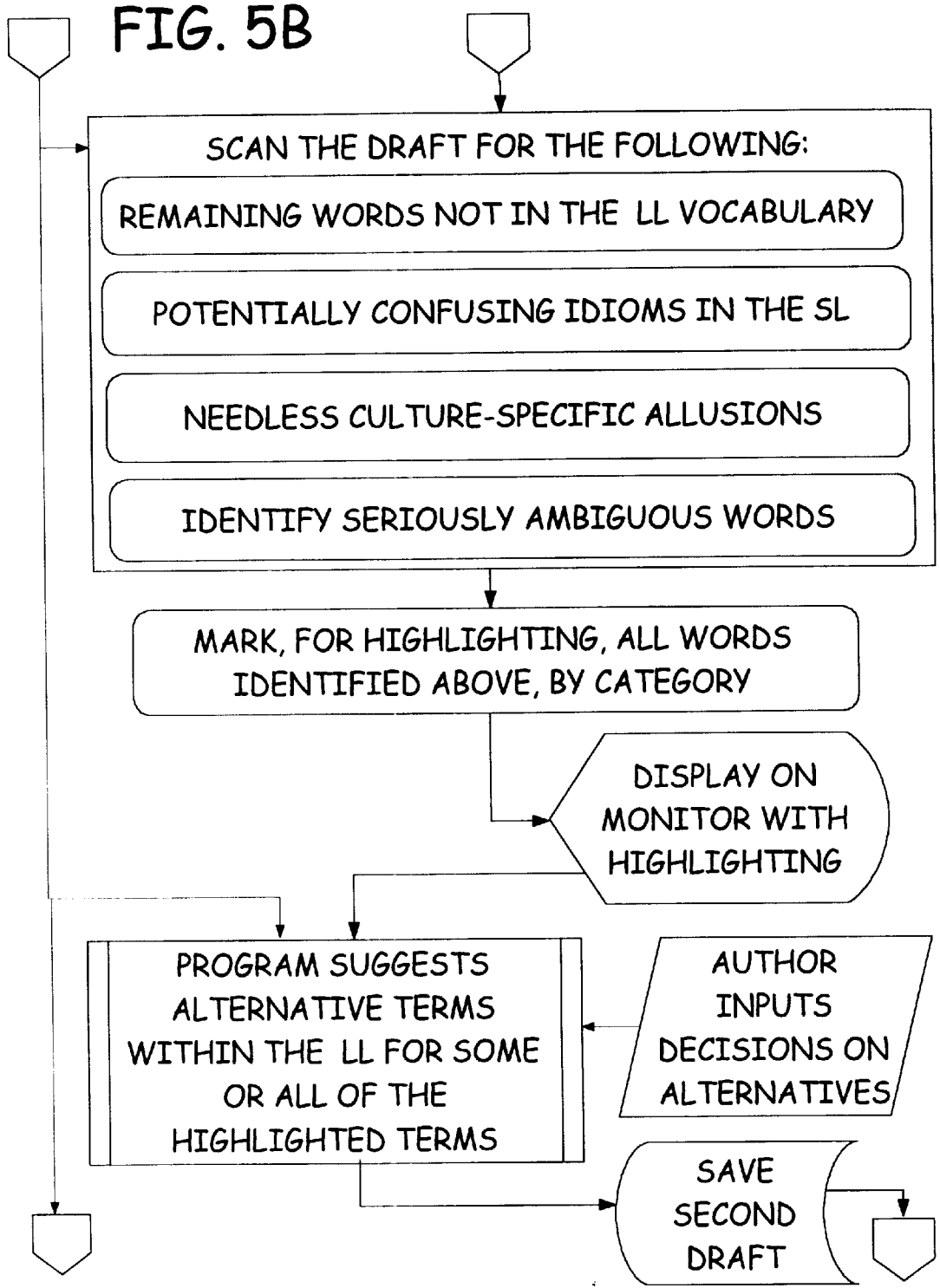
Figure 5C:
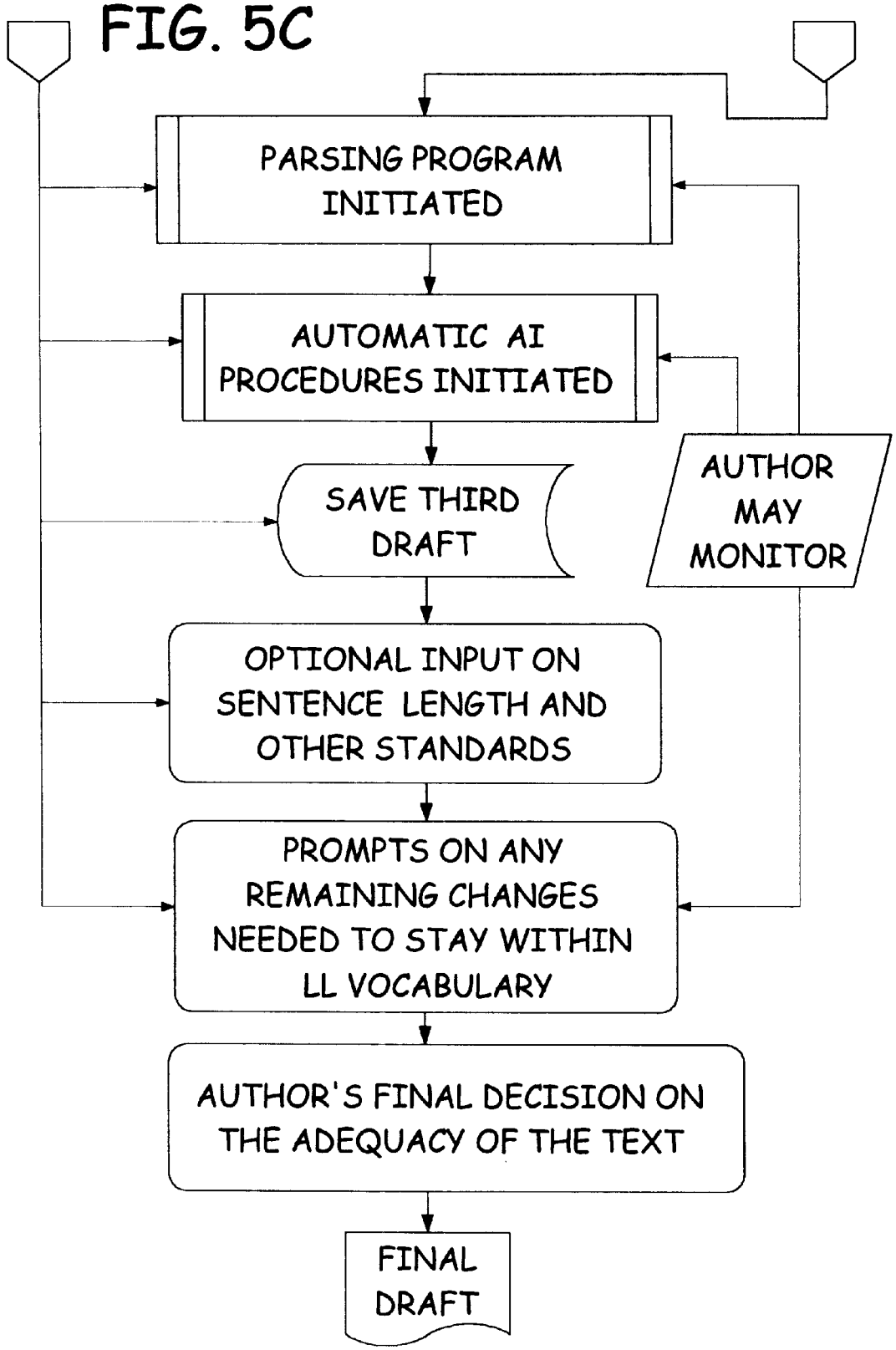
Figure 9B:
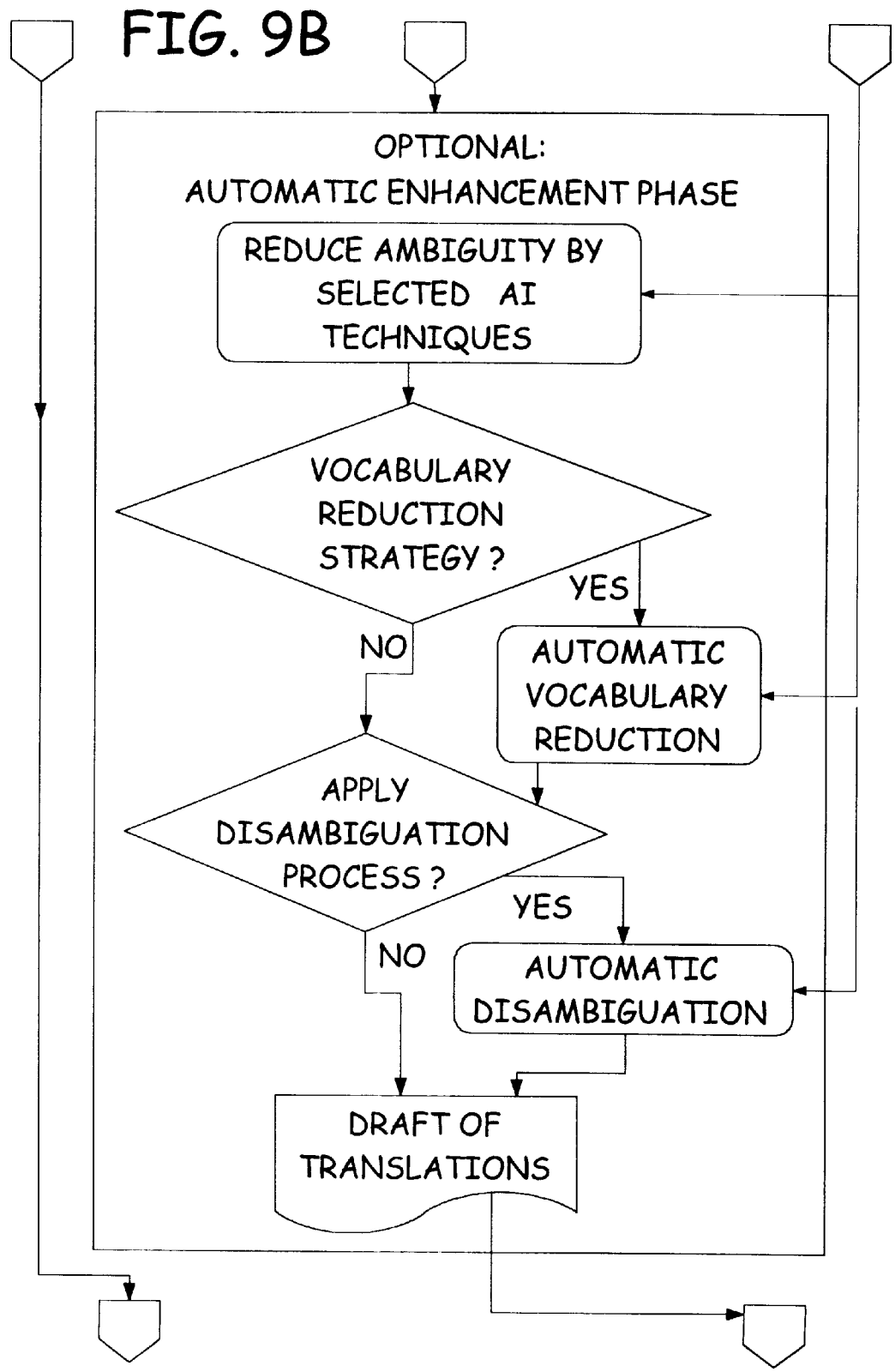
Figure 9C:
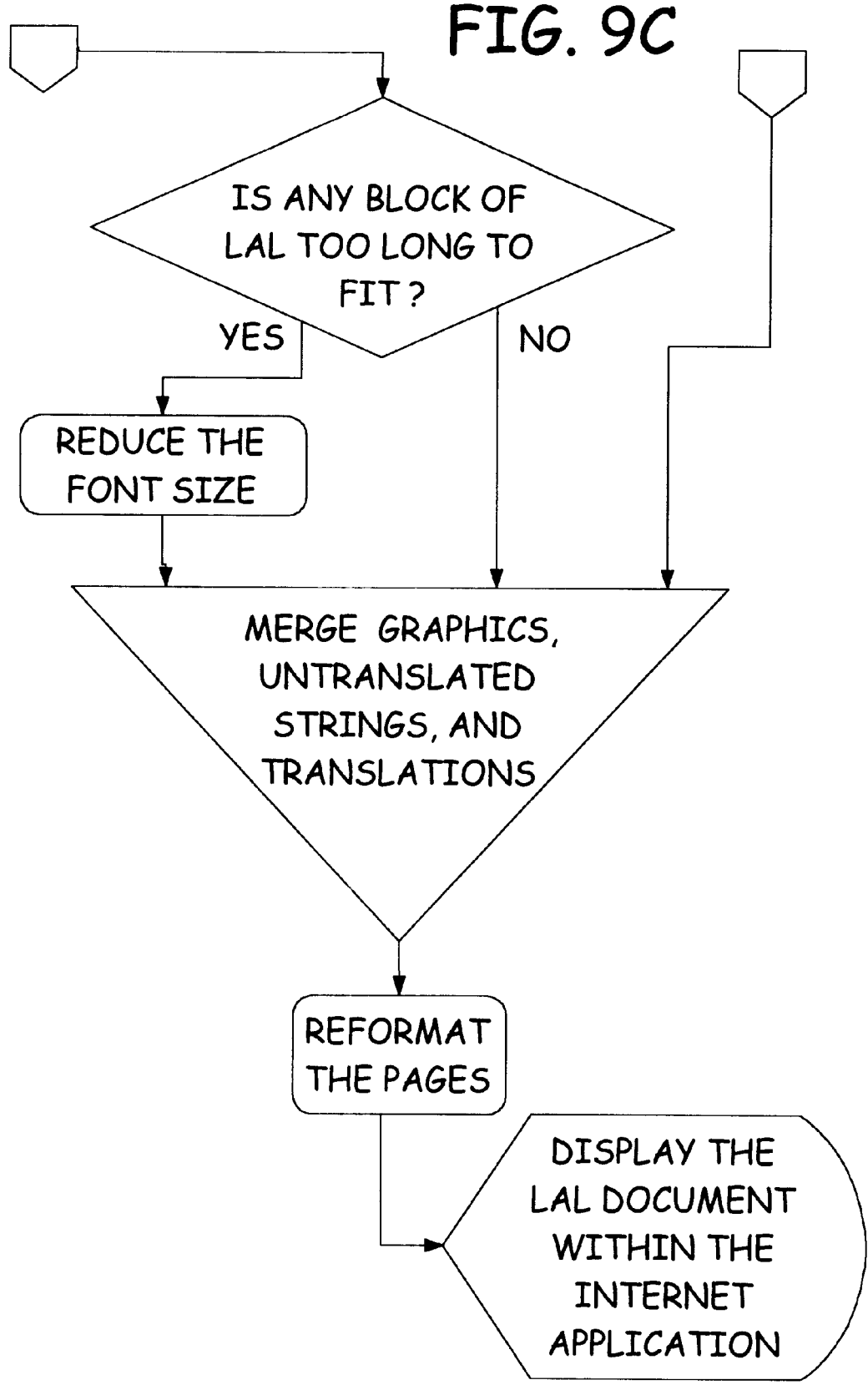

A specific program for authoring texts in the Little Language would be useful for persons drafting abstracts of scientific articles for international audiences, for those preparing web pages advertising products globally, for those writing e-mail, and for others wishing to transmit basic information on the Internet. The program could be used in conjunction with the Internet Translator (FIGS. 9A–C). A possible set of procedures for authoring texts in the "Little Language" (LL) is diagramed in FIGS. 5A–C, and described below. If done on the Internet (for example, while drafting e-mail), the process can be performed sentence by sentence. The exact order of many of these steps can be altered without affecting the program, i.e., FIGS. 5A–C and Table 5, below, are illustrative in nature.

TABLE 5

A Procedure for Authoring in the "Little Language"

| | |
|---|---|
| 502 | INPUT OF TEXT IN STANDARD SL |
| 504 | APPLY THE AUTOMATIC VOCABULARY REDUCTION STRATEGY (VRS), USING THE 37 VRS DATA" IN THE SL/LAL CENTRAL CONCORDANCE (506) |
| 508 | AUTHOR MAY CHOOSE TO MONITOR EACH ACTION TAKEN UNDER 504 |
| 510 | FIRST REVISION SAVED |
| 512 | SCAN DRAFT FOR WORDS THAT ARE NOT IN LL, CONSULTING "LL HANDBOOK" (514) AND/OR THE SL/LAL CONCORDANCE (506) |
| 516 | SCAN DRAFT FOR ILLOGICAL SL IDIOMS, CONSULTING AN APPENDIX TO THE LL HANDBOOK (514) AND/OR SL/LAL CONCORDANCE (506) |
| 518 | SCAN DRAFT FOR NEEDLESS CULTURE-SPECIFIC ALLUSIONS, CONSULTING THE SLILAL CONCORDANCE (506) |
| 520 | HIGHLIGHT ALL WORDS IDENTIFIED UNDER 512 516 518. |
| 522 | DISPLAY RESULTING TEXT ON MONITOR, HIGHLIGHTING PERHAPS IN CODED COLORS |
| 524 | PROGRAM SUGGESTS ALTERNATIVE TERMS TO DISAMBIGUATE SOME OF THE HIGHLIGHTED WORDS OR PHRASES |
| 526 | AUTHOR INPUTS HIS DECISIONS IN RESPECT TO 524 AND MAKES ANY OTHER DESIRED CHANGES |
| 526 | SECOND REVISION SAVED |
| 528 | SENTENCE PARSING, OR PARTIAL PARSING IS INITIATED TO HELP IN DISAMBIGUATION AND REPLACEMENT PROCESS -- BY AI-BASED PROGRAM |
| 530 | APPLY AUTOMATICALLY SUCH AI PROCEDURES AS WILL REPLACE CERTAIN WORDS WITH WORDS FROM LL VOCABULARY BY AI-BASED PROGRAM |
| 532 | AUTHOR MAY CHOOSE TO MONITOR EACH ACTION TAKEN UNDER 530 |
| 534 | THIRD REVISION SAVED |
| 536 | BASED ON PRE-SELECTED OPTIONS, AUTHOR MAY BE INFORMED OF POSSIBLE GRAMMATICAL ERRORS IN THE TEXT, OF SENTENCES BEYOND A CHOSEN LENGTH, AND OF SENTENCE STRUCTURES THAT MIGHT BE SIMPLIFIED. |
| 538 | AUTHOR IS PROMPTED ON ANY REMAINING CHANGES THAT MUST BE MADE TO STAY WITHIN LL VOCABULARY |
| 540 | FINAL DECISIONS BY AUTHOR ON ADEQUACY OF TEXT |
| 542 | FINAL MACHINE SCAN OF THE TEXT TO ASSURE THAT NO WORDS OUTSIDE THE LL VOCABULARY APPEAR |
| 544 | IF NONE APPEAR, TEXT IS OUTPUTTED. |

The term "LL Guide" is used here to describe a database dealing with the LL that can work as an on-line program and which contains lists of alternative replacements for many common SL words in order to stay within the limited and more explicit (i.e., less ambiguous) vocabulary of the LL. The LL Guide would constitute a reduced vocabulary database, centered on a limited "LL list" of words (in the example given, 1200 words) within which the user should constrain a text to be translated. The "LL Guide" might also have:

(1) a list of words not within the LL list, paired to words which are within the LL list and which may be used to replace them, (2) paired sets of longer strings of alphanumeric characters representing multiword portions of texts of data, chosen so that string replacement will result in sentences in which words in the LL list will appear instead of words not in it, (3) paired sets of linked strings of alphanumeric characters which will allow for the replacement of portions of a text with new portions which will contain fewer ambiguous words and phrases, and (4) additional translation rules for the specific implementation of the reduced vocabulary strategy.

OPTIONAL ENHANCEMENT

Figure 6C:
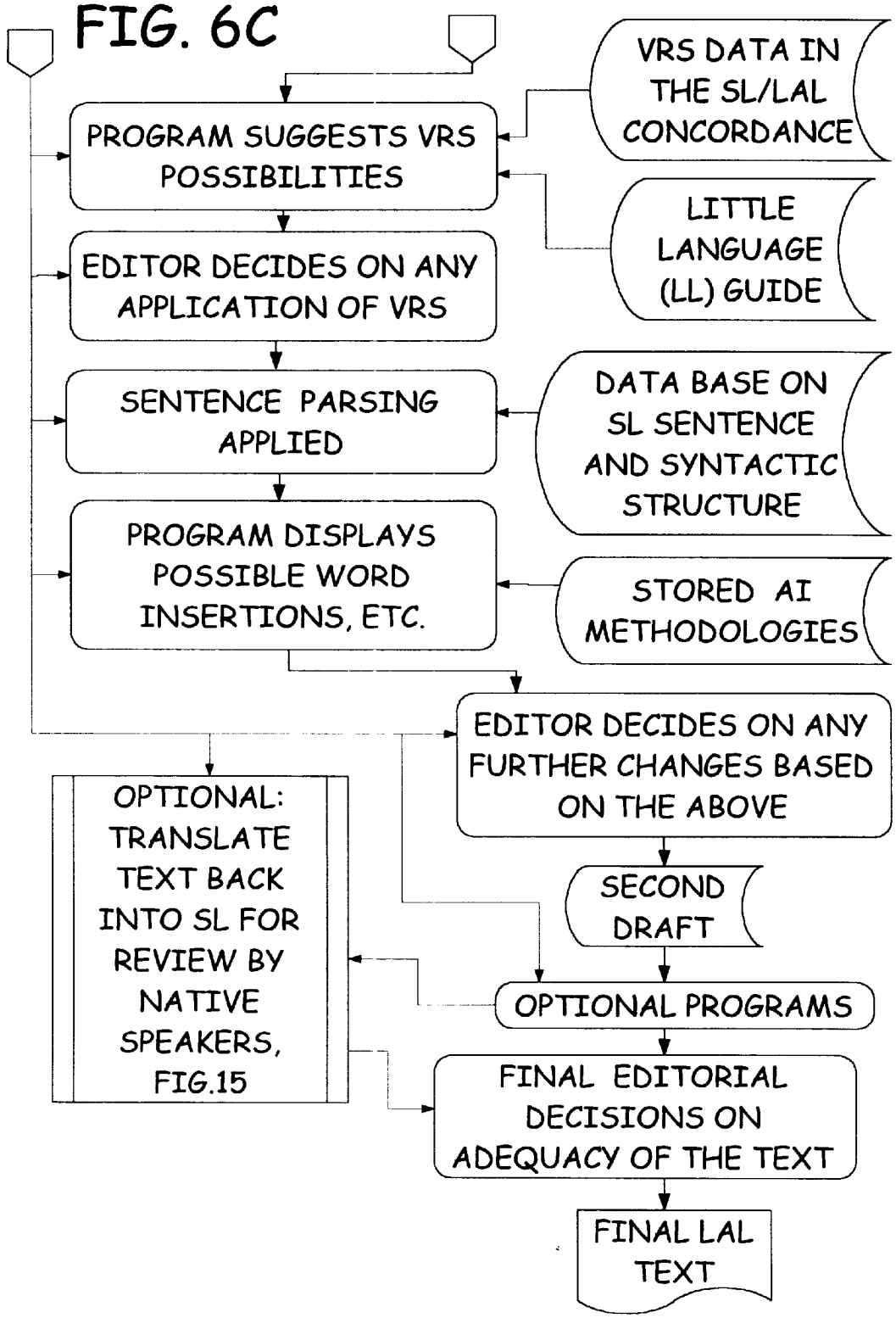

Optional procedures for editing and otherwise enhancing the semantic quality of texts and documents as they are translated from the SL to the LAL are shown in FIGS. 6A–C and detailed in Table 6 below. The exact order of these steps can be altered without affecting the program. Other traditional editing steps, such as spell checking, can be added.

TABLE 6

A Procedure for editing and enhancing documents in the translation process from SL to LAL:

| | |
|---|---|
| 602 | INPUT OF A DIGITIZED DOCUMENT WRITTEN IN SL OR LAL |
| 604 | IF DOCUMENT IS ALREADY IN LAL, TRANSLATE IT TO THE SL, USING THE FULLY AUTOMATIC SYSTEM DESCRIBED ELSEWHERE. |
| 606 | SCAN THE SL DOCUMENT, CONSULTING THE SL/LAL CENTRAL CONCORDANCE (608) TO IDENTIFY WORDS WITH THE FEATURES MENTIONED BELOW IN 610, 616, 622, 624, 626, 628, AND 630. |
| 610 | SEARCH FOR WORDS IN DIALECT, FOREIGN LANGUAGE, OR OTHERWISE UNUSUAL IN THE SL, BRINGING THESE TO THE ATTENTION OF THE EDITOR |
| 612 | EDITOR MAKES DECISIONS ON HANDLING OF MATTERS IN 610 |
| 614 | OPTIONALLY, CREATE AND FILE A FOOTNOTE OR DOCUMENT TAG EXPLAINING THE TREATMENT OF DIALECT AND RELATED ISSUES |
| 616 | ESTABLISH A LIST OF PROPER NOUNS OCCURRING IN THE DOCUMENT |
| 618 | CREATE A LIST OF HOW THESE PROPER NOUNS ARE TO BE HANDLED DURING TRANSLATION, ESPECIALLY THOSE THAT ARE NOT LISTED IN THE CONCORDANCE (608) |
| 620 | CREATE AND FILE A FOOTNOTE OR DOCUMENT TAG EXPLAINING THE TREATMENT OF PROPER NOUNS |
| 622 | IDENTIFY ALL WORDS THAT CAN BE EITHER VERBS OR NOUN/ADJECTIVES |
| 624 | IDENTIFY ALL OTHER WORDS THAT CAN HAVE ALTERNATIVE POS FUNCTIONS THAT MIGHT BE CLEARER IF MORE EXPLICIT |
| 626 | IDENTIFY ALL WORDS LABELED IN THE CONCORDANCE (608) AS "SERIOUSLY AMBIGUOUS" |
| 628 | IDENTIFY ILLOGICAL OR OTHERWISE DIFFICULT SL IDIOMS |
| 630 | IDENTIFY NEEDLESS CULTURE-SPECIFIC ALLUSIONS |
| 632 | EDITOR IS PRESENTED SERIALLY WITH ALTERNATIVE EXPRESSIONS AS LISTED IN THE CONCORDANCE (608) FOR SUCH ITEMS AS IDENTIFIED IN 622, 624, 626, 628, AND 630 -- |
| 634 | EDITOR INPUTS HIS DECISIONS IN RESPECT TO 632 AND MAKES ANY OTHER DESIRED CHANGES |
| 636 | FIRST DRAFT SAVED |
| 638 | PROGRAM DISPLAYS POSSIBLE CHANGES UNDER THE VOCABULARY REDUCTION STRATEGY (VRS), USING THE "VRS DATA" IN THE SL/LAL CONCORDANCE (608) |
| 640 | EDITOR CHOOSES ANY ACTION TO BB TAKEN TO REPLACE WORDS UNDER 638 |

TABLE 6-continued

A Procedure for editing and enhancing documents in the translation process from SL to LAL:

| | |
|---|---|
| 642 | THE PROGRAM DISPLAYS THOSE WORDS THAT MIGHT BE REPLACED IN THE REDUCED VOCABULARY "LL FORMAT" BY CONSULTING THE "LL HANDBOOK" (644) |
| 646 | SENTENCE PARSING, OR PARTIAL PARSING MAY BE INITIATED TO HELP IN DISAMBIGUATION AND REPLACEMENT PROCESS -- BY AI-BASED PROGRAM |
| 648 | RESULTS OF 634 ARE PRESENTED TO THE EDITOR, ALONG WITH POSSIBLE CHANGES |
| 638 | EDITOR DECIDES FROM OPTIONS PRESENTED IN 636 |
| 640 | EDITOR MAY CHOOSE NOT TO IMPLEMENT EVERY POS DISAMBIGUATION POSSIBILITY, AND MAY EVEN IMPLEMENT A PROGRAM THAT WILL ADD A RANDOM ELEMENT TO SOME SUCH ACTIONS, SUBJECT TO EDITORIAL REVIEW. |
| 642 | SECOND DRAFT SAVED |
| 644 | BASED ON PRE-SELECTED OPTIONS, PROGRAM MAY INFORM THE EDITOR OF POSSIBLE GRAMMATICAL ERRORS IN THE TEXT, OF SENTENCES BEYOND A CHOSEN LENGTH, AND OF SENTENCE STRUCTURES THAT MIGHT BE CLARIFIED 646 FINAL DECISIONS MADE BY EDITOR ON ADEQUACY OF TEXT |
| 648 | THIRD DRAFT SAVED |
| 650 | EDITOR MAY WISH TO TRANSLATE THE TEXT BACK INTO THE SL IN ORDER TO READ IT (OR HAVE OTHERS READ IT) IN THAT FORM -- IN ORDER TO CHECK FOR ANY INADVERTENT ERRORS. |
| 652 | IF NONE APPEAR, TEXT IS OUTPUTTED. |

The optional enhancement process described above differs from others provided by this invention in that it is in part a human-assisted program. It produces a document that is even more explicitly clear than would be the case with the fully automatic translation system. This process is one that might be used during the translation of longer texts such as literary works, text books, and reference materials, but it is an option for any use of the system. Its value for instructional materials in industry, such as repair manuals and operational handbooks provide it with many of the benefits of "controlled languages" sometimes developed by corporations and industries to meet the same needs. With modification, such editing systems can also be used in the creation of controlled languages, including LAL versions that are subsets of English.

Used along with a LL program, these enhancement procedures allow for editing documents for children or in graded form with reduced (constrained) vocabularies for learners of either the SL or LAL. Much heavier editing than that indicated would be required for the translation of poetry, if meter or rhyme is to be a consideration; but the enhancement procedure described above would still be useful to suggest alternatives. The "document tag" would record the LAL version or subset.

TEXT ENHANCEMENT AND TRANSLATION TO THIRD LANGUAGES

A text in a linked alternative language which has undergone the above mentioned enhancement procedure will have more semantic content and will be easier to translate into "third languages" (target languages other than the SL or LAL) by traditional MT methodologies or otherwise than will the original text in the SL. A substantially enhanced text in a LAL based on English will, for example, have more explicit semantic content; and will be easier to translate into other existing languages such as Spanish, Japanese, or Russian by traditional MT methodologies (or by human translators) than will the original English. It will never translate less accurately.

In fact, the linked alternative language approach used by this invention can be used in four ways to translate between natural languages that are not its source language:

1. A linked alternative language may be used as a pivot language for translation between its source language and any additional target language.
2. A linked alternative language may be used as a pivot language for translation between a natural language which is not its source language and any additional target language.
3. The linked alternative language method may be used as a means for translating between any of a plurality of languages by creating a linked alternative language for each of said plurality of languages and then translating between those linked alternative languages.
4. The scope of the linked alternative language may be held within the constraints of a delimiting template format, allowing it to apply only to preselected and formatted "communicative texts."

While each of these approaches has its limitations, they do supply additional possibilities for dealing with the linguistic barriers to international communication. Moreover, these approaches are seen as less marginal, once one assumes that at some future date a LAL similar to that proposed as a preferred embodiment will already be in use, i.e. that an LAL linked to English will be devised and available for worldwide use. Then that LAL language, especially as enhanced, would clearly be preferable to English as a pivot language in, say, translating between Indonesian and Swahili—and could be substituted for English in any such double translation. Moreover, a translation program between that LAL and, say, Japanese would be easier than with English itself; and the efficiency of the system could be further improved by creating a similar LAL linked to Japanese as an intermediate step. Nevertheless, such a system will not provide language-wide automatic lossless machine translation between English and Japanese, for such is impossible by any means. (When the qualification "language-wide" is removed, some such translation may be accomplished within the constraints of the delimiting template system, described here.)

The enhancement process creates a new stylistic form of the language. This is especially the case when human editing is involved. The incorporation of a randomizing procedure into such editing is done to avoid the possibility of LAL users feeling that they must learn two sub-dialects of the LAL: the enhanced/edited form and the unedited form. In fact, the differences are only those of style and chance selection of terms from a vocabulary that allows options. All natural languages provide such alternatives.

THE OPTIMIZING PROCESS

Figure 7:
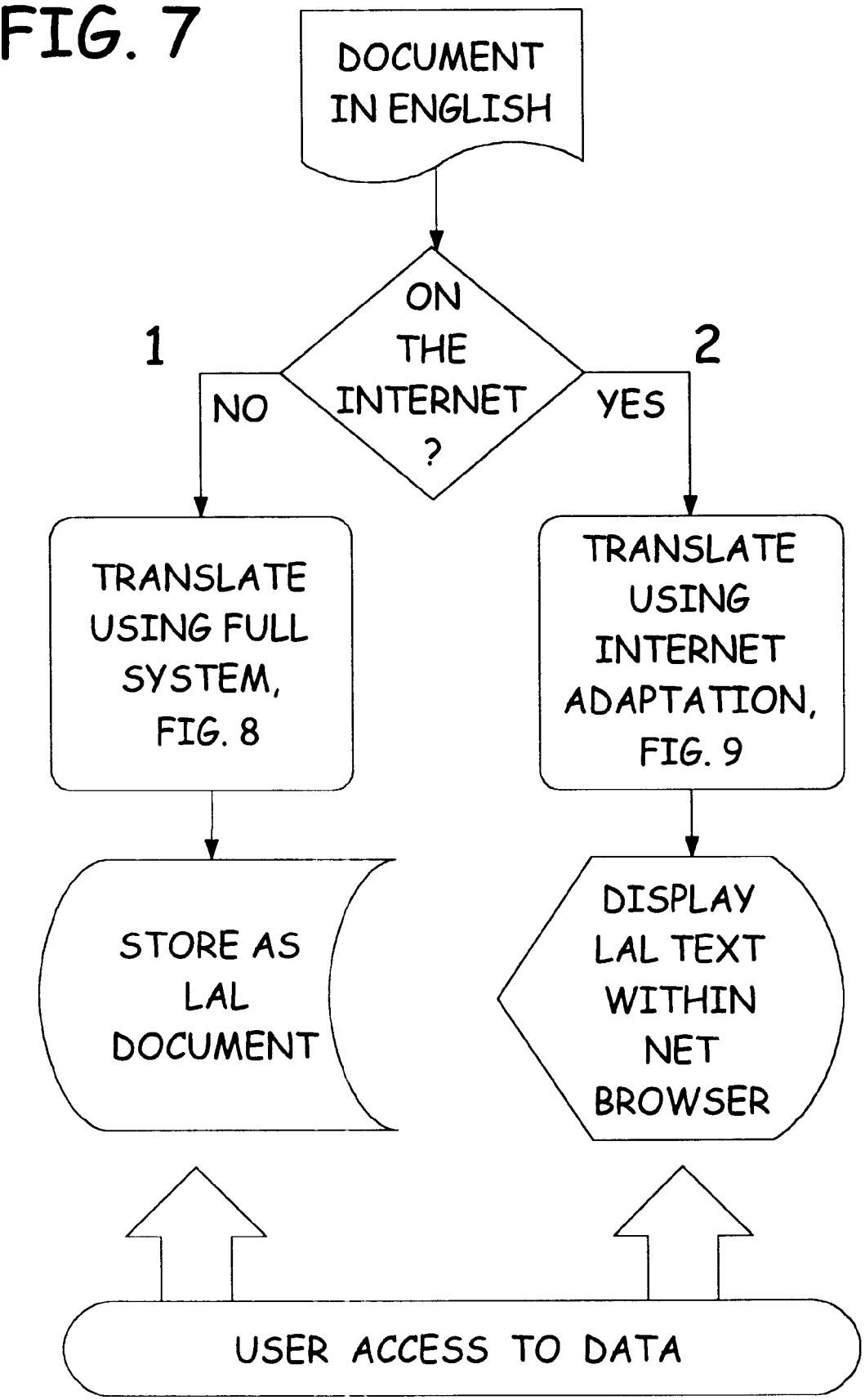
FIG. 7 describes the implementation of two forms of the preferred embodiment of the invention (using English as the source language, and designing a LAL for global usage).
Figure 8A:
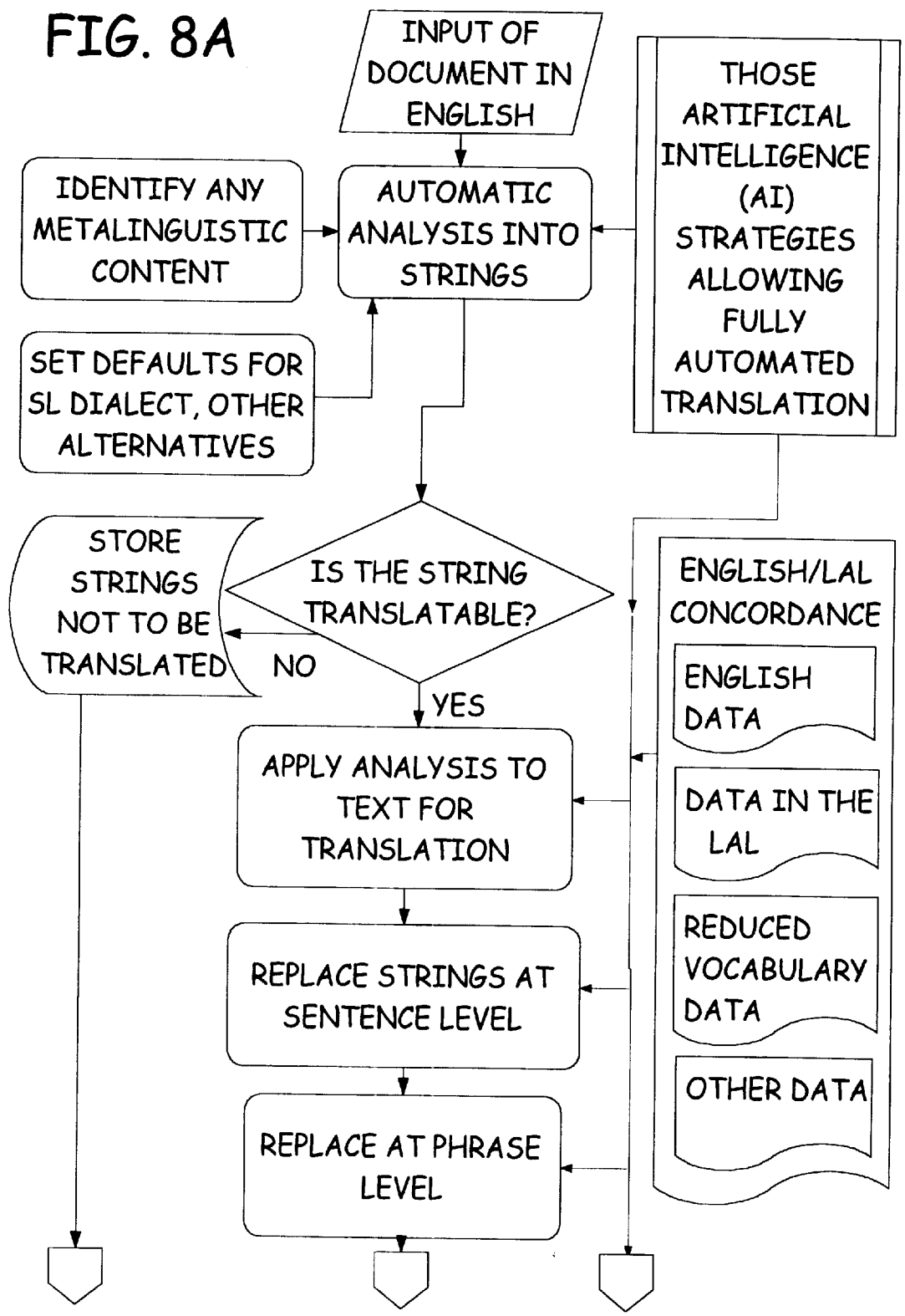
Figure 8B:
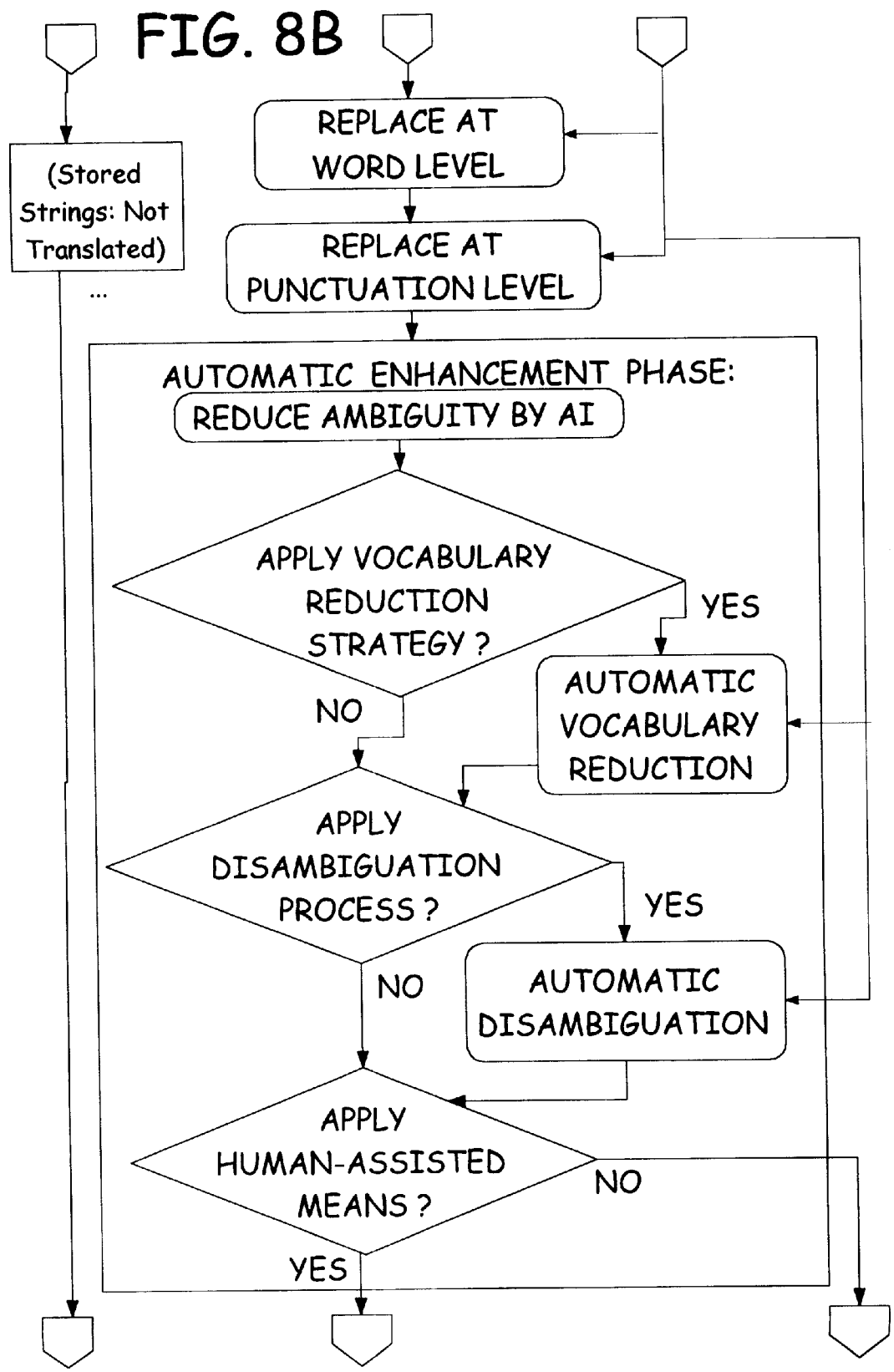
Figure 8D:
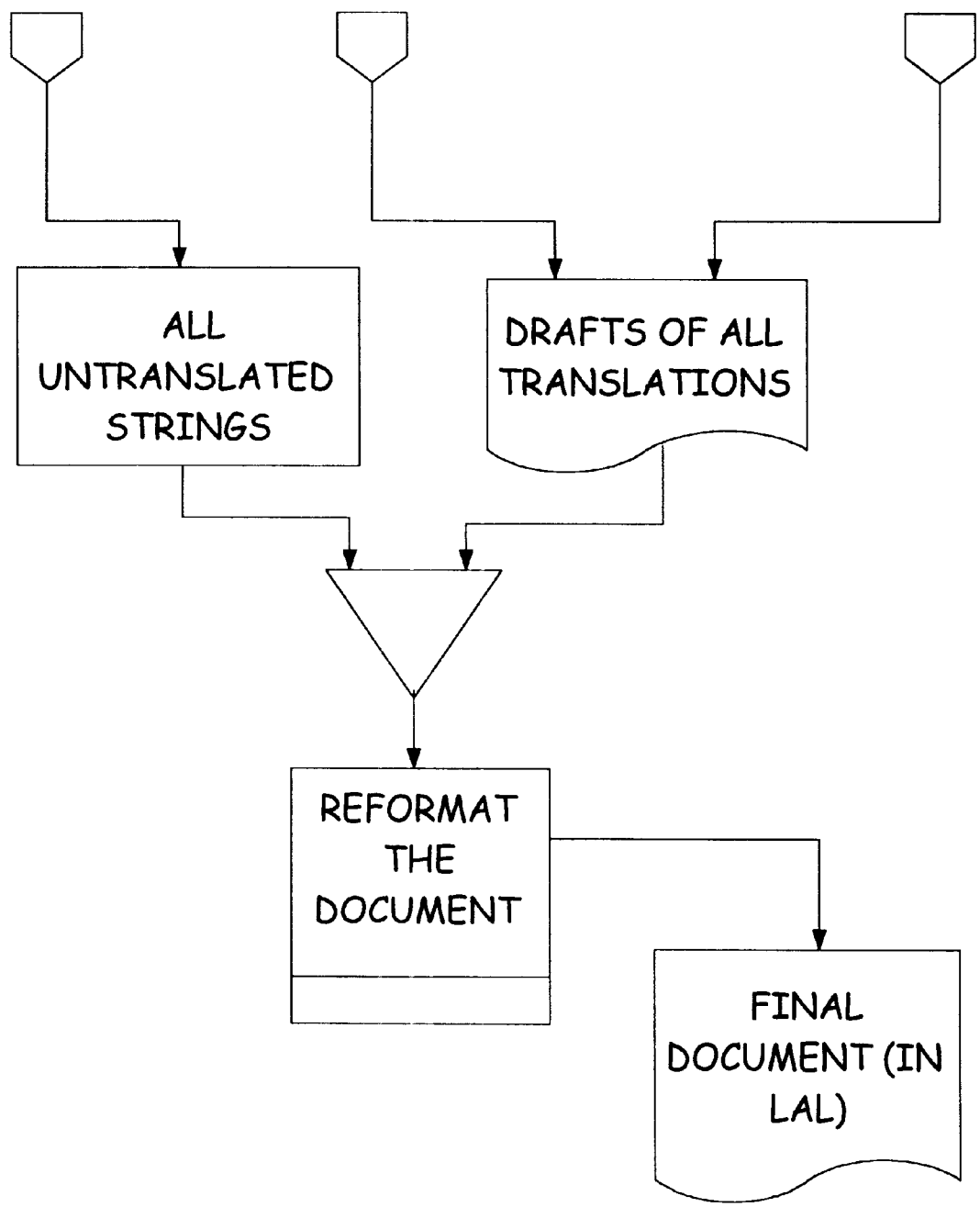

Optimizing can take a variety of forms. Procedural steps such as might be taken in optimizing a source language (such as English) into a LAL for worldwide use are illustrated in FIG. 7 and described below in TABLE 7. The steps need not always be completed in the exact order given, many require recursive application, and "optimization" may be taken as an unending process.

Some steps in the optimization process can be accomplished by automatic processes; others require human decision and design. The letter H to the right in TABLE 7 indicates that the process is likely to be conducted by a human being (someone knowledgeable in language matters). The letter M indicates that it can be done at least in part by machine methods (for example, by means of a computer). The appearance of both letters indicates a mix.

TABLE 7

Table of illustrative steps in optimizing a source language for international communication

| | | |
|---|---|---|
| 702 | DEFINE THE SL TO BE OPTIMIZED | H |
| 704 | MINIMIZE ANY DIALECT PROBLEMS WITHIN THE SL, UNIFYING FORMS AND ALTERNATIVE SPELLINGS | H |
| 706 | PROVIDE SIMPLE PHONETICS, OPTIMIZED TO AVOID PRONUNCIATION ERRORS | H |
| 708 | PROVIDE SIMPLE GRAPHEMICS FOR THE LAL, FOR OPTIMIZING DIGITAL INTERFACE ON THE INTERNET | H |
| 710 | SELECT MORPHEMES THAT ARE MAXIMALLY GLOBAL IN FAMILIARITY AND USAGE | H |
| 712 | SELECT CERTAIN MORPHEMES FROM WIDELY-SPOKEN FAR DISTANT FROM THE SL | H |
| 714 | MONITOR THE ESTHETICS OF THE EMERGING LAL FORMS | H |
| 716 | REPLACE SL MORPHEMES WITH THOSE SELECTED IN STEPS 710–714, CREATING A MORE RECOGNIZABLE VOCABULARY | M |
| 718 | APPLY STEPS 706 AND 708 TO THE RESULTS OF 716 | M |
| 720 | ASSURE THAT WORDS GENERATED BY 718 DO NOT CONTAIN SETS THAT ARE LIKELY TO BE CONFUSED DUE TO SIMILARITY IN SOUND | MH |
| 722 | DESIGN A SIMPLE SYSTEM OF WORD ENDINGS THAT WILL CLARIFY POS TO THE DEGREE POSSIBLE | M |
| 724 | APPLY STEP 722 TO THE RESULTS OF STEPS 718–20 THUS ENHANCING THE CLARITY OF ALL LAL TEXTS OVER THOSE IN THE SL | MH |
| 726 | DESIGN A SET OF CLEAR AFFIXES FOR WORD BUILDING AND SYSTEMATIC MORPHEMIZATION | H |
| 728 | APPLY 726 TO 724, RE-MORPHEMIZING MANY WORDS, MAKING THEM EASIER TO LEARN | M |
| 730 | REDUCE THE TOTAL NUMBER OF MORPHEMES IN THE SYSTEM BY SEMANTIC ANALYSIS OF VOCABULARY | H |
| 732 | ADD VARIANTS OF WORDS THAT WILL CLARIFY POS | H |
| 734 | ADD NEW WORDS NEEDED FOR DISAMBIGUATION | H |
| 736 | ADD NEW WORDS THAT FILL AN EXPRESSED NEED, FOR EXAMPLE, THE ADDITION OF NON-SEXED PRONOUNS | H |
| 738 | ASSURE THAT LAL VOCABULARY IS MAXIMALLY CAPABLE OF ADJUSTING TO INTERNATIONAL SCIENTIFIC NOMENCLATURE | H |
| 740 | ADD NEW WORDS FROM CULTURAL TRADITIONS BEYOND THAT OF THE SL, INTEGRATING THEM INTO THE LAL VOCABULARY | H |
| 742 | PROVIDE A MORE NEUTRAL AND THUS MORE ACCEPTABLE INTERCULTURAL ASPECT TO THE SL, BY 736, AND OTHER MEANS | H |
| 744 | ADD WORDS NEEDED TO EXPRESS SYMBOLIC LOGIC AND MATHEMATICAL SYMBOLS | H |
| 746 | ADD NEW WORDS THAT CAN BE USED TO EXPRESS GREATER PRECISION THAN POSSIBLE IN THE SL | H |
| 748 | PROVIDE METHODOLOGIES THAT WILL ALLOW THE APPLICATION OF AI TO FURTHER DISAMBIGUATE SL TEXTS WHEN AUTOMATICALLY TRANSLATED TO THE LAL | M |
| 750 | BUILD MNEMONIC POSSIBILITIES INTO THE LAL | H |
| 752 | PROVIDE FOR A MAXIMALLY USEFUL SUBSET OF THE LAL WITHIN A REDUCED VOCABULARY | H |
| 754 | PROVIDE FOR A QUICK-TYPING, SHORTHAND SUBSET OF THE LAL THAT WILL ALLOW RAPID DATA INPUT | H |
| 756 | CHECK OF ALL WORDS IN THE LAL TO ASSURE THAT NONE TAKES A FORM THAT IS OFFENSIVE TO ANY MAJOR LINGUISTIC CULTURE | MH |
| 758 | FINAL CHECK OF ALL WORDS IN THE LAL TO ASSURE THAT NONE ARE SO CLOSE PHONETICALLY THAT PRONUNCIATION ERRORS ARE LIABLE TO BE GENERATED IN ANY MAJOR LINGUISTIC CULTURE | M |
| 760 | ASSURE THAT THE OPTIMIZED LAL, DESPITE ALL THE ABOVE, REMAINS FULLY LINKED AND AUTOMATICALLY TRANSLATABLE TO THE SL | M |

TABLE 7-continued

Table of illustrative steps in optimizing a source language for international communication

| | | |
|---|---|---|
| 762 | UTILIZE THE FACT OF 760 TO PROVIDE USERS OF THE LAL WITH ACCESS TO ALL DATA IN THE SL | M |
| 764 | STRUCTURE THE LAL TO ASSURE OPTIMAL INTERFACE WITH COMPUTER-BASED SUBSYSTEMS, FOR EXAMPLE: KEYBOARD, VOICE RECOGNITION, ETC. | HM |
| 766 | TEST ALL PHASES OF THE SYSTEM, DOCUMENT | MH |
| 768 | UTILIZE A NEURAL NETWORK SYSTEM ON A COMPUTER TO SET STANDARDS FOR SPEECH SYNTHESIS | M |
| 770 | SET STANDARDS FOR THE LAL IN SUCH A WAY AS TO MINIMALIZE THE RATE OF NEEDED REVISION. | HM |

To design an efficient LAL for use by worldwide populations under contemporary communication constraints and capabilities, steps such as listed in TABLE 7 might be taken. The source language need not, of course, be English, it could be French, Chinese, or any natural language—though the use of English would offer the most immediate value in terms of access to data on the Internet.

Possible steps for any source language would include: Minimize dialect problems within the SL, by unifying forms and alternative spellings for the LAL (704); then simplify phonetics in the LAL to meet a global standard and to avoid potential pronunciation errors. Provide the LAL with a simpler spelling system, which can also improve digital interface on the Internet. Choose LAL morphemes for global familiarity (710). Monitor the emerging LAL forms to assure that they are as aesthetically pleasing to the major linguistic cultures as possible (714). Take care that LAL words do not contain sets of morphemes that are likely to be confused because of similarity in sound (720); this may involve the establishment of a system of avoidance between pairs of phonemes. Establish a simple system of word endings that will clarify part-of-speech to the degree possible within the LAL (722). Choose a set of clear affixes (prefixes and suffixes) for LAL word building and systematic morphemization (726), which will make LAL affixes easier to learn than those in the SL. Reduce the total number of morphemes in the LAL to a number well below that in the SL, by applying semantic analysis to the vocabulary (730).

OPTIMIZING BY VOCABULARY EXPANSION

Several methods can be used to expand the capabilities of the LAL vocabulary beyond that of the SL. For example, the system can take the following steps: Allow for the coining of variant words in the LAL that will clarify part-of-speech ambiguities (732) and disambiguate other aspects of the SL (734). For example, if English were the SL, new tagged-words might be created for it by following the word with an "equals sign" (distinctive, but rather easy to type on most current keyboards) and adding tag letters to narrow the usage to a field of activity or logical domain:

TABLE 8

Examples: Domain Tags for Disambiguation.

| TAG | DOMAIN | ENGLISH EXAMPLES |
|---|---|---|
| =ab | architecture/buildings | flat=ab  lift=ab  elevator=ab  story=ab  gutter=ab |
| =ag | agental | banner=ag  gutter=ag  butter=ag  luster=ag |
| =an | anatomy | arm=an  nail=an  palm=an  tongue=an |
| =bo | botany | leaves=bo  mold=bo  palm=bo  pine=bo  plant=bo |
| =cl | clothing | pants=cl  pumps=cl  shorts=cl  sweater=cl |
| =cm | chemical/material | glass=cm  iron=cm  lead=cm  lime=cm  sizing=cm |
| =co | container | bowl=co  box=co  glass=co  mug=co  tank=co  trunk=co |
| =fm | finance/money | check=fm  stock=fm  change=fm  mark=fm  crown=fm |
| =fo | food/fruit | grain=fo  nut=fo  orange=fo  season=fo |
| =ga | graphic art | painting=ga  draw=ga |
| =md | medicine/health | wound=md  operation=md  doctor=md  cold=md  stroke=md |
| =mf | manufacturing | plant=mf  die=mf  mold=mf |
| =mu | music | flat=mu  note=mu  sharp=mu  do=mu |
| =or | ornament | ring=or  check=or |
| =py | physics | sound=py  light=py  mass=py |
| =re | religion | mass=re  See=re  sister=re |
| =sh | ships/boats | cutter=sh  hold=sh  bow=sh  port=sh |
| =sp | sports | bat=sp  bowl=sp  box=sp  coach=sp  race=sp  score=sp |
| =the | theater | act=the  play=the  set=the  stage=the |
| =tt | tools/technology | nail=tt  saw=tt  pick=tt  spring=tt  nut=tt  bolt=tt |
| =vh | vehicular | coach=vh  tire=vh  train=vh |
| =we | weather/environment | hail=we  haze=we  season=we  spring=we  wmd=we |
| =wm | weapon/military | arms=wm  bow=wm  general=wm  private=wm  tank=wm |
| =z | zoology | bat=z  bear=z  swallow=z  dove=z |

Such tagged words serve to amplify and clarify meaning in the source language; the LAL words that map to them are, of course, normal vocabulary items, and show no explicit tags.

It is also possible to create new words for the LAL that will fill expressed needs not met within the SL; for example, a set of non-sexed pronouns might be added to a LAL using English as SL. Additional steps might include: Design the vocabulary of the LAL to be better adjusted to the norms of international scientific nomenclature than is the SL (738). Add new words to the LAL from cultural traditions beyond that of the SL, integrating them into the LAL vocabulary (740); and otherwise provide a more neutral and thus more acceptable intercultural aspect to the LAL when compared to the SL. Integrate additional specialized words into the LAL to express the finctions and concepts of symbolic logic and mathematical symbols (744). Add new words to the LAL that can be used to express certain ideas with greater precision than is normally possible in the SL (746).

INFORMATION MANAGEMENT FEATURES

The above method for creating new and more explicit words will also provide any LAL using it with enhanced information management capabilities. It will allow establishing within such a LAL a set of semantic concepts and categories that will be more identifiable than possible in the original SL. In essence, annotation rules that tag words and strings in the source language (illustrated in TABLE 8) will help delimit the semantic content of the LAL vocabulary and place words within a defiable thesaurus of semantic concepts and categories, and thus make it easier to cross reference related terms. This provides improved means for searching for and locating strings of digitized data on the Internet in either the linked alternative language or in the source language as annotated.

Figure 12B:
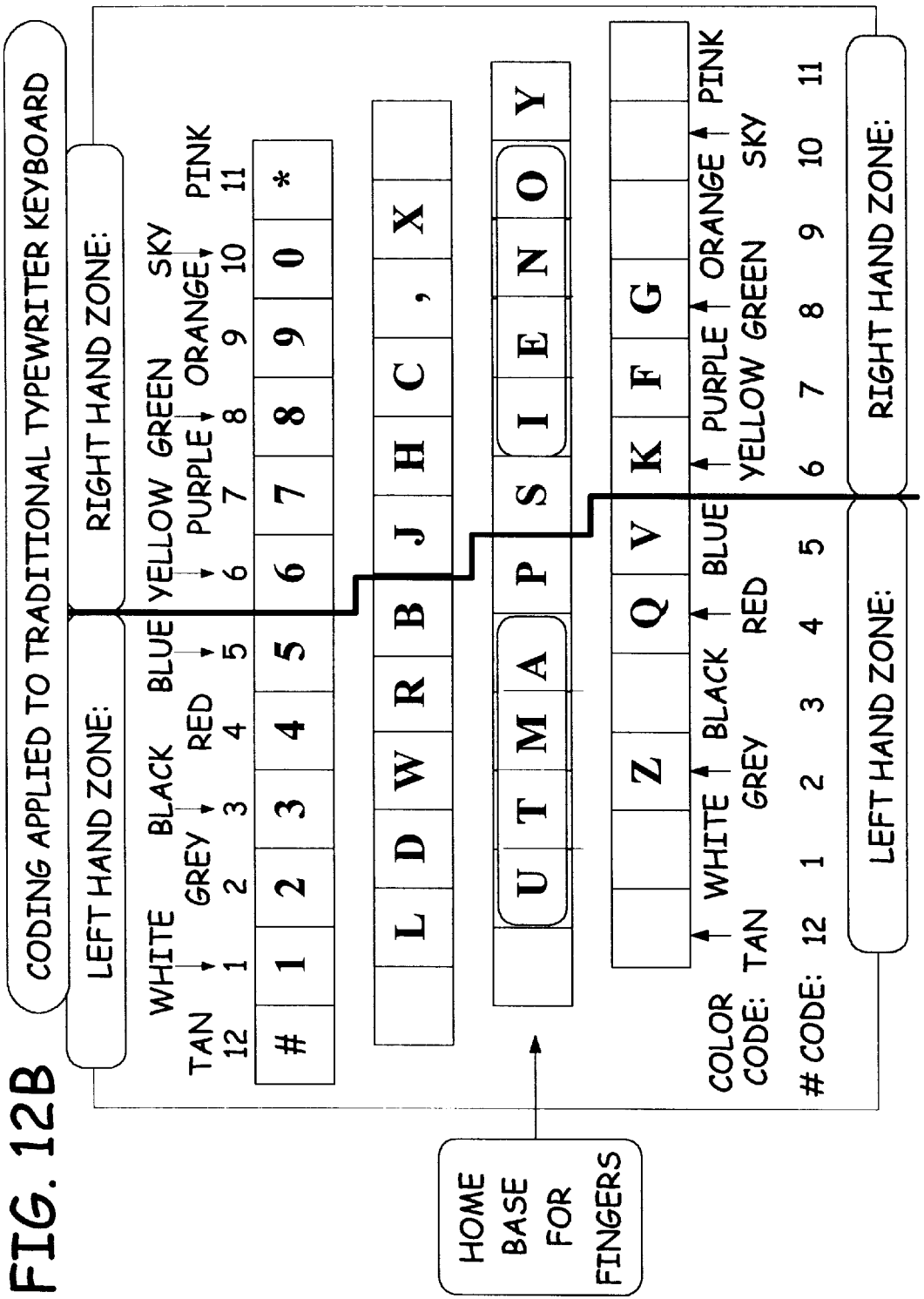

Some of the many additional capabilities that can be built into a LAL system follow:

1) A built-in system for identifying and cross referencing primary semantic concepts and categories in the LAL vocabulary, of value in searching the Internet,
2) Mnemonic systems that serve to distinguish the LAL from the SL, provide more efficient data input (750; TABLE 9), and make easier the conversion from the QWERTY keyboard to a more rational one (FIGS. 12A–B),
3) Capabilities for reduced vocabulary systems (752, and TABLE 5), an optional "vocabulary reduction strategy" (VRS) that can be applied to any text, replacing rare or difficult words with more common, clearer, or less ambiguous ones,
4) Systems for rapid digital input (stenotype); a quick-typing, abbreviated, shorthand subset of the LAL designed to allow more rapid data input (754), using the mnemonic system to simplify acquisition of the abbreviations,
5) A system supplying logico-mathematical symbols with LAL words for their concepts, these being capable of insertion into pronounceable sentences to express logical and mathematical relationships and formulae.

There should be final checks to assure:
1) That no LAL word takes a form that is offensive to any major linguistic culture, and
2) That no two LAL words are so close phonetically that pronunciation errors are liable to be generated within any major linguistic culture.

In all of this, the effort must be maintained to assure that the optimized LAL remains fully linked to the SL and is thus fully translatable, automatically and bilaterally, without loss of meaning.

MNEMONIC FEATURES

Some of the systems for establishing useful mnemonic links between numbers, letters, and other features of a linked alternative language are listed in TABLE 9, below:

TABLE 9

SYSTEMS FOR MNEMONIC ASSOCIATION WITHIN A LAL

| | |
|---|---|
| 902 | ASSOCIATE NUMERALS WITH LETTERS BY SHAPE |
| 904 | ASSOCIATE NUMERALS WITH LETTERS BY SOUND |
| 906 | ASSOCIATE NUMERALS WITH COLORS |
| 908 | ASSOCIATE LETTERS WITH COLORS |
| 910 | ASSOCIATE DIRECTIONS OF THE COMPASS WITH LETTERS AND NUMERALS |
| 912 | ASSOCIATE SERIAL TIME ELEMENTS (DAYS OF THE WEEK, MONTHS, ETC.) WITH LETTERS AND NUMERALS |
| 914 | ASSOCIATE LETTERS AND SHAPES |
| 916 | ASSOCIATE NUMERALS WITH PATTERNS, TEXTURES, ETC. |
| 918 | LINK NUMERALS AND COLORS TO MNEMONIC IMAGE SETS EXAMPLES: FAMILIAR ANIMALS, OR FAMOUS PLACES |
| 920 | LINK NUMERALS AND LETTERS TO POSITIONS ON A COLOR-CODED ALPHANUMERIC KEYBOARD |
| 922 | ASSOCIATE FUNCTION KEY COMBINATIONS WITHIN THE COLOR-CODED ALPHANUMERIC KEYBOARD |

The presence of such links within the system serve to foster the efficient input of data by digital means, as well as providing other value to users. These values include:
1). Greater ease for LAL users in switching to a keyboard that is substantially more efficient than the traditional QWERTY keyboard,
2). Increased ability of LAL users to remember the keyboard combinations used in various computer applications,
3). Greater ability of LAL users to learn systems of abbreviations for the rapid input of digital data,
4). Increased ease in remembering certain vocabulary items in the LAL,
5). Ability of the LAL users to recall numbers more easily in general,
6). General value as mnemonic aid.

Systems for mnemonic association within an LAL can be built on a variety of potential links that would make them potentially easy to master. Numerals may be associated with letters by shape (902). Thus a 2 is shaped somewhat like a Z; while M and W share a form with 3. Numerals may be linked to letters by sound (904), such as "nine" in English being associated with the letter N. Numerals may also be directly tied to colors (906), with, for example, "royal purple" being associated with "lucky seven." Letters may be readily associated with color names (908); for example, with English speakers R could relate to red, and B to blue.

The directions of the compass may be associated with letters and numerals (910). For example, "north" might be related to "nine" because of the common N. Serial time elements (days of the week, months, etc.) may be associated with letters and numerals (912); for example, the LAL name of the third month (March) might also begin with an M, associated with 3.

Letters and numbers may in many cases be associated with shapes (914); for example, the letter O can be associated with circular objects and the numeral zero. For those familiar with Roman numerals, a link between the number "five" and the letter V would be easy to remember. Furthermore, letters and numerals may be associated with patterns, textures, etc. (916) on the basis of the first letter of the terms describing them, or their shapes. Numerals and colors may be linked to mnemonic image sets, such as a set of animals (918), based on the initial letter of the animal's name. They may also be linked to the ten fingers of the hands.

Figure 14:
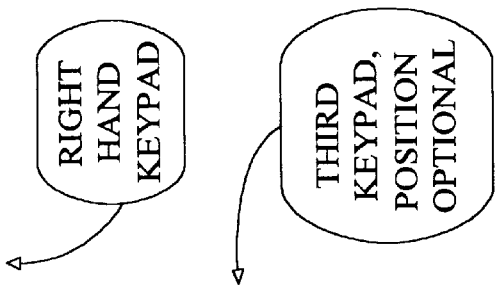
FIG. 14 is a diagram showing a third embodiment of the mnemonic keyboard.
Figure 15B:
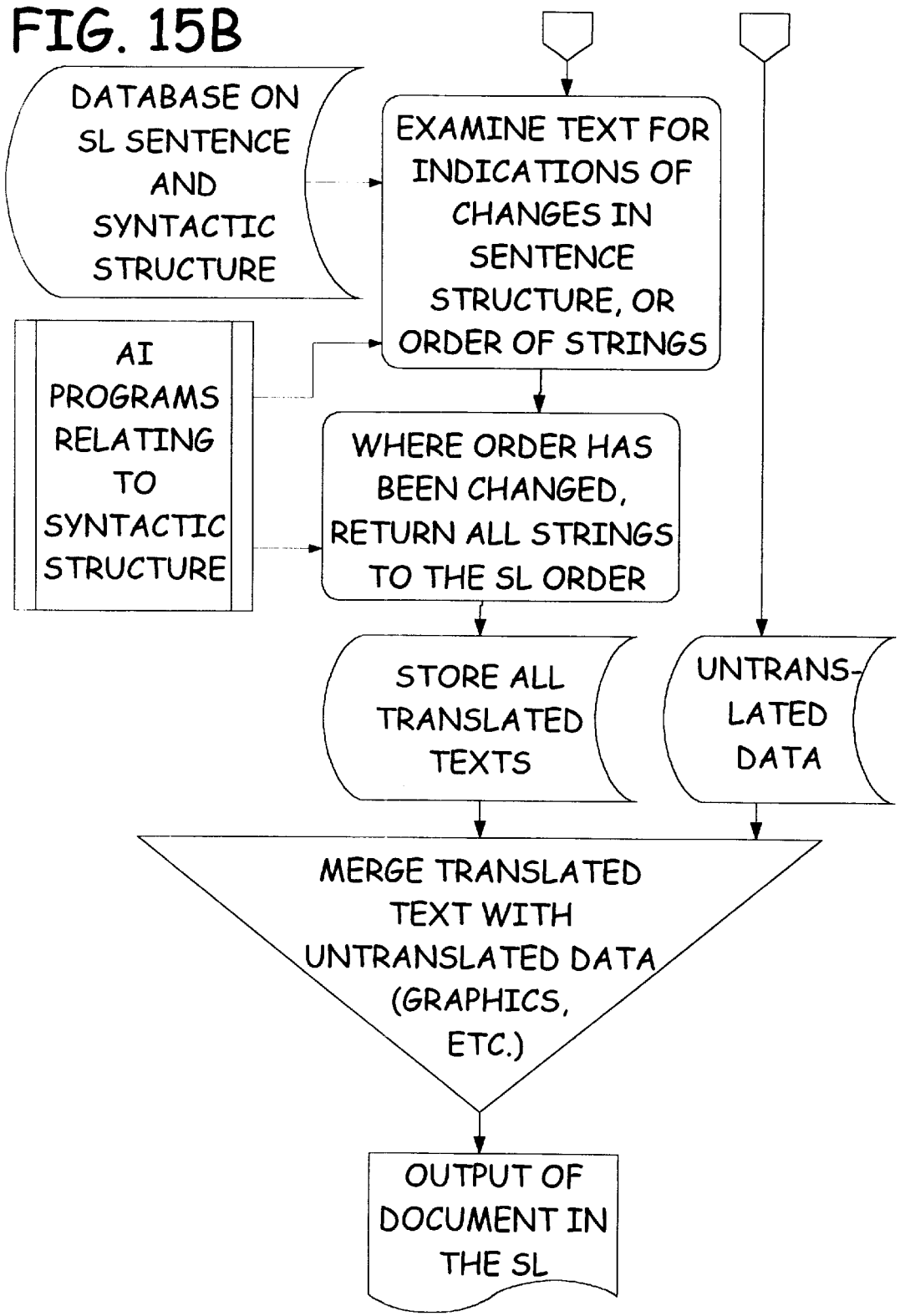
Figure 16A:
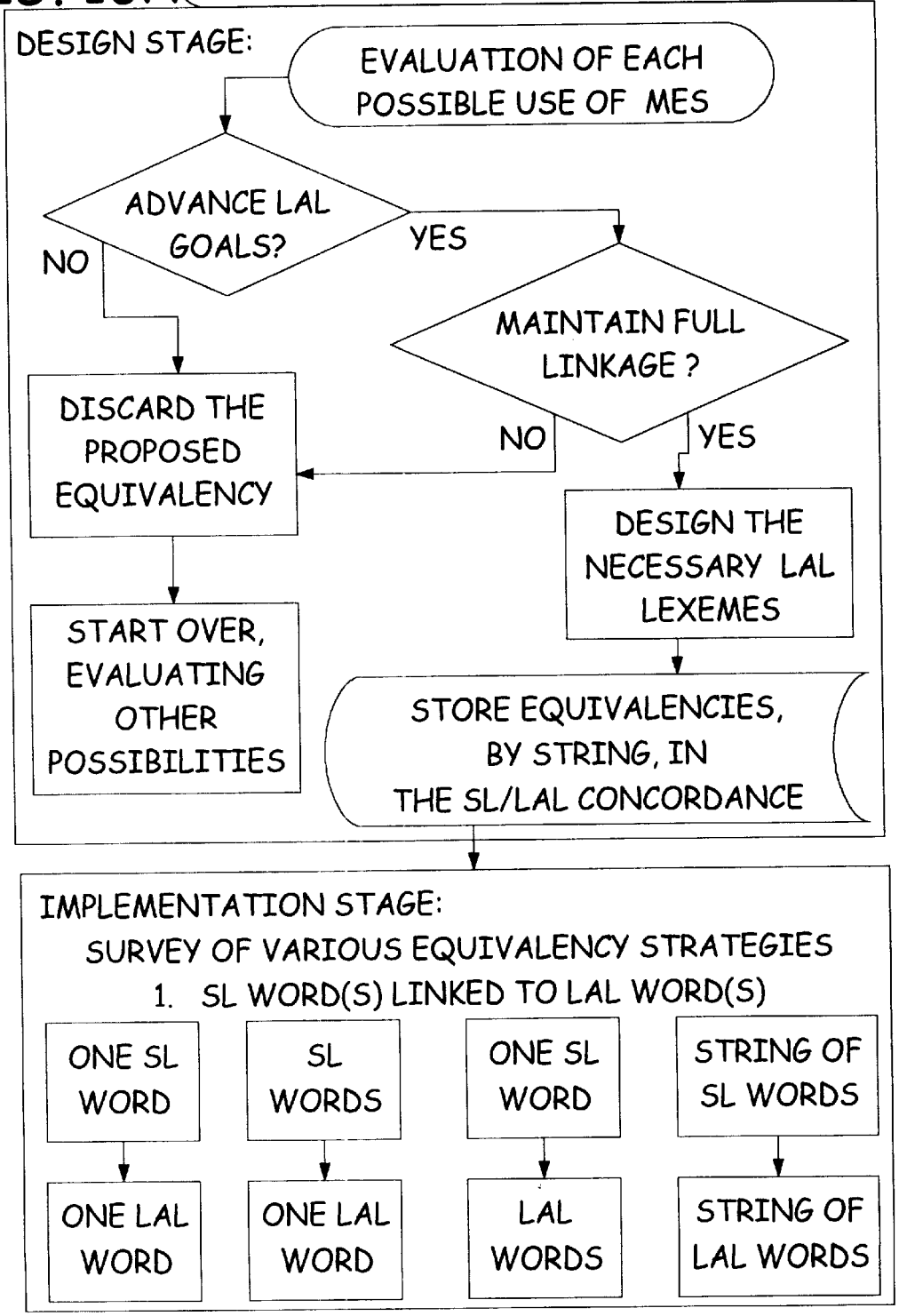
Figure 16D:
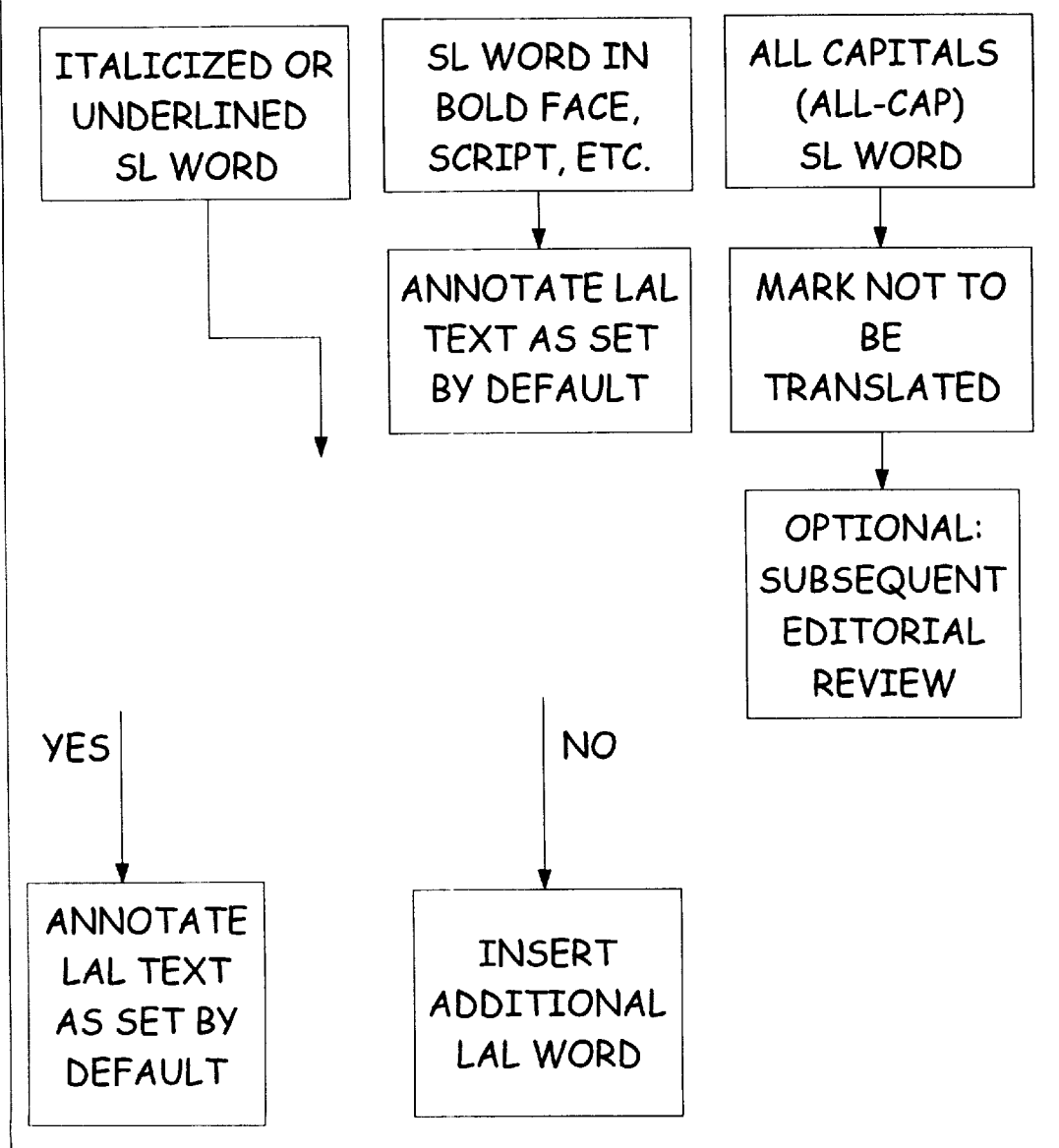
Figure 16E:
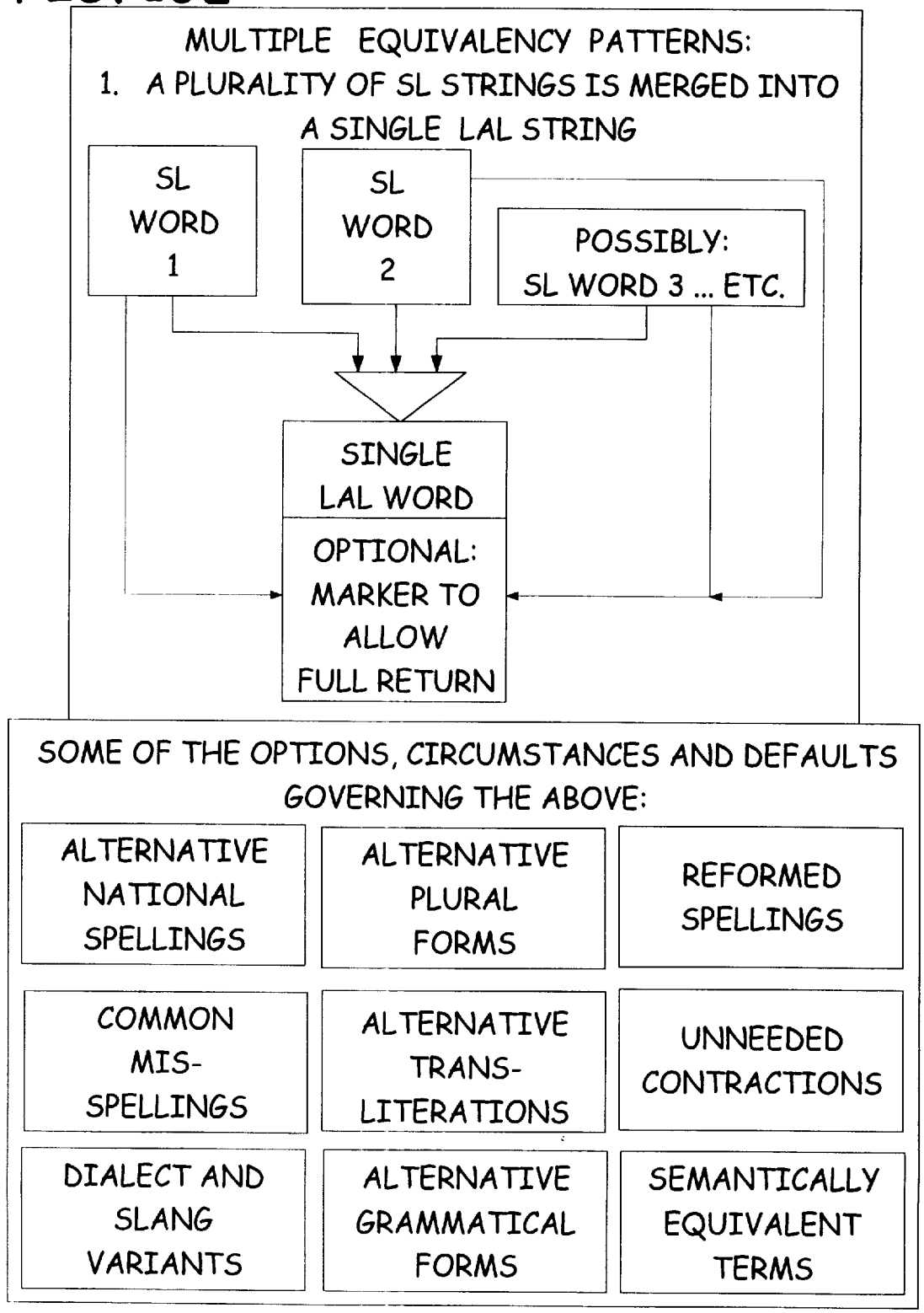
Figure 16F:
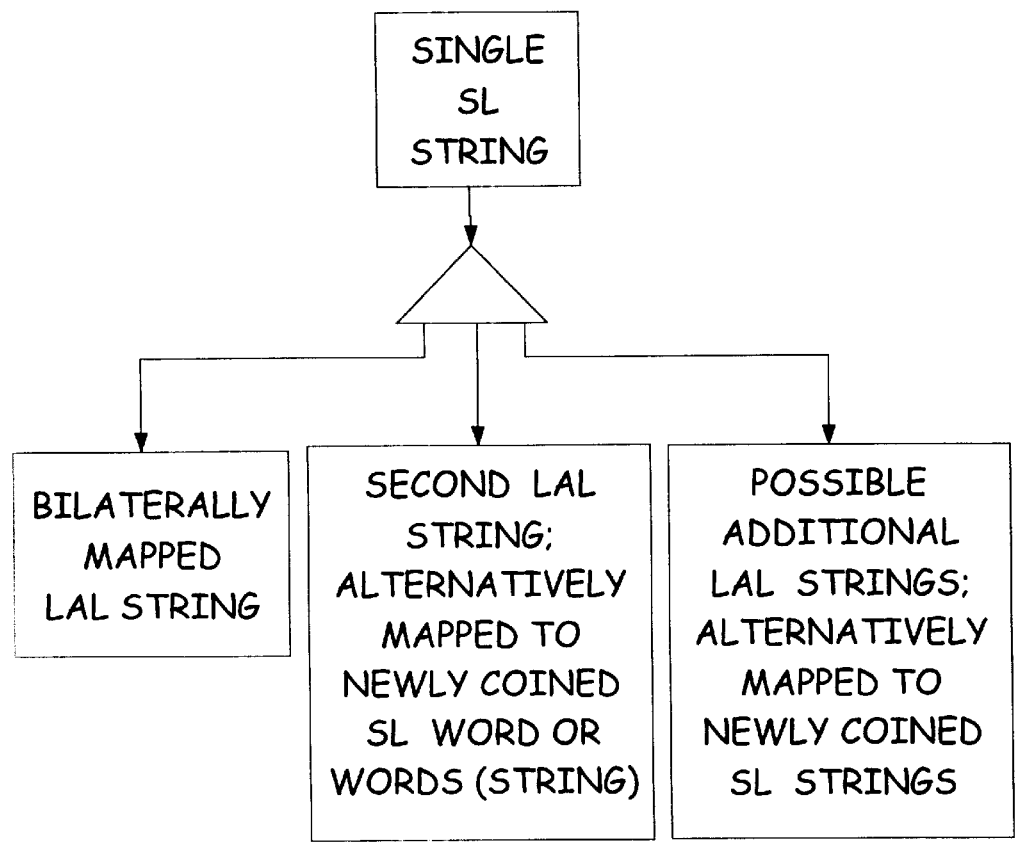
Figure 16G:
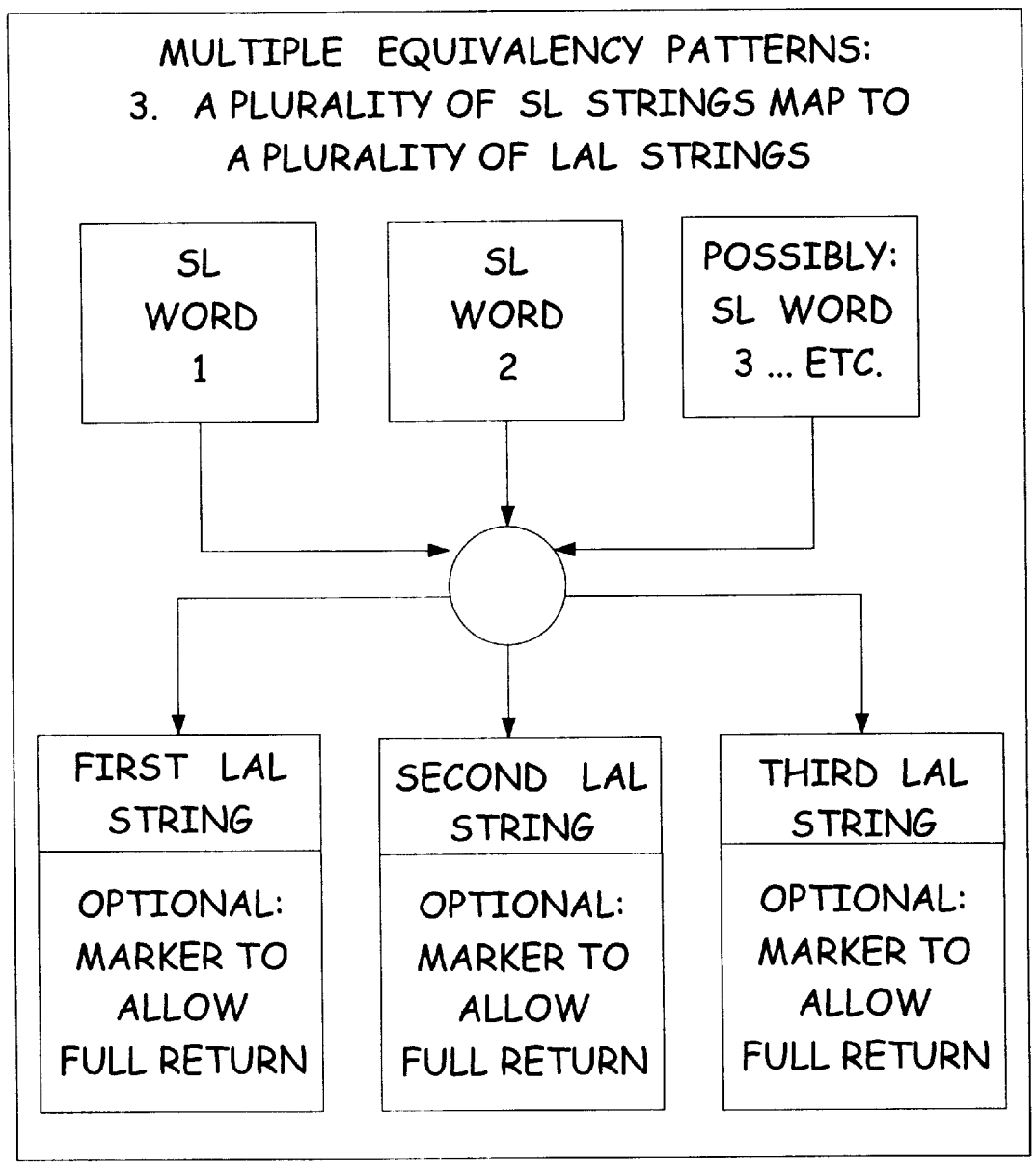
Figure 18:
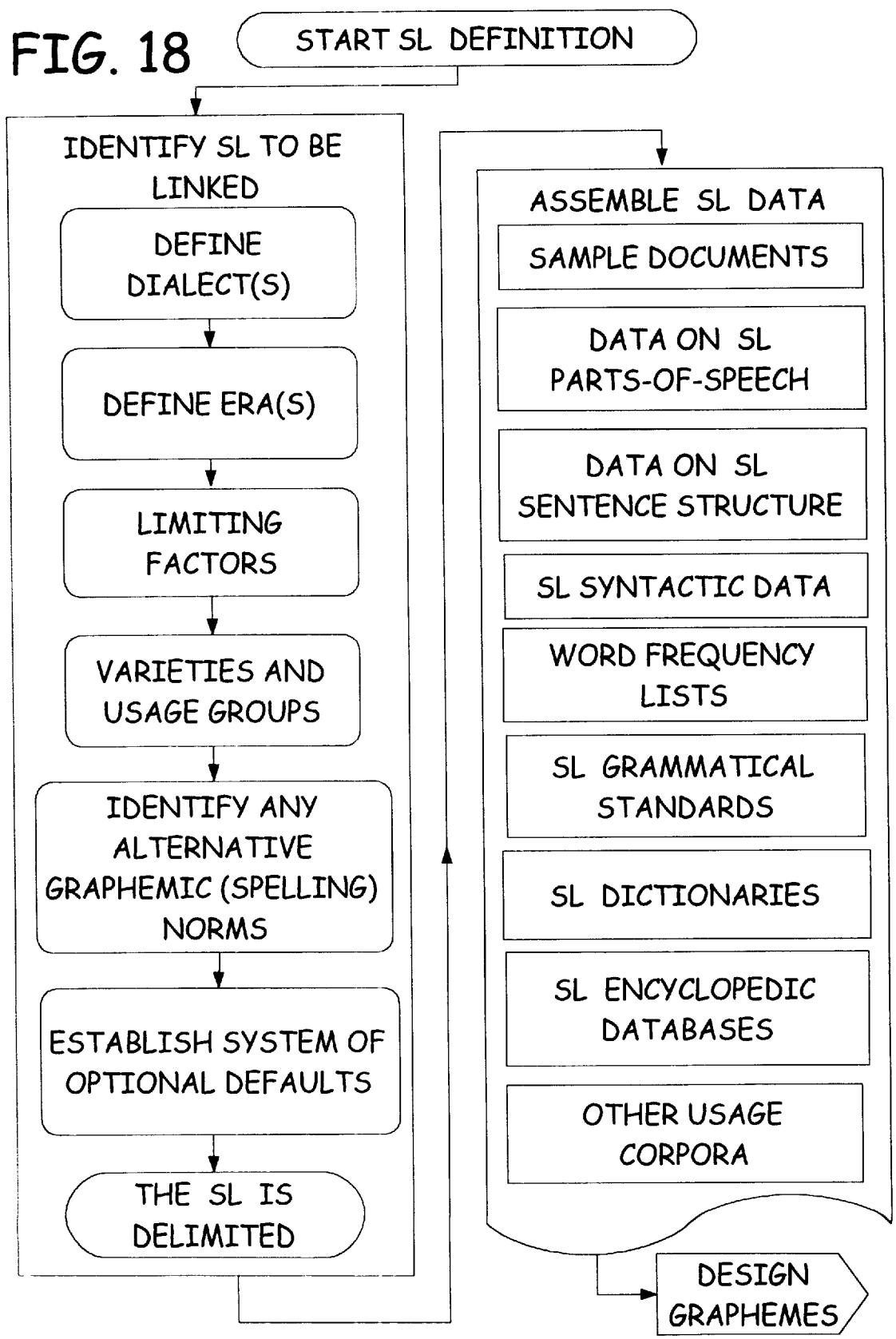
FIG. 18 describes a first stage in a system to design a "linked alternative language", that of identifying and documenting the source language (SL) to be used.
Figure 20:
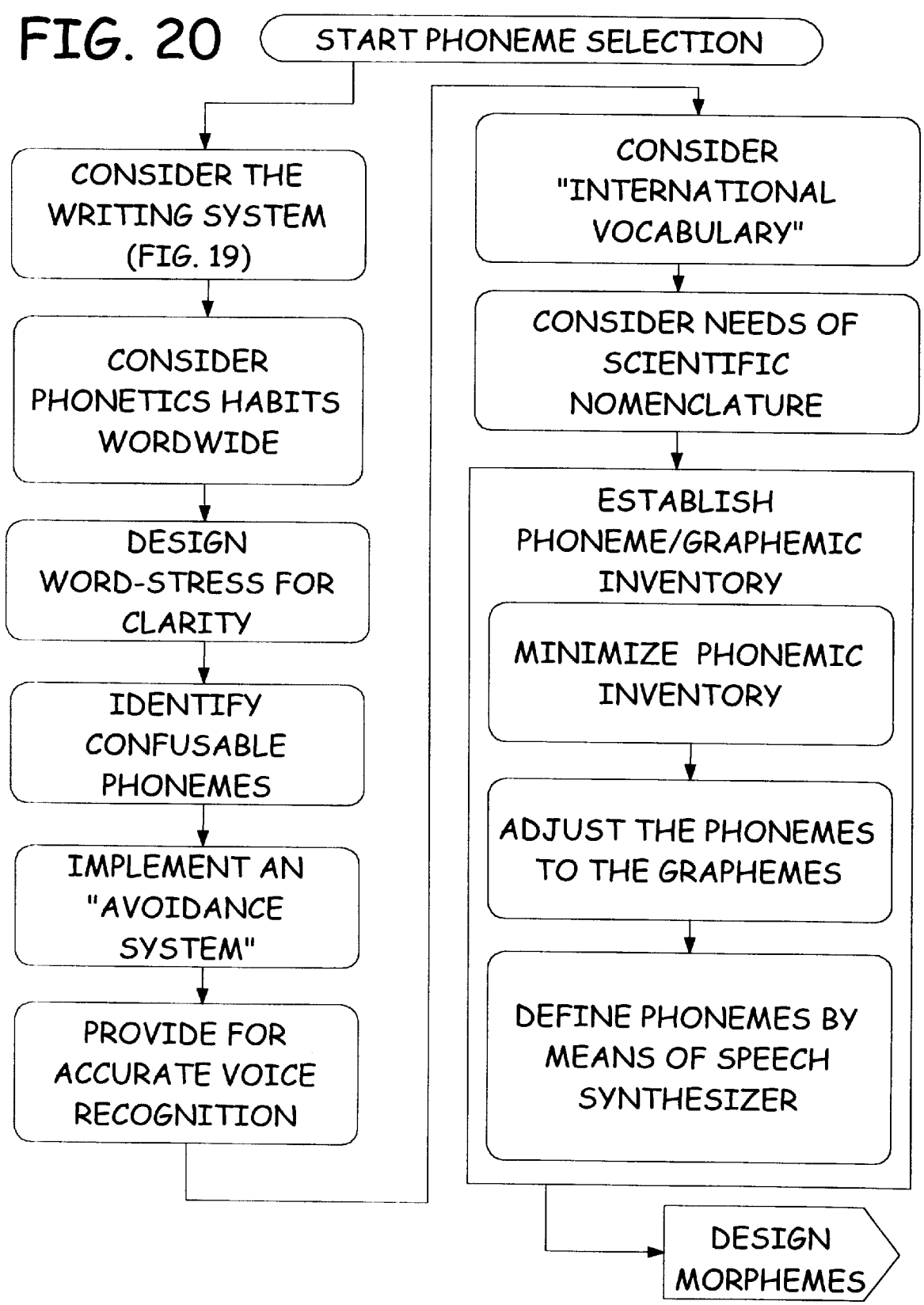
FIG. 20 describes a stage in the system to design a "linked alternative language" for the selection of phonemes for a LAL.
Figure 21A:
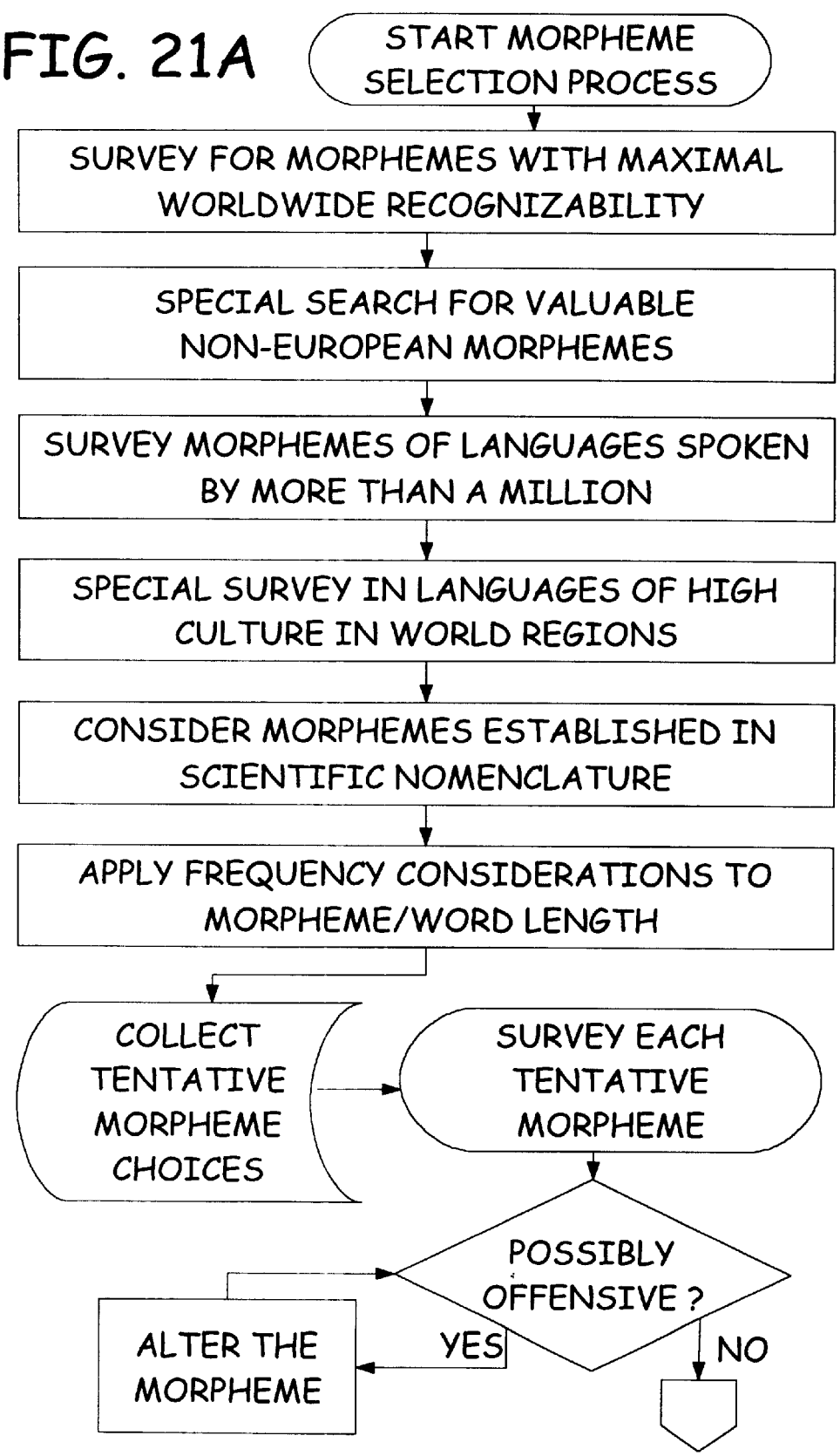
FIGS. 21A–B describe a stage in the system to design a "linked alternative language" for the selection of morphemes for a LAL.
Figure 21B:
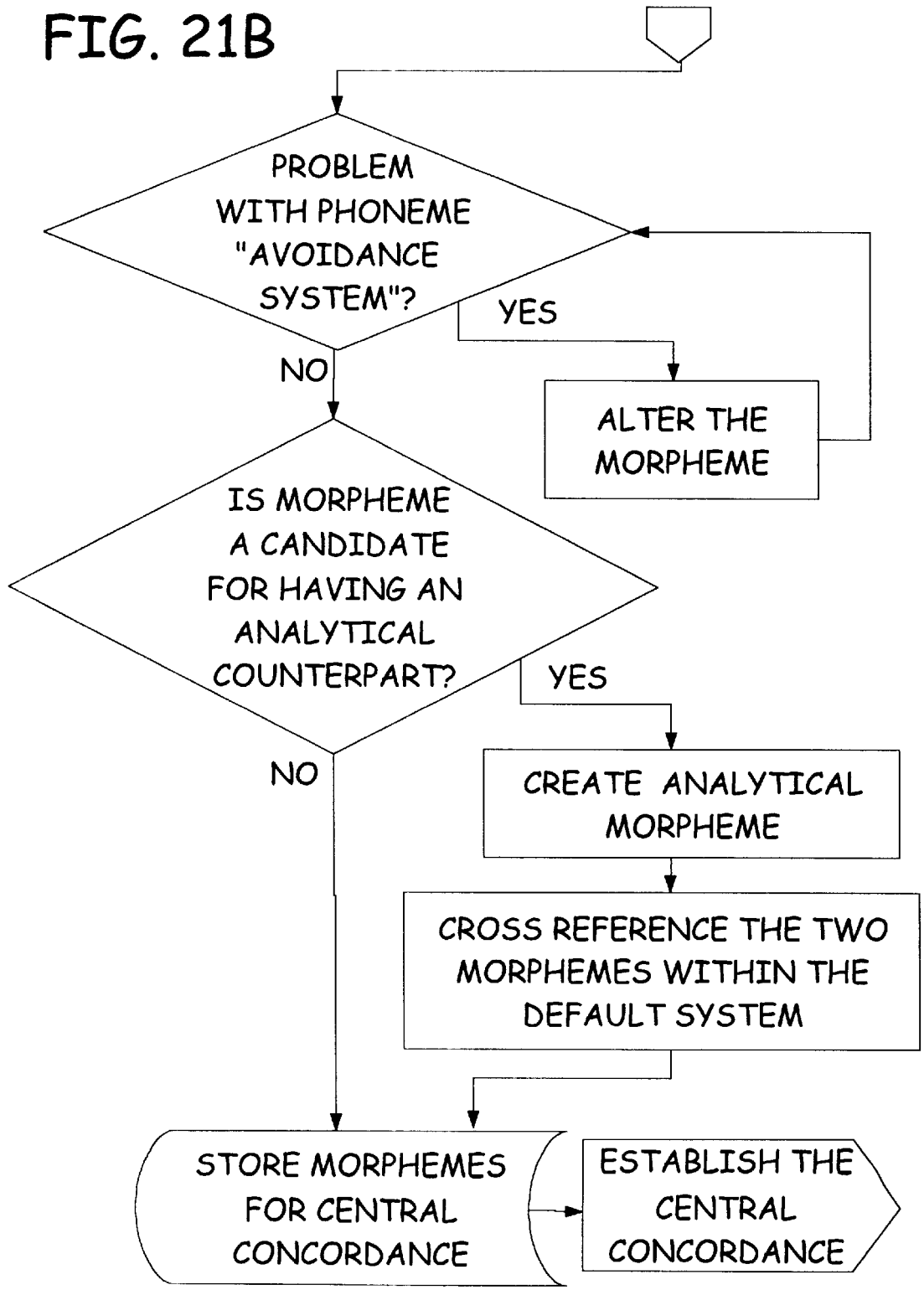
Figure 23B:
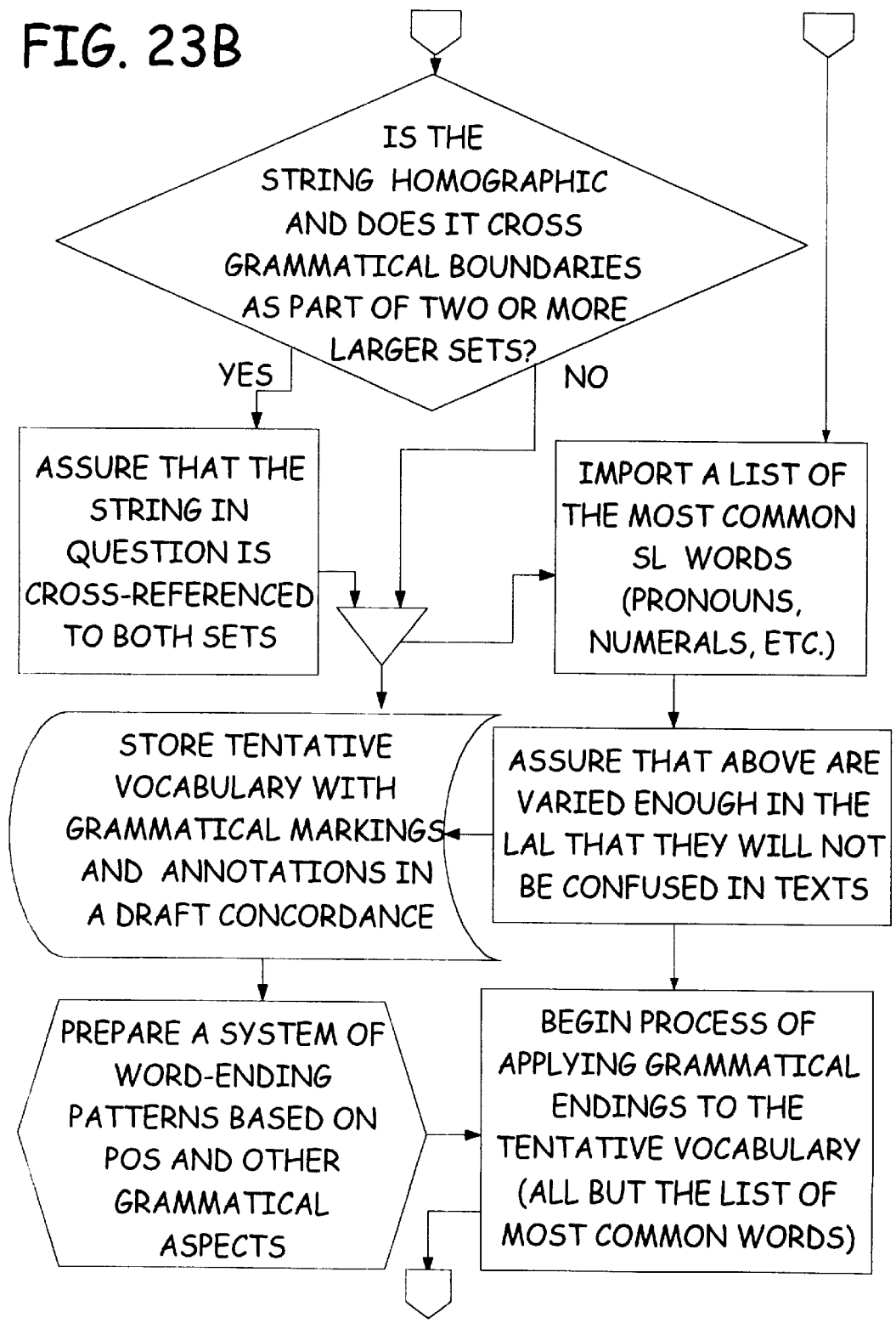
Figure 24B:
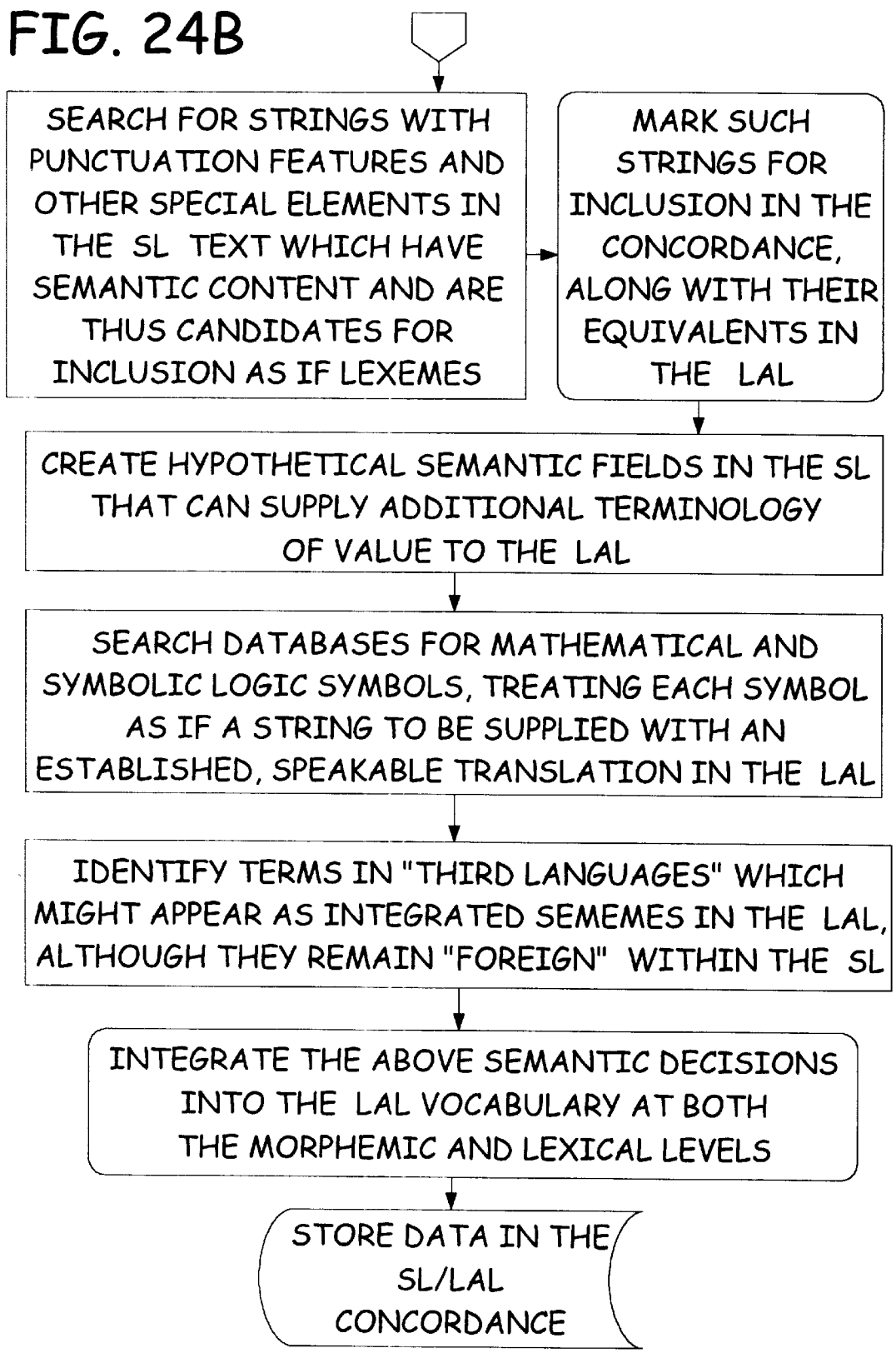
Figure 25B:
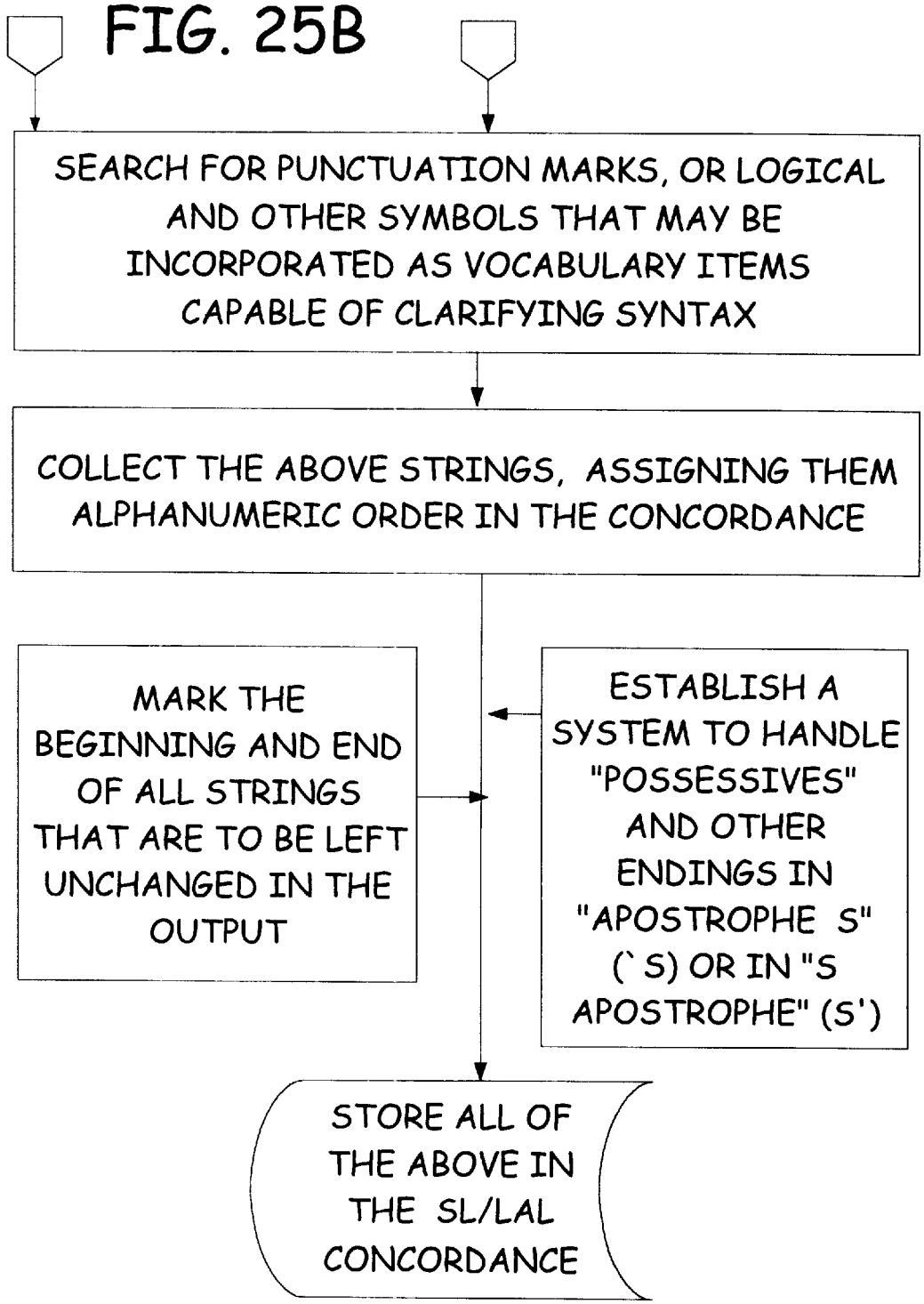

In accord with the above, numerals and letters may be assigned easy-to-remember positions on a color-coded alphanumeric keyboard (920) for the input of data. This patterning can be designed to provide keyboard layouts that are markedly more efficient than the traditional QWERTY keyboard. (FIGS. 12, 13, and 14)

Furthermore, with patterns (such as dots, vertical bars, horizontal lines, etc.) mnemonically tied to the functional keys and to such keys on personal computers as those designated: Control, Alternate, and Shift, an entry code such as "Control F5" might be expressed by a pattern of, say, red dots, while "Alt F7" might be horizontal lines in purple. Such combinations would be much easier to associate with specific functions and to remember than the letters and numbers involved (922), allowing systems for the input of digital data to be more easily learned.

The basic key to the mnemonic system is a database within the LAL side of the Central Concordance in which certain morphemes, words, and longer digital strings in the LAL appear in a form which allows for ready association of each Arabic numeral with a specific set of letters of the alphabet used by the LAL, and through those letters, for associating each Arabic numeral with LAL words which designate numbers, days of the week, months, directions of the compass, and basic colors. On a computer, there may be means for a user to input lists of items, numbers, dates, and other data to be remembered, and for the computer to respond by suggesting mnemonic techniques, based on the mnemonic system database, to aid in the retention of such data within human memory.

COMPLEXITIES IN STRING REPLACEMENT

Although a translation system limited to automatic word-to-word substitutions could, using the methodologies of this patent and a well-defined LAL format, accomplish certain limited "optimization" goals that might be set out for it—such as certain spelling reforms and grammatical regularizations, et al., so narrow an approach would create an LAL that would be unnecessarily limited in usefulness. It would consequently provide few incentives to motivate potential users. Additionally, an LAL so created would have much less credibility as an autonomous system. The subsequent LAL would be open to attack on the grounds that it lacked its own unique character and integrity, i.e., it would be viewed by some as little more than a caricature of the source language (SL).

As a consequence, this invention thus takes advantage of a variety of strategies and methodologies that go well beyond simple word-by-word replacement. Specifically:

1) It exploits the potential value of analyzing text into more complex strings, such as:
   a). multiple word strings (strings containing spaces),
   b). strings containing punctuation,
   c). strings dependent on capitalization features, and
   d). strings dependent on the presence of certain nearby words;
2) It coins new terms in the SL, including tagged words (TABLE 8), that will allow for LAL terms permitting disambiguation, increased clarity of expression, etc.
3) It recognizes the value of allowing for a plurality of strings in the SL to be replaced by the same string in the LAL.
4) In certain cases, it recognizes the value of allowing for a plurality of equivalents in the LAL for a single string in the source language.
5) It may insert additional words between strings.
6) It may change the order in which strings appear.

Many of these features are described elsewhere in this patent, including Table 10. These features are not to be introduced randomly, but only in the context of the optimization goals set for the LAL. The items listed as 3) and 4) above involve what might be called "multiple equivalency strategies" and are discussed further below (using English as the example) and also charted in FIGS. 16A–H.

MULTIPLE EQUIVALENCY STRATEGIES

There are several patterns by which the LAL can be better optimized by providing the same LAL equivalent for two or more SL words—or more than one LAL alternative for the same SL string. Temporary, hidden or hypertext markers can be used optionally to leave a trace of the selection made, and allow for exact return to the original—if such is deemed important.

FIRST PATTERN: TWO OR MORE DIFFERENT SL STRINGS ARE MAPPED TO THE SAME LAL STRING

The value of allowing for a plurality of strings in the SL to be replaced by the same string in the LAL would arise from the following types of circumstances:

1) There are regional spellings in the SL which should optimally map to the same LAL word: For example, (US) "labor" and (UK) "labour" might well have the same LAL form, or "gaol" and "jail."
2) There are alternative grammatical forms (e.g. plural forms) in the SL which should optimally map to the same LAL word: For example, 'cactuses' and 'cacti' might efficiently map to the same LAL word. Selection may flow from pre-set text defaults: such as literary usage vs. popular usage.
3) There are variant spellings spawned by efforts at spelling reform in the SL which should optimally map to the same LAL word: An example is "thru" and "through."
4) There are common misspellings in the SL which might optimally map to the same LAL word: For example, "recieve" might map the same as "receive." This principal should not, however, be pursued so far as to create dangers of confusion.
5) There are alternative transliterations in the SL which might map to the same LAL word: For example, "czar" and "tsar." (Extensive use of a specific transliteration system in a particular document might be noted in its "document tag.")
6) There are contractions in the SL which might best map along with the full form to the same LAL string: For example, "'tis" could be mapped into "it's" as well as to "it is."
7) There are dialectical or colloquial words in the SL which should optimally map to the same LAL word: For example, "singin'" might map along with "singing" to the same LAL form. Special protocols might be set by a translator (and noted in the "document tag") for individual works of fiction using dialectical materials, such as Tom Sawyer or some of the works of Dickens.
8) There may be grammatical words in the SL which should optimally map to the same LAL word: In English for example, "a" and "an" should optimally map to the same LAL word. Alternative past tenses in English might also fall here, such as "dreamed" and "dreamt."
9) There may be other cases where two quite separate word forms have an identical meaning and can be safely treated as equivalent. This possibility should not, however, be extended so far as to create dangers of confusion or any loss of semantic content. This means restriction to cases where the meaning is very clearly specified. Thus "billion(US)" and "thousand-million" might be safely considered the same thing.

As mentioned above, the user of this invention will be able to select default forms for any document, and forms at variance to the default will either be marked as untranslated or translated as possible under other defaults and so marked with an annotation.

SECOND PATTERN: A SINGLE SL STRING IS MAPPED TO TWO OR MORE LAL STRINGS

The value of allowing a single string in a source language to translate to more than one equivalent in the LAL may arise from a variety of circumstances, including the following:

1) Traditional Terms vs. "Analytical Wordforms":

In certain LAL systems, there may be advantage in allowing one SL word to assume two possible forms in the LAL depending on vocabulary size considerations. Analytical word-forms would be built up of very common words and thus ease the burden for learners, especially those from linguistic cultures that have not accepted vocabulary that is otherwise widespread. For example, much of the vocabulary of international science and technology has spread to as widely distributed languages as Japanese, Indonesian, Russian, and Swahili. But not in all cases—nor has there been much transfer at all from the international scientific vocabulary to languages such as Mandarin, Thai, Icelandic, Navaho, or Yoruba. For persons coming from such linguistic cultures, and for beginners in the LAL in general, analytical wordforms would greatly ease the burden of learning the LAL efficiently.

Examples, using English as SL, might be:

| ENGLISH: | TRADITIONAL LAL FORM: | ANALYTICAL BASIS for 2nd LAL TERM: |
|---|---|---|
| volcano | vulcano | "fire-mountain" |
| skeleton | skeleto | "bone-frame" |
| ocean | oceano | "great-sea" |

This system would have to be used with proper discretion. For example, to analyze "atlas" as "map-book" might seem logical at first glance, but would cause dissonance if used to refer to Atlas in mythology. In some cases, the standard LAL word might itself be simplified; all forms of a LAL might use a term built up of "insect-science" for "entomology."

2) Disambiguation by Longer Strings:

For certain SLs, there can be advantage in adding a series of longer strings that will override the shorter strings in order to allow certain SL words to assume secondary but less ambiguous forms in the output LAL text. In a simple example, the single-word English string "paper" would map to a LAL form that could be either a noun (and adjective) or a verb. However, the longer string "the paper" would never represent a verb; thus it could be mapped to a LAL form that was more explicit, i.e., less ambiguous.

THIRD PATTERN

In certain LAL systems, there may be advantage in allowing two or more SL words to translate in an overlapping fashion to a plurality of possible forms in the LAL. This is, in essence, a combination of the above situations.

NON-AUTOMATIC MULTIPLE EQUIVALENCY STRATEGIES

In addition to the above procedures, which are designed to operate automatically (i.e., without the intervention of a human editor), human-assisted subsystems may be added to display and allow for editorial choice among the multiple LAL equivalents of a single SL string. Many of these subsystems may be programmed to operate semi-automatically, operating within preselected defaults.

Some of these opportunities include:

1) Further disambiguating texts. This is the largest area for possible editorial choice. Thus the English word "bat" might be replaced not by the equally ambiguous LAL term but by a tagged term restricted to use in sports—or in zoology. (Illustrated by TABLE 8)

2) Further clarifying proper nouns vis a vis common nouns. An editor may wish to set standards for a particular document in the "document tag." For example, the surname of the former Israeli Prime Minister Begin might be systematically replaced in a biography by an LAL term that reflects the Hebrew of that name rather than part of the LAL verb meaning 'to begin.'

3) Supplying clearer alternatives where one regional version of the SL has fewer words than another. Thus the US forms tire and luster are not as specific as UK forms tyre and lustre.

4) Establishing metalinguistic styles for a document. Systems might be pre-defined for specific metalinguistic texts (grammar books, foreign language tests, etc.) to handle more systematically the incorporated foreign language quotations, the mention of words as words (i.e, out of context) and the like. Chosen systems would be recorded in the "document tag."

5) Systemizing numerics and lists. Outlines and other materials using Roman numerals and alphabetic numeration might be supplied with clearer alternatives.

6) Redrafting a text into an equivalent using a reduced vocabulary. This would include programs not only for the "Little Language" but also for graded texts for children or for adult beginners in the LAL.

TRANSLATION PARADIGMS

As discussed under multiple equivalency strategies, a variety of basic paradigms may be used in the translation process between the SL and the LAL and still maintain fully automatic bidirectional translatability between the two. Word order may be changed in some cases; in other cases the basic structure of the sentence may remain unchanged. Some of the basic patterns that might be used for translation between English as the SL and a LAL designed for international usage are shown in the table below (TABLE 10). The examples given are only illustrative of some of the relationships involved; many alternative vocabulary selections could be used for the LAL.

TABLE 10

Table of Illustrative Translation Paradigms

Sentence Level:

Paradigm: Sentence substitution.

Example in SL: How do you do?
LAL translation: Sanu?
Paradigm: Sentence Structure Insert (by use of Al, etc.)

Example in SL: They said they knew.
LAL translation: Lor dicti ke lor cogni.
Reflex into SL: They said [that] they knew.
Paradigm: Restructured Sentence (by use of Al, etc.)

Example in SL: Do we know them?
LAL translation: Esqe nos cogni lori?
Reflex into SL: Is-it-the-fact-that we know them?

Phrase Level:

Paradigm: Phrasal substitution

Examples in SL: They went to and fro, the day before yesterday.
LAL translation: Lor itrea ziprin, anc'edio.
Paradigm: Coined Phrase (logical functions)

Example in SL: We will pay if-and-only-if you come.
LAL translation: Nos vola paga esqil ni veni.

Font, Capitalization Level:

Paradigm: Subsequent capitalization dependent

Example in SL: The university was the University of Ohio.
LAL translation: Te universito esea le Universito di Ohio.
Paradigm: Italic/Underline Dependent (for Emphasis)

Example in SL: They plan to come.
LAL translation: Lor plana hic oe veni

Punctuation Level:

Paradigm: Nearby Punctuation Dependent:

Example in SL: Use soap and water, and a new bandage
LAL translation: Usla sabuna dan aqa, va un nove bandaja Word Level Paradigm: Simple Sequential:

Example in SL: They came rapidly.
LAL translation: Lor veni rapidim
Paradigm: Transposition of Elements:

Example in SL: They cannot understand.
LAL translation: Lor non poti vedi.
Paradigm: Merger of Words: Two SL words become one LAL word Example in SL: Give me a banana or an apple
LAL translation: Doni mi un banano au un apelmo.

TABLE 10-continued

Table of Illustrative Translation Paradigms

Paradigm: Semantic Fission: One SL word becomes two LAL words.

| | |
|---|---|
| Example in SL: | They visited the newest park. |
| LAL translation: | Lor visitea te maxim nove parca. |

Paradigm: Specification: (SL annotated by word tag.)

| | |
|---|---|
| Example in SL: | *The bat=z flew from his hand=n. |
| LAL translation: | Te bianpho fylea da onie manuo. |

Paradigm: Part-of-Speech-Clarification (Annotation by tag.)

| | |
|---|---|
| Example in SL: | The crown is of gold. |
| LAL translation: | Te corono es di auro. |
| Reflex into SL: | The crown=n is of gold. |

Paradigm: Generalization (Word fusion.)

| | |
|---|---|
| Example in SL: | The student must finish her/his paper. |
| LAL translation: | Te studantae debua finisa talie papyra. |

The individual "LAL translations" above are only indicative of one form that a LAL might take. In this case, the "look and feel" is somewhat reminiscent of that proposed for an international auxiliary language by the Danish linguist Otto Jespersen in the 1920's. The form above does, however, have a vocabulary that contains more morphemes from non-European languages. A LAL for worldwide use could, of course, take other forms, depending on the exact formulation of goals.

For example, the LAL methodology might be utilized to formulate and implement a more neutral and carefully standardized form of the contemporary English language for worldwide use on the Internet. This would involve using the sum of the various national forms of the English language which are most commonly used on the Internet as source language (SL) and linking those forms through a "multiple equivalency strategy" (FIGS. 16A–H) to a LAL in the form of a version of the English language especially designed to function as a more standardized and semantically clearer form of the English language for international Internet use.

Such a project might also use other optional features discussed here, such as reduced vocabulary strategies, systems for disambiguation, methods for the avoidance of difficult idioms and unnecessary culture-specific allusions. These could help create a system to translate potentially confusing texts from around the world into versions that would be more firmly regulated in usage and vocabulary and thus easier to understand. The LAL output could also be made available in audio form by the implementation of a single worldwide English standard for text to speech output. This might be formulated by means of a neural network trained using the techniques of back propagation.

By the above means, the various national and dialectical accents within English could be avoided by the non-English-speaking Internet user, who would use a single norm set by the LAL. Most spelling might be left as is, although greater order and system might be supplied in such matters as hyphenation. Existent texts in various forms of English (in US, UK spelling etc.) could be automatically translated into the new format for users worldwide. While there have been precedents in many countries for efforts to unify dialects, this has never been proposed to be done by using the machine-directed and automatic means made possible by the linked alternative language methods of this invention. An English standardization project using LAL methodologies need not compete with any effort to form a much more novel form of international auxiliary language also linked to English as illustrated in TABLE 10. The two could easily co-exist—and be linked.

INPUT SYSTEMS: KEYBOARD

An optional alternative keyboard forms a part of this invention, one with a specific association of letters, numbers, and colors in vertical columns. FIGS. 12, 13, and 14 illustrate examples of how this might be done. The specific locations of keys, particularly of punctuation and symbols, is illustrative only. The embodiment in FIG. 12 is similar to that typical of typewriter keyboards and of the alphanumeric core of many computer keyboards. Its special characteristics are:

1). The four fingers of the left hand have the letters U T M A as their home keys.

2). The four fingers of the right hand have the letters I E N O as their home keys.

3). All letters and numbers are placed with consideration of various mnemonic features and frequency of usage.

4). Positions are coded vertically to a spectrum of colors and to the number keys.

Mnemonic principles are applied to ease the memorization of the associations to be made between numbers and letters and their color codes. The twelve colors used in this example are: white 1, gray 2, black 3, red 4, dark blue 5, yellow 6, purple 7, green 8, orange 9, sky-blue 10, pink 11, and tan 12. These twelve comprise four sets of three: white-gray-black, the primary colors, the secondary colors, and "three pastels."

The layout of the letters of the alphabet in FIG. 12 has been designed to assure that it is more effective in increasing speed and reducing finger action for use in inputting data in the English language, in a likely LAL for international use, and in other languages (French, Spanish, German, and Italian), than is the traditional QWERTY keyboard.

Another embodiment of the same keyboard concept is shown in FIG. 13, with the same association of letters, numbers, and colors. It differs in breaking the two hands into separate key pads and in arranging the columns of keys in a more vertical format, with the similarly color-coded keys located directly below each other.

A third embodiment of the mnemonic keyboard, with a similar association of letters, numbers, and colors has a "numerical pad" as a third separate unit: FIG. 14. In this embodiment, the three key pads are designed so that they may be placed in any configuration. For example, the numerical key pad may be placed at the typist's right (as is common with many computer keyboards), in the middle (between the other two key pads), in the middle with a 45 degree tilt to the right or to the left—or it may be freely placed elsewhere.

On the numerical pad, ↑, ↓, ←, and → stand for the Up, Down, Left, and Right Arrow keys. Other abbreviations on that pad are:

| | |
|---|---|
| PAU | Pause/Break |
| PS | Print Screen/SysRq |
| INS | Insert |
| HOME | Home |
| P↑ | Page Up |
| P↓ | Page Down |
| SCR | Scroll Lock |
| BK | Back |
| ESC | Escape |
| DEL | Delete |
| NL | Num Lock |

These specific locations are capable of variation, and should be programmable at the user's option.

INPUT SYSTEMS: STENOTYPE

In addition to more effective input of digital data by an improved keyboard system, input can be substantially speeded by controlled abbreviations for words and strings of words of high frequency, and for commonly recurring prefixes, suffixes, and other word elements.

Systems for speeding digital input by means of abbreviations are, of course, prior art. The impediment is, of course, the burden on the memory posed by such a system. What is new to this invention includes the following:

1) A mnemonic system built into a LAL can lighten the memory load of such stenotype, and thus make its use more practical, and
2) The LAL may be designed with such shorthand or rapid-typing features in mind as one of the aspects of its optimization.

Since numerals on the keyboard are akeady linked to letters by the mnemonic system, the numerals can be readily inserted into word abbreviations on the basis of alphabetic connotations. Design of a LAL might well take this consideration into account during morpheme selection. Once created, alternative shorthand forms for words would be collocated in the Central Concordance in a way that links them to their full forms in the LAL, and allows for rapid substitution with their full forms in text output. There would be an automatic means for replacing the abbreviations with the full forms linked to them, permitting a standard text to be quickly outputted

STEPS IN THE FORMULATION OF A LAL

The type of steps to be taken in creating a usable LAL under this invention are illustrated in FIGS. 18–25 and include the following: (with most examples chosen from a preferred embodiment of the system, i.e., one using English as SL and a global population as target).

1. SOURCE LANGUAGE (Illustrated in FIG. 18): Identify the SL to be used, defming the dialect range, time period, and other factors, and assembling pertinent data bases on the language selected and its varieties and usage groups. For some languages, a choice would have to be made between alternative writing systems. Decisions may be taken on the focus; the SL may, for example, be written English reflecting the spoken and written English of the U.S. between 1980 and 1999—and in a form that is considered "standard" by most educators.

Identify SL databases: Corpora, dictionaries and encyclopedic data-bases, word frequency lists, combinatory lists and dictionaries, sample documents, and generally accepted grammatical standards of such English usage are then identified, including in this example, materials that will show current usage in English on web pages and in electronic mail on the Internet. Native-speakers should also be available for consultation.

2. GRAPHEMES (Illustrated in FIG. 19.): Establish a written, digital, format in which the LAL can be recorded (both letters and punctuation), taking into consideration current input/output capabilities and graphemic practices worldwide.

Select an alphabetical system (a grapheme system) that is maximally usable on the Internet, and within the constraints of existing keyboard designs and word processing systems. Under prevailing circumstances, the Latin alphabet—in the modem form with 26 letters as in English—is by far the most common grapheme set on keyboards and other digital input systems around the world.

In order to encourage efficient trans-linguistic keyboard design, maintain the general outlines of letter frequency in the LAL as found in the SL and other languages using the same alphabet. E.g., the letters W and Z should probably not be more common in typical running text than A and E.

3. PHONEMES (Illustrated in FIG. 20.): Establish a phonemic (spoken language) format into which the LAL can be recast, taking into consideration the writing system and phonetic practices of the major linguistic cultures of the world, thus assuring a standard that will provide for accurate voice recognition systems by both persons and machines.

a. Design a system of word stress (accentuation) that will assure that individual words will be clearly recognizable in the flow of spoken sentences.
   b. Minimize the chance for error in understanding the spoken sounds of the LAL by employing an "avoidance system" that will enforce the maximum phonemic distinction between all independent lexemes in the alternative language. Identify those sets of phonemes that will be perceived close to other phonemes by speakers of certain major languages; for example, L and R to the Japanese, or B and V to Spanish speakers. Record such contrasts as to be avoided in the morpheme building and selection process below.
   c. Design the phonetic system of the LAL to optimize the accuracy of human-machine interface, wherein machine instructions can be readily distinguished from other input. Define the spoken standard of the alternative language from the graphemic string in the Central Concordance by use of a speech synthesizer, thus allowing for the automatic generation of the sound of the spoken LAL from a digital text, using as well the punctuation system selected for the LAL.
   d. Establish a total inventory of phonemes that is as small as possible and yet consistent with worldwide pronunciation norms and the need to reflect existing international roots, scientific nomenclature, etc. Adjust that inventory to the available list of graphemes in such a way as to create a fully predictable spelling system. (Note: In order to make the fit, one grapheme might denote a succession of two phonemes.)

4. MORPHEMES (Illustrated in FIGS. 21A–B.): Restructure the morphemes of the SL into a set of morphemes that are more regular, easier-to-learn, and thus more usable than those of the SL.

a. Substitute SL strings with replacement strings in the LAL that will maximize worldwide recognizability of LAL morphemes and therefore of the entire output text as it appears in the alternative language. Example: the English morphemes "small," "know," and "far," which have roots recognizable only to users of English, might be replaced in the LAL designed for global use by forms such as "micro," "cogni," and "tele," which are much more widely recognizable because of the global distribution of words such as "microscope," "cognition," "television," etc.
   b. Within the constraints of the above, search for non-European roots that may be employed to assure that the LAL reflects as many cultural traditions as possible. Examples: The word "chopstick" might be based on the form in Mandarin Chinese, or the word for "pocket" might be based on a form widely spread in the Islamic world.
   c. Consider vocabulary usages in as many languages as possible, (perhaps all languages spoken by over a million persons that are well documented) and emphasizing those that have been the bearers of high culture in the major regions of the world.
   d. Consider the usages established in scientific nomenclature and seek to maximize consistency with those in the LAL output. Examples: words for the elements "sodium" and "potassium" might best reflect their chemical abbreviations: Na and K.

e. Select the most common words in the SL from frequency studies, (for example, the top 200) and assure that they are reflected by equivalents in the LAL which will be reasonably short in terms of the number of graphemes involved. Apply this test, with less scrutiny, to the next range of most common words. (Example: those in the highest 5000 in frequency.)

f. Survey all morphemes tentatively chosen for the LAL. Do any replicate a word in any of the twelve most common languages which would render the term: offensive on religious grounds; appear to be a racial, ethnic, or other insult; or turn a common statement into something that might seem obscene. If there is a problem, alter the term sufficiently to avoid the troublesome resemblance.

g. Store all selected morphemes in what is to become the "Central Concordance" for the system so that they can be freely accessed from either the SL or the evolving LAL (see below).

5. ESTABLISH A "CENTRAL CONCORDANCE" (Illustrated in FIGS. 22A–B) A core element in using a linked alternative language to achieve the goals for which it was generated is the formulation of a database called here the "Central Concordance." This Concordance begins as a list of strings of digitized alphanumeric data which appear in running text (corpora) of the chosen SL and are recorded, filed, and indexed in such a way as to allow rapid recovery, comparison, and use in the translation process; as the LAL is devised, new strings for the LAL are filed alongside (collocated with) the SL strings to which they map. The Central Concordance thus becomes the "linking device" that links or maps the SL to the LAL. It also serves as the means for associating other subsidiary databases with the core.

The SL side of the Concordance would record not only preexisting SL words (as found in standard dictionaries) but also those words coined for disambiguation, such as the tagged words in TABLE 8. Beyond its basic core of indexed sets of two collocated strings (in SL and LAL), the Central Concordance may also link to subsidiary databases, such as the following;

a. computerized recordings of the sounds of the word or phrase in the alternative language. Example, a .WAV file corresponding to the file for written text;
1). as such word or words would occur in normal speech in the LAL and,
2). as such word or words would occur in the LAL in the secondary phonetic mode (or "chant mode"), a more carefully enunciated version of the LAL, with greater acoustic redundancy.

b. a graphic file (in JPG, GIF or other format) that illustrates the meaning of the collocated string, annotated by symbol or other graphic means, or by a Java applet displaying motion;

c. information on the source of the LAL word or phrase, showing which natural languages have a similarly pronounced or spelled word for that meaning;

d. information on possible ambiguity in the usage of the word or phrase;

e. a standard dictionary entry on the usages of the word or phrase in the source language;

f. a standard bilingual-dictionary entry on the usages of the word or phrase in the source language and in any of a plurality of other natural languages or emulations thereof. For example, the entry on the English word "insect" as it appears in an English-Swahili dictionary;

g. illustrations or applets displaying a "sign language" equivalent of the word or phrase in the source language. Example: the equivalent of an English word, illustrated in ASL, the American Sign Language.

h. shorthand (quick-type) abbreviations for many of the common entries in either the source language or the alternative language; i.e., expandable "short forms" for speed in digital input.

i. (in some cases) an alternative set of words in the SL and LAL to be used with a vocabulary reduction strategy (VRS).

j. (in some cases) interface with databases of delimiting templates in third languages, i.e, languages other than the source language and its linked alternative language.

6. GRAMMAR (Illustrated in FIGS. 23A–D): Steps to be taken to restructure the grammar of a SL into a more regular and easier-to-master format for the LAL might include.

a. Consulting the database represented by the various resources and corpora mentioned above, examine strings of digital input from the SL at the lexeme level for part-of-speech (POS). Does the string finction as a noun, a verb, or what? Mark the string for each function it may perform in the SL. If it serves as more than one POS, mark it for the combination in which it may appear. Thus, in English, "foreign" is only an adjective; "appeal" can be a noun, verb, or adjective; "clean" can be a verb or adjective; etc. Record all the marks (annotations) in the Central Concordance. It should be noted that exceedingly rare POS usages can be ignored in some circumstances, as must metalinguistic usages. The corpora provide data on frequency of usage. Moreover, the fact that most English nouns can be used as attributive adjectives under some circumstances, means that this need not be considered as an ambiguity. The objective is to find patterns that can be marked in the form of the output LAL lexeme which will contribute to speed of learning and ease of sentence comprehension by both persons and machines.

b. Examine each string for any declensional or inflectional pattern in which it fits as a lexeme. Thus, in English, "children" is a form of "child," and "went" and "gone" are forms of "go." Consult the various resources and corpora mentioned above to establish such usage. Is the word part of a larger set or words? If not, go to next step; if so, then assure that it is cross referenced in the Concordance to other strings in the larger set.

c. Identify the structure of such patterns, and mark the position of each specific word in one or another pattern. Thus English verbs like "to cut" or "to hit" have only one form for both past and present (in the first person), while "to park" has two forms ("park" and "parked") while "to sing" has three ("sing," "sang," and "sung"); and verbs like "to come" follow the three usage categories of "sing" but equate the third with the first ("come," "came," "come"). Thus also some words in English have plurals that are identical to the singular (for example: corps, species) while others have no plurals at all (for example: information).

d. Identify strings that represent homographs that cross grammatical boundaries. Is the same string part of two or more larger sets? If not, go to next step; if so, then assure that it is cross referenced to both sets. Example: the word "leaves" in English is both a plural of the noun "leaf," and part of the verb "to leave." Reexamine the morphemes chosen for such strings and assure that they are designed to minimize the cognitive dissonance created by such overlapping functions.

e. From the database, import a list of the very most common words in the SL, the pronouns, the numerals, certain prepositions, and the like; and assure that they are varied enough in word endings and form that they will not be in danger of confusion in texts. (They become exceptions to the general simplification process.)

f. Establish word ending patterns based on part-of-speech and other usage categories.
   1. Mark the source language string and its equivalent LAL string to make this usage pattern evident, for example, by adding a characteristic vowel ending.
   2. Search for, establish, and mark categories of words in the source language (other than parts-of-speech), which will further help clarify the likely usage that is typical for such words in the source language. Example in English: agentive words ending in -or, such as "advisor" or "donor."
   3. Mark the equivalent alternative language (LAL) string to make these additional usage patterns evident, providing (for example) a characteristic word ending for the category.
   4. When a word in the source language falls under more than one of the categories above, seek a marking that can reflect such ambiguous usage. Example: the -er ending of the English word "cleaner" may label the word as both an agentive noun and a comparative adjective.
   5. Create a protocol under which one possible word-ending will take precedence over another word-ending in the final structuring of the LAL word.

Words that take part in complex or overlapping grammatical patterns in the SL must be identified and tactics developed to minimize complexities in the LAL. Thus with English as SL, those adjectives forming their superlative with -est, rather than a "more . . . " pattern must be marked. In some cases, "rule-building" in the LAL may be avoided by introducing a randomization factor into the automatic translation process.

7. SEMANTICS (llustrated in FIGS. 24A–B): Restructure the semantics of the SL vocabulary, finding new and more logical forms and relationships. Identify troublesome homographs that will require special design care.

As the result of examination of semantic content of the strings in the source language, consider the re-morphemization of the word and/or the restructuring of the sequence of words within the string to be created for the LAL. Establish systems of prefixes and suffixes that will be much more regular in terms of semantic import than those of the SL. Search for and mark punctuation features and other special elements in the SL text (such as underlining of words to be emphasized) which have semantic content and are thus candidates for inclusion in the concordance along with equivalencies in the LAL.

Create hypothetical semantic fields for the SL that can supply additional terminology of value to the LAL. This can be used to provide the LAL with capabilities for expressing concepts not native to the culture represented by the source language in a manner not easily expressible in the SL.

Search data bases for those mathematical and symbolic logic symbols, treating each symbol as if a string to be supplied with an established, speakable translation in the alternative language. The morphemes upon which these logical terms are based will normally resemble words existing in the LAL for ease of memory, but will be marked in such a way as to indicate that they are logico-mathematical in semantic impact.

8. SYNTAX AND PHRASE ANALYSIS (Illustrated in FIGS. 25A–B):

At this level, it will be possible to restructure certain features of the syntax or phrase structure of the SL into new formats that are more systematic, easier to learn, and decrease the ambiguity of texts by the use of AI and other methods.

From corpora on the SL (in the data base) make a list of commonly occurring long strings (multi-word strings or phrases) in the SL—perhaps those likely to occur several times in a typical text of a million words. Search for long strings of input, including a plurality of lexemes from the SL that have set semantic content and will thus be candidates for having alternative forms chosen for replacement in the output LAL texts to be generated.

Identify gender and other patterns in the SL that require one form of a word before certain words, another form before others. Thus all English words that are preceded by "an" rather than "a" must be so marked. Establish a system to handle case distinctions; in English, this would include "possessives" and other endings in "apostrophe followed by S" or in "S followed by an apostrophe".

Identify longer strings of alphanumeric characters that can be treated as a whole. These will often be strings of words that map to a single semantic function, for example, English "to and fro." These may also include entire sentences ("How are you?"), words tied to punctuation marks, or logical and other symbols that may be incorporated into text. Mark the beginning and end of all strings that are to be left unchanged in the output. Examples from English: abbreviations in all-caps such as IBM and CPA.

TEXT ENHANCEMENT

After texts have been generated using the most basic elements of the translation system, several hierarchical levels of text enhancement may be added to the translation. The first level is automatic in implementation and will normally be applied. The second level is optional, but can also be automatically applied. The third level is optional and is "human-assisted" in part, rather than fully automatic. The process of enhancement can annotate the original SL input in a variety of optional ways.

Artificial intelligence (AI) methods may be applied to the text to reduce the ambiguity of individual words and to simplify and clarify the grammatical structure of sentences, but usages must be limited to those that will retain the full bi-directionality of translation between the source language and the alternative language. This automatic bi-directionality must remain valid under all circumstances for any grammatical text which is written in the source language.

Enhancement may involve marking or annotating the input SL text. Example: the conjunction "that" (the omission of which is common in English but which cannot be omitted in most continental European languages) can often be inserted into a sentence by AI means. The English text in such cases might be marked: "This is the book [that] I told her about," or "Tell him [that] we came."

Human-assisted enhancement: This opens the text for human-assisted input for further implementation of the VRS and/or reduction of ambiguity, using a computer-coached strategy. This level involves a computer guidance system to supply alternatives for rare or ambiguous words, and to provide usages that are simpler and more precise. In some cases, it involves marking the source language text with usage-narrowing indicators.

a. categorizing words by domain, i.e., specifying the field of science or activity involved, i.e., zoology, sports, chemistry, etc.; (TABLE 8)

b. refinement of part-of-speech indicators that are otherwise ambiguous;

c. search for idioms that may confuse. Example: "put up with";

d. search for usages that are culture-specific when they need not be;

e. search for trite phrases that can be replaced;

f. display a dictionary entry on the SL/LAL word in a selected third language.

COMPUTER-STANDARDS FOR THE VOICE OUTPUT SYSTEM

Standardization of the phonetic and audio aspects of the LAL is accomplished under the preferred embodiment of this invention by means of a computer using a neural network which is trained using the techniques of back propagation.

By applying voice training to the phonetic outlines of the language, the computer is taught to generate properly spoken sentences of all types with the natural cadences of human speech. The process begins with the selection of a corpus of data in the SL. This might be at first a few hundred sentences collected from works on sentence intonation, stress and tone patterns in the source language; later a novelette might be added. This material is then translated into a LAL text. A person familiar with the phonetics the LAL then reads the text into an audio file and stores that file. The computer is then tasked to convert the written texts of data, phoneme by phoneme and word by word, into an audio stream, replacing the graphic input with a string of equivalent audio records.

Using a "neural network," the computer then compares the computer-generated audio stream and the human-generated audio stream by means of a neural network which is trained using the techniques of back propagation. The process is then repeated, perhaps with more text by a speaker with a different linguistic background. Over repeated iterations of training, the neural net rearranges its synaptic connections to emulate more closely the human generated audio file. This creates a new audio file, which is then stored for comparison with the human-generated file. The process is reiterated by the machine many times, saving each more sophisticated audio file as generated by the machine. This process is continued, until the difference between the computer generated audio stream and the human generated audio stream becomes so slight as to be imperceptible. The process is used to create standards for both male and female voices. Persons subsequently learn to speak the LAL properly by mimicking its machine-generated standard.

NOTE ON TRANSLATION OF VOICE DATA

Translations between a source language and its linked alternative language can be done by means of audio files as well as by files of written text. A key to this is the fact that an LAL may be sufficiently well expressed in graphemes that a sequential record of those graphemes can be used to generate an audio file recording speech. Audio files may also compose part of the Central Concordance.

The nature of the system described in this invention allows for fully automatic translation, without any semantic loss, between the following:

(1) from a written text in the SL to voice output in the LAL, (2) from voice input in the LAL to a written text in the SL, (3) from voice input in the LAL to a written text in the LAL, and (4) from a written text in the LAL to voice output in the LAL.

Natural languages do not have written systems that allow full and error-free translation to their spoken form. This is a problem with English, which has quite a few words that sound alike—homophones such as "two," "to," and "too." In other cases, a written English word may have two pronunciations, depending on use—homographs such as "dove." Thus, certain categories of translation will require more approximate methods relying on such things as databases for identifying homophones and homographs in the source language, computer-based means for distinguishing between such words in the source language on the basis of context, and the like. It may be necessary for the computer to generate queries to the user to resolve certain problems presented by homophones in the source language.

These less automatic processes would apply to translation in the following modes:

(1) from a written text in the LAL to voice output in the SL, (2) from voice input in the LAL to voice output in the SL, (3) from voice input in the SL to voice output in the LAL, and (4) from voice input in the SL to a written text in the LAL.

VOICE GUIDANCE SYSTEMS

One of the potentially valuable communicative aspects of a LAL is that it can have features built into its structure that will greatly improve the ease and reliability of voice guidance systems over the simple use of a natural language. While improvements in voice communication technology have made such crude methods as "Able Baker Charley" systems much less necessary, noisy channels will remain. The current explosion of capabilities for international communication on the Internet, which will increasing feature expansion from exclusively digital to more oral means, will result in a much larger number of persons hearing or producing oral output that is not typical of the standards familiar to the listener. This also relates to situations in which the "listener" is the audio input system of a machine.

Interface with a machine would, of course, imply means for consulting data banks and feedback systems inside and outside the larger apparatus for information needed for making decisions prior to giving instructions to the controllable machine. Feedback from the machine might also take the form of voice output in the LAL.

Computer-established standards for voice output systems in the LAL will help to standardize and clarify voice-based usage of the LAL. But there are other possible voice-related innovations that can be built into LAL systems.

A defined secondary phonetic mode, or "chant-mode," may be used for pronouncing the LAL under difficult or sensitive conditions such as within noisy channels and among speakers from diverse linguistic cultures, such mode being fully linked to the standard phonetic mode for automatic translation at will. This mode would be automatically derived from the standard phonetic mode, and the relationship would be so simple as to allow easy learning.

Special LAL voice-guidance vocabularies may be set up (for example, by special tagging of pre-existing words) that would establish more reliable systems for the direction of controllable machines by voice. The LAL would need additional vocabulary to provide means for directing the controllable machine in the entire repertoire of manners in which it is controllable. These coined words would be linked to a SL but be much more explicit than anything than can be expressed in the SL without long circumlocutions.

The usages created for this methodology within the LAL would be concise and easily distinguished (in both written and audio form) from words in the linked alternative language which do not convey instructions to controllable machines. Usages would be much clearer in the instructions that they provide than would be possible in the SL. For example, a LAL might be designed to have no standard word-ending in the syllable -lu, but use this final element to tag and identify machine instructions. Thus, if the word "come" were "veni," the equivalent instruction to a mobile machine might be "venilu."

Rather similarly, the LAL methodology might also be used for programming a machine by oral (or written) commands. The LAL could be used as a means for composing computer code in a high level programming language by outfitting the LAL with additional features to provide for translation between the LAL and a high level programming language by:

(1) establishing a vocabulary of pronounceable words in the LAL that link to strings of computer code in such a programming language, (2) establishing a system for sets of words in the LAL that format structural patterns for the placement of non sequential strings of computer code in such a programming language, (3) forming such words in a manner which is consistent with the morphology of the LAL and capable of being efficiently learned, (4) marking such words in a manner which renders them fully distinguishable (in both written and audio form) from words in the linked alternative language which do not convey instructions for programming a machine, (5) assuring that the audio form of LAL words are well distinguished and capable of highly reliable voice transmission within noisy channels and by speakers from diverse linguistic cultures, (6) providing an electronic text editor adapted for signaling the author when it is clear that an input instruction does not comply with the format of the programming language.

MULTILINGUAL TEMPLATES

A related embodiment allows for limited multilingual translation using a plurality of natural language databases closely linked within the constraints of a format using delimiting templates. This capability can provide Internet users with a useful, though limited, means to communicate across linguistic barriers, while at the same time facilitating use of a LAL for wider communication. What can be sent are delimited "communicative texts" in which words are fixed within a set frame or matrix that defines their usage quite narrowly and thus allows for practical linking between natural languages. Communicative texts might include (but not be limited to): greetings, business letters, standardized personal letters, pen-pal letters (FIG. 10), inquiries, requests for information, purchase orders, response letters, acknowledgment letters, transmittal letters, and language lessons. All might be sent in either hard copy or electronic mail form.

Within its natural limitations, the template system can serve to supply multilingual communication with full accuracy—between languages as diverse as French and Indonesian, or Swahili and Finnish. A delimiting template could take many forms. An example of one format follows. It uses English as source language and Spanish as target; it also assumes the existence of a LAL optimized for international communication and linked to English. Features are:

1) Basic Template: This would take the form of a page of incomplete text in English, displayable on a computer monitor, the computer having a default-setting capability. The page would have slots for the insertion of words, movable subordinate parts, clickable buttons that produce menus, and hypertext links to further databases and to a statement in English of the delimiting factors being enforced by the template.

2) Default-setting capability: This allows the system to be set for the specific target language, in this case Spanish. This in turn allows the system to recognize any special problem in linking any English word or string used in the template to a Spanish equivalent. Other defaults might specify display of the LAL on the template, use of metric terms, use of the Islamic calendar, etc.

3) Slots: These are points at which alternative words, selected to be properly linkable in the given context, are inserted. Words in "tagged English" or in the LAL would more often be linkable to Spanish words, of course.

4) Subordinate Parts: These include the date block, and sentences that may be moved within or deleted from the template page.

5) Menus: Where the items to fill a slot are few, a pull-down menu may be used to make a choice; example, between the days of the week.

6) Linked Databases: These are hypertext links that supply additional data on vocabulary that may be usable in the text, references to related templates that might be inserted within the template displayed, etc.

7) Statement of Delimiting Factors: This would include a clarification of all the factors that control what interpretation is to be given to the resultant translation, i.e., the context in which the communicative text is to be understood. This statement would be available in the target language, of course.

8) Feedback Interface: Any violation of the linkage system used by the template would be brought to the attention of the user, who would be supplied with suggestions for staying within the delimited template or would ultimately be able to override the system constraints.

9) Special Vocabulary: The enhancements built into a LAL linked to English would greatly increase the number of linkable Spanish words available for this system. Linkage between standard English and Spanish would be possible for relatively specific words used in the proper context, such as: seventeen, mango, hydrogen, London, or modem. Though not representing linkable items available in standard English, the LAL equivalent of a tagged English term such as "bat=z" (for the flying mammal) does link to a specific Spanish word; this system, and the related system for marking part-of-speech in the LAL, greatly expands the size and scope of linkable vocabulary.

10) Vocabulary in Grammatical Context: The template must delimit usages and choices for languages with complex verbal conjugations (such as Spanish) and complex noun declensions (such as Russian).

11) Databases: The system would establish a database of delimiting templates in the source language and its LAL, structured identically to databases for the same templates for all supported target languages, so that each alphanumeric string listed in one database will have its equivalent in all the others. (Nothing would prevent, however, certain additional limitations on translations between specific words in specific languages, if such would have value.)

12) Graphemic Requirements: Since this system is able to translate (within its constraints) to languages that do not use the Latin alphabet, such as Russian, Arabic, Japanese, and Chinese, it will require a means for outputting translated text in the graphemic format normal to any supported target language.

LOGICO-MATHEMATICAL FEATURES

It is possible for a LAL to provide for a wide range of logical and mathematical features not normally available in the source language. To allow this, the apparatus should provide input means for the symbols of mathematics and symbolic logic, and for strings of said symbols including mathematical formulae, by keyboard or otherwise.

The Central Concordance would also contain a logico-mathematical system database, forming a subsidiary part of the vocabulary of the linked alternative language and including words in the LAL chosen to equate to the symbols of mathematics and symbolic logic, It would also include LAL words chosen to equate to descriptive strings of words capable of being inserted into sentences in the source language and expressing logical and mathematical relationships.

LAL words for concepts such as those expressed in symbolic logic might be designed to have a typical ending—one not otherwise commonly used in the LAL. In the examples below, that ending is -il. A few LAL "logical words" might be:

| | |
|---|---|
| estil | relating to the "backward E" symbol, meaning (roughly) in English: "there exist(s) (one or more)" |
| potil | relating to the "diamond possibility symbol" meaning in English: "it can properly be considered possible that" |
| eqil | meaning in English: "(is the case) if and only if" |
| subsetil | meaning in English: "is a proper subset of the set:" |

Dozens of such potential LAL words can be formed.

Logico-mathematic LAL words would be usable in any normal sentence into which they fit. Their morphemes reflect morphemes in the rest of the language, tagged as strictly logical in import only by their endings. Since all is pronounceable, this system would also allow the translation of logical and mathematical symbols and strings of such symbols into strings of voice output in the LAL.

OTHER FEATURES: An LAL can also incorporate additional tactics for simplification, reduction of likely stylistic errors, meeting felt needs for vocabulary that does not normally exist in the SL, and improving ease of learning and mnemonic efficiency.

An example of a "felt need" in English is that for an alternative gender-free pronoun system. The LAL can supply a systematic set of gender terms, including optional pronouns, that will avoid any inherent "sexism" in the source language and not be as clumsy as formulations in English such as "(s)he" or "his/her".

Figure 11A:
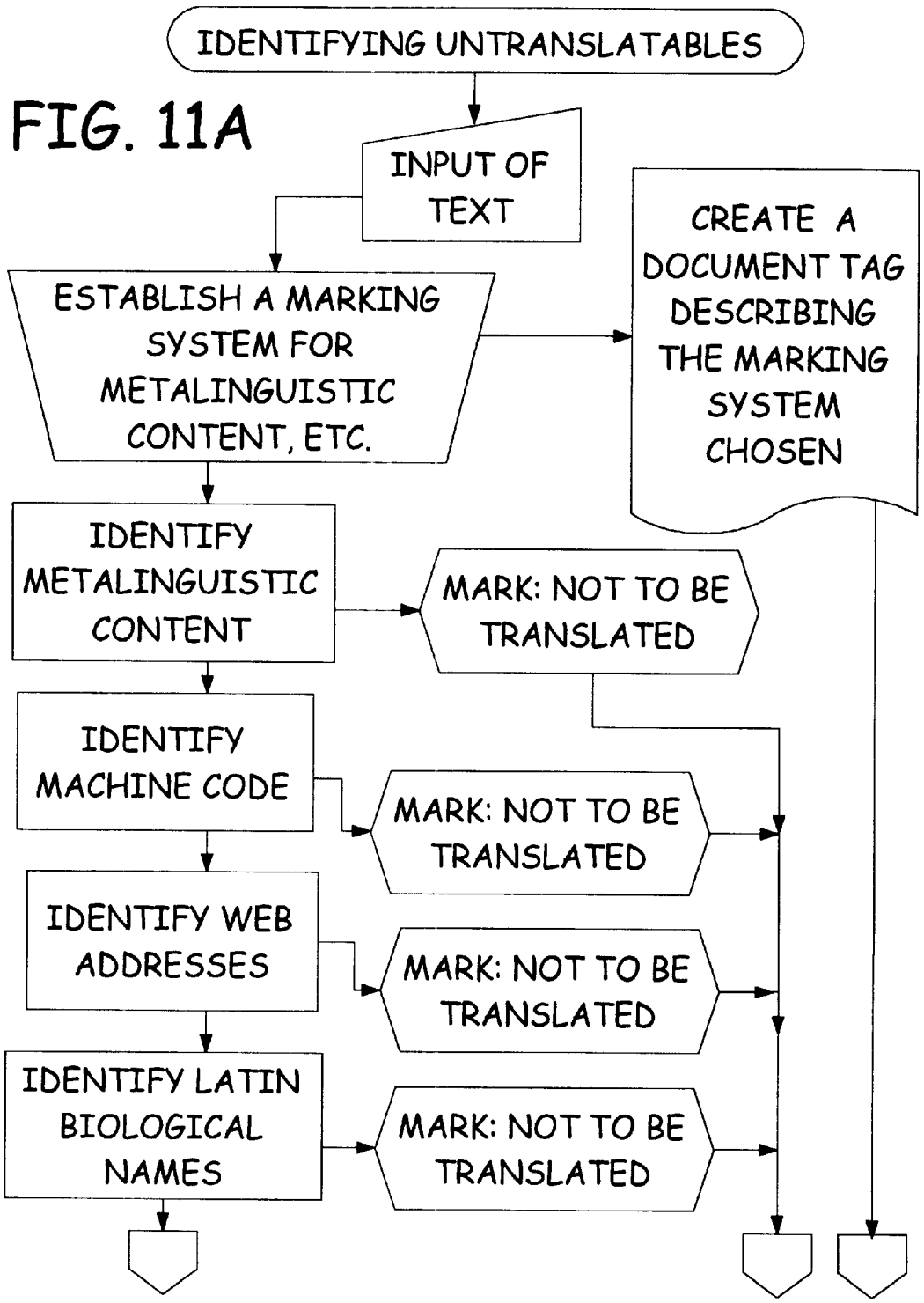

NON-TRANSLATION: It will also be necessary to identify within texts those materials not to be translated, a process illustrated in FIGS. 11A–B. Some of the steps to be taken to do this would be:

a. Identify and mark digitized strings that are likely to constitute web addresses and the like; for example, strings with an internal dot, @-signs, or backslashes (\) not separated out with spaces. Similarly, any text appearing between a "<" and a ">" would be a candidate for "material not to be translated."

b. Identify and mark digitized strings (more than one letter) that are in all-cap format, such as NBC or UPS. Mark these to remain as they are, and in the same order in respect to other strings, but highlighted.

c. Identify and mark all digitized strings that follow the format for Latin biological species names (by use of italics, capitalization patterns and characteristic word endings) or which follow the pattern of chemical formula. Mark these to remain as they are, and in the same order in respect to other strings.

d. Create a system that will allow the optional marking of proper names expected in an input text so that they will not be translated in any confusing manner.

e. Establish patterns for words in the alternative language that will indicate that instructions to a computer or other machine input system begin and end at the points at which they occur. Retain in memory such instructions as format the text—those organizing, for example, the text within a web page—so that these instructions may later be reinserted to reformat the output translation in the alternative language.

OPTIMIZATION FOR GLOBAL ACCESS TO DATA

A preferred embodiment of this invention would be one that uses its capabilities to provide access to digitized data in English to persons who do not presently have a command of English. The source language (SL) would thus be modern English. Optimization would be defined in terms of ease and effectiveness of the linked language for wide-spread international use (TABLE 7).

By selecting English as the SL, the system provided by this embodiment of the invention can provide easier access for the entire non-English-speaking world to all of the data currently digitized in English—and by means of computer programs (software) the invention can provide very rapid and completely error-free translation to the LAL of electronic mail and web pages on the Internet currently in the English language. Persons not knowing English, the vast majority of the world's population, will thus have the option of using the LAL rather than English.

Features other than ease of learning that can be accommodated within the system include: greater clarity of meaning, reduction of ambiguity, increased speed of text input (digitalization), greatly improved voice-recognition capabilities, mnemonic systems, improved human to machine interface, increased neutrality of format between competing linguistic cultures, error-free text to voice capabilities, etc. The "text to voice" feature means, for example, that any computer screen displaying a text in the LAL can be equipped with a feature that will pronounce that text in the LAL without the considerable margin of error and confusion inevitably experienced when converting a language such as English from text to voice.

Optimization of a linked alternative language designed for world-wide access to data would also include such features as:

a. incorporating a vocabulary that will be as widely recognizable as possible to members of the major linguistic cultures of the world, neglecting none;

b. providing the easiest possible access to information and data banks in the SL by worldwide populations not knowing the SL;

c. accommodating a sub-form with a reduced vocabulary that will assure very simple and yet reliable data creation;

d. providing for maximally reliable voice recognition systems;

e. providing a more efficient system of cataloging and search on the Internet, by means of the reduced vocabulary system, combined with a system that coins and classifies basic semantic relationships and catalogs entities more efficiently than a natural language;

f. creating a language format that will be maximally acceptable to worldwide populations as if a natural language.
g. providing for a well-established pronunciation standard for the spoken language based on voice synthesis by machine, but guaranteeing the normal cadences of human speech;
h. providing capabilities for decreasing the ambiguities within the source language.
i. creating awareness of the features and ambiguities of the source language, an educational feature of value to persons wishing to learn the SL.

All this must, of course, be accomplished within constraints that guarantee a rapid and fully-reliable bi-directional machine translation relationship to the SL. (FIGS. 3 and 4, and TABLES 3 and 4 treat of these factors.)

In this embodiment of the invention, the SL will be taken as modern English, encompassing both US and UK sub-sets, and especially that form of English currently used on the Internet and in computer-generated digitized corpora and data banks; the "optimizations" will be keyed to making the LAL as valuable as possible to as many people as possible, and with minimum effort. However, the general methodology of this invention covers similar systems that might be set up with Chinese, Russian, or any other natural or artificial language as the SL, or with only a sub-set of such a language selected—such as "data on diagnostic medicine in German" or "pharmacological information in French." Similarly, the invention would also cover a LAL designed for use by a specific linguistic culture or a particular industry or scientific discipline within such a culture. Thus the system and method of this invention can be used to provide, for example, Chinese meteorologists with access to Japanese weather data by creating a LAL expressed in a carefully chosen sub-set of Chinese characters.

The basic steps required to create a linked alternative language optimized for global use from English as source language are covered above in STEPS IN THE FORMULATION OF A LAL, as well as in TABLE 7 and in FIGS. 18 through 25. This preferred embodiment of the invention can use many methods and means for translating English input (both inside and outside the computer context) into the global LAL. Two subcategories are, however, addressed for further illustration of the system:

a. A Basic Text Translator (for translation of documents in the least ambiguous form available.) FIGS. 8A–D,
b. An Internet Translator (for on-line, rapid translation of electronic mail and web pages (FIGS. 9A–C).

THE COMPREHENSIVE TEXT TRANSLATOR

Basically, this step involves the creation of a "text translator" (in the form of a word processor or an add-on to an existing word processor) which translates a text between English and the LAL, and displays the output text in any of a variety of pre-selected modes—including but not limited to, parallel columns, interspersed lines, and by means of hypertext relationships. Alternatively, it may send the resulting translation to a printer, store it on a disk, post it on the Internet, etc.

The proper operation of this system, for this embodiment, presupposes that the input document be in the English language, and in a dialectical form for which it was designed, and that metalinguistic inclusions, if any, are appropriately marked in accordance with a system recorded in a document tag. It also assumes the prior creation of a data base called the Central Concordance, described above.

Major steps to be followed include:

a. Identify and save all document formatting code for later reinsertion.
b. Go to the beginning of the identified English language text and begin the search for strings of alphanumeric characters that may be stored in the Concordance.
c. Annotate the beginning and end of all strings not found in the Concordance and so record them in the output, unchanged except for marking.
d. Sequentially replace all strings in the text with their equivalent strings in the LAL from the Concordance, maintaining the original order in the text.
e. Apply such artificial intelligence (AI) and other methodologies to the text as have been chosen for further clarification of texts, consistent with the constraints that would guarantee fully automatic bidirectional translatability with the English text.
f. Reestablish page format in accordance with stored formatting code.
g. For the designers: Store the list of strings discovered in the English text that do not have a LAL equivalent in the Concordance, and subsequently submit them to the analysis described above, for possible addition to the Concordance.

Enhancement phases: Several hierarchical levels of text enhancement may be added to the translation output produced by the above. The first level is automatic in implementation and will normally be applied; the second level is optional, but can also be automatically applied; the third level is optional and is "human-assisted" in part rather than fully automatic.

Fully automatic phase: Apply the methods of artificial intelligence (AI) and computational linguistics to the text to reduce ambiguity of individual words and to simplify and clarify the grammatical structure of sentences, but strictly limit such usages to those that will retain the full bi-directionality of translation between English and the alternative language. This automatic bi-directionality is the "link" which must remain in place under all circumstances for any grammatical text written in the source language. This may involve marking or annotating the input text.

Optional "human-assisted" phase: Open the text for human-assisted input for further implementation of the vocabulary reduction strategy (VRS) and/or reduction of ambiguity, using a computer-coached editor-system. This level involves a computer guidance system to supply alternatives for rare or ambiguous words, provide usages that are simpler and more precise. In some cases, this involves marking the English language text with usage-narrowing indicators. Steps include:

a. refinement of part-of-speech indicators that are otherwise ambiguous.
b. search for idioms that may confuse. English example: "put up with . . . " might be replaced with "tolerate" or "endure."
c. search for usages that are culture-specific when they need not be. Example: The phrase "as rich as Midas" might be avoided in a text to be sent to China or elsewhere where tales of King Midas might not be known.

DESIGN OF THE INTERNET TRANSLATOR

A second realization of this preferred embodiment, the Internet Translator, provides for the rapid translation of e-mail and web pages on the Internet. This embodiment of the invention might involve the development of a system that can operate within an existing web access program, translating virtually instantaneously web pages from a source language such as English into an alternative language for global use. It might use an abridged version of the Central Concordance, described above.

There follows a description of some of the steps involved in that subset of the invention, called the "Internet Translator," which is designed for the rapid transformation of web pages, chat rooms, and other features in English on the Internet into mirrored images in a LAL optimized for international use. The steps are illustrative and need not all be taken in each case.

Design the net software ("plug-ins," et al.) under standards that will allow for a sub-set of the Central Concordance (here called the "Internet Translator Concordance") to be loaded into the computer, in such a way that it can to be used with state-of-the-art web servers, browsers, and to possess (within those systems and without) most of the conventional capabilities of word-processing systems.

Accommodate the above mentioned plug-in to perform such other available methodologies as will assure that the Internet Translator system produce its translations as rapidly and efficiently as possible, for example, by displaying the translation of the first screens of a web page before finishing all of the translation of the latter screens.

Prior to use in the web page translation process, an abridged form of the Central Concordance may be created to accomplish web page translation as rapidly as possible. For a minimal configuration, select only the written English and written LAL data from the full SL/LAL Central Concordance and copy it to what will be called the "Internet Translator Concordance." Consult English language frequency lists to identify the most common words in English (such as the most frequent 300); use or develop similar data to identify the most frequent words used on web pages and in chat rooms today (for example, 100 of these words in addition to the 300). As appropriate, put high frequency words to the front of the Internet Translator Concordance, or otherwise mark them to assure that they can be most rapidly found during the translation process.

Adapt the Internet Translator Concordance to take such other available programming steps as will allow the Internet Translator to translate as rapidly as possible. Design the software ("plug-ins," et al.) under standards that will allow the "Internet Translator Concordance" to be loaded into the computer in such a way that it can be conveniently used with state-of-the-art web servers, browsers, and related applications, and to possess most of the conventional capabilities of word-processing systems.

Accommodate the above mentioned plug-in to perform such other available methodologies as will assure that the Internet Translator system produce its results as rapidly as possible, for example, by displaying the translation of the first screens of a web page before finishing all of the translation of the latter screens. Considerations of speed would be given high priority in systems interfacing with such features as on-line chat rooms.

IMPLEMENTATION ON THE INTERNET

To perform the SL to LAL translation process within the Internet, means for the following would need to be assembled:

(1) for downloading SL text from an Internet connection;

(2) for inputting LAL text into an Internet application;

(3) for using this inventions's translation system while maintaining an Internet connection;

(4) for transmitting the translation across an Internet connection;

(5) for displaying translated texts within the Internet application; and (6) for outputting in the LAL from the Internet application.

Steps to take might include: Load the "plug-in" and the "Internet Translator Concordance" into the computer, activating the web server, the browser, and the conventional word-processing capabilities of the program. Load the web page or other document to be translated. Verify whether the document appears to be in the English language. (This can be done by scanning for the very most common English words and by noting the presence of non-English alphabetical symbols.) If the document does not appear to be in the English language, the system should inform the user. (The system may provide an option for the translation of such English words as do appear.)

Begin scanning the document for translation, applying the following steps in accordance with those techniques and that ordering which will be shown most conducive to rapid translation of web pages:

1) Identify those parts of the inputted document that are NOT to be translated:

a. Search for, isolate, and mark any computer instructions or code located within the document, for example: text formatting or HTML code.

b. Search for, isolate, and mark computer graphic input, and record the place it appears on the page.

c. Identify and mark digitized mathematical formulae within the document.

d. Identify and mark digitized strings that are likely to constitute web addresses and the like; for example, strings with an internal dot, @-signs, or backslashes (\) not separated out with spaces.

e. Identify and mark digitized strings (more than one letter) that are in all-cap format. Mark these to remain as they are, and in the same order in respect to strings, but highlighted.

f. Identify and mark all digitized strings that follow the format for Latin biological species names (by use of italics, capitalization patterns and characteristic word endings) or which follow the pattern of chemical formulae. Mark these to remain as they are, and in the same order in respect to other strings.

g. Identify all commas, Arabic numerals, exclamation marks, brackets (both square and curly) question marks, etc. Mark these to remain as they are, and in the same order in respect to strings.

h. Mark all words containing accent marks, umlauts, and other symbols not existing in English—treat as in g.

2) Identify and mark all remaining digitized text for translation.

Locate and mark all identifiable beginning and ending quotation marks, assuring that they are taken as such and not confused with apostrophes. (This will require a list of words that begin with an apostrophe. Examples: 'twas, 'twixt.) Open the identified text and begin the search for strings of alphabetic characters, spaces, parentheses, and certain symbols (for example: "_ – & % #) that have identified translations from English to LAL in the Internet Translator Concordance. These strings will often equate to words ("words" being defined as strings of letters separated off by a space on either side). They may, however, include strings of words that map to a single semantic function; for example, the English phrase "to and fro." They may also include entire sentences ("How are you?"), words tied to punctuation marks, or logical and other symbols that may be incorporated into text.

Identify and mark those strings that are likely to represent surnames of persons (by their appearance on the page, by their capitalization pattern in the sentence, by appearance after titles, and by word frequency data). Leave clear cases un-translated, but with a translation following in curly brackets {}. Mark doubtful cases to be tentatively translated, but to be highlighted.

Sequentially replace all English strings found in the Concordance with their equivalent strings in LAL, maintaining the original order in the text.

If a hyphenated word in the English input is not itself to be found in the Concordance, retain the hyphen(s) and search for the substrings so separated.
  a. If all of the above sub-strings are found, replace the English of each with the LAL, retaining the hyphens.
  b. If any of the sub-strings in the hyphenated word are not found, leave the entire string in the output unchanged.

Annotate (perhaps by prefixing a small but distinctive "bullet") the beginning of words that are possibly English but not found in the Concordance and leave them in the output, otherwise unchanged.

Remove the highlighting of unfound strings that appear as highlighted since in all-cap format.

Annotate those words in the LAL output that may correspond to more than one English word, such as the equivalent word for the articles "a" or "an", "labor" and "labour", or the versions "hippopotamuses" and "hippopotami." (Perhaps by hypertext marking or by following secondary alternatives with small but distinctive "bullets") The purpose of this is to speed two way conversions on the Internet, by lessening the need for more complex programming to make replacements.

Retrieve from memory such instructions as format the text (those organizing, for example, the text within a web page) and use these instructions to reformat the output translation in the LAL.

If the LAL text is sufficiently longer than the original English, either add one or more lines to the web page, or (especially when in association with graphics or columns) reduce the size of the font in which the LAL is displayed within the net browser.

For speed of operation on the Internet, the Internet Translator system need utilize only a few enhancement features. The following are the type of additional actions that might be appropriate for the Internet Translator.
  a. Mouse click on highlighted words in the display to replace them with, or temporarily show, their alternative.
  b. Mouse click on web page graphics to display, translated into the LAL, any text that is underneath the graphic.

TRANSLATION DEVICE

FIG. 26 is a schematic illustration of a translating device for practicing the invention. The translation device 10, comprises a central processing unit CPU 12, a data entry device 14, an output device 16, and a storage system 18, such as a computer hard drive or CD-ROM. Stored within the storage system 18 is a central concordance 20, which comprises a dictionary database of vocabulary words in the source language 22, and a dictionary database of vocabulary words in the linked alternative language 24. A database of instructions 26, which indexes relationships between strings of digitized data in the linked alternative language and strings of digitized data in the source language is also stored in the storage system 18. The storage system 18 also contains a database of translation rules 28, where all of the translation rules in this database provide a lossless translation between the alternative linked language and the source language.

The CPU 12 acts as an automated means for translating in both directions between the linked alternative language and the source language by applying the translation rules and the two dictionary databases 22, 24.

In this embodiment, the storage system 18 also stores a database of interaction rules 36 and an alternative set of translation rules 38.

The data entry device 14 could be a keyboard, or a microphone or a mouse pad, or a connection to the Internet or any of the input devices previously mentioned or any computer input device or a combination of these devices. The output device 16 could be a display or a printer or a microphone, or any of the output devices previously mentioned or any computer output device or a combination of these devices.

SUMMARY

This invention involves a system, a method and an apparatus to improve international and other communication and to provide easier access to digitized data by using "linked alternative languages" to serve predetermined communicative goals. A linked alternative language (LAL) is generated from a source language; and, although it may take a quite distinctive outward form when compared to its source language (SL), it has been carefully designed to retain full bidirectional machine translation (MT) equivalence to the source language. The invention is not limited to the exact embodiments and design solutions mentioned as "examples".

Technologies of artificial intelligence and computational linguistics are applied in the MT process between SL and LAL only within those strategies that have been specifically chosen because they preserve full bi-directionality of translation and serve the predetermined communicative goals. All processes in the translation stream that are based on probabilities and assumptions are carefully avoided so that translation will be lossless. No prior invention systematically exploits this linkage methodology.

Communicative goals that can be served by this means include: access to data by linguistic means that are easier to learn than the source language, greater semantic clarity of LAL texts compared to those in the SL, reduction of possibly dangerous ambiguities, increased speed of text input (digitalization), greatly improved voice-recognition capabilities, mnemonic systems for computer applications, improved human to machine interface, increased neutrality of format between competing linguistic cultures, error-free text to voice capabilities, and a broad spectrum of other improvements in human communication systems.

Since language impacts on virtually all features of human activity, the implications of optimized technologies for linguistic communication are great. The "text to voice" feature alone means, for example, that any computer screen displaying a text in the LAL can be equipped with a feature that will pronounce that text in the LAL without the considerable margin of error inevitably experienced when converting a language such as English from text to voice. Neural network methodologies can be used to generate the spoken standard of the LAL.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The principles of the present invention specifically contemplate all such implementations and combinations. The invention disclosed herein may be practiced without any element which is not specifically disclosed herein.

What is claimed is:

1. An apparatus for providing bidirectional translations of a text of data between a linked alternative language and a source language, wherein the source language is a natural language and the linked alternative language is designed to map fully to the source language in terms of structure and strings of digitized data, comprising:

(a) means for entering the text of data;
   (b) a dictionary database of a vocabulary of words in the source language stored as records, with collocated information on the usage pattern of each word and on frequency of use of each word in the source language;
   (c) a dictionary database for a vocabulary of words in the linked alternative language stored as records;
   (d) means for storing the dictionary database of the vocabulary of words in the source language and the dictionary database of the vocabulary of words in the linked alternative language in a central concordance, the records within the dictionary databases taking the form of strings of digitized data in the linked alternative language and in the source language;
   (e) a database of instructions which index relationships between the strings of digitized data in the linked alternative language and the strings of digitized data in the source language;
   (f) a database of translation rules, wherein all of the translation rules in the database of translation rules provide a lossless translation between the linked alternative language and the source language wherein the linked alternative language is designed to map fully to the source language in terms of structure and strings of digitized data;
   (g) automated means for translating, in both directions, between the linked alternative language and the source language, wherein the means for translating applies to the text the set of translation rules and the two dictionary databases stored within the central concordance; and
   (h) means for outputting translated text.

2. The apparatus, as recited in claim 1, further comprising:

(a) a database of interaction rules;
   (b) means for applying interaction rules to the text of data to create queries;
   (c) means for outputting queries to the user;
   (d) means for inputting answers to queries;
   (e) at least one alternative set of translation rules; and
   (f) means for utilizing the answers to queries in order to choose between sets of translation rules for translating the text of data.

3. The apparatus, as recited in claim 2, wherein one of the queries asks if a reduced vocabulary strategy is to be implemented, and further comprising:

(a) at least one reduced vocabulary database, comprising a limited list of words, the reduced vocabulary database further comprising:
      (1) paired sets of words where each of the paired set of words has a first word and a second word whereby the first word is a word in the source language and the second word is a word in the reduced vocabulary, wherein the number of different first words is greater than the number of different second words;
      (2) paired sets of strings of alphanumeric characters representing multi-word portions of texts of data, where each of the paired set of strings has a first string and a second string whereby the first string is a string of words in the source language and the second word is a string in the reduced vocabulary;
      (3) sets of rules relating to sentence structure and syntax as a means for the automatic implementation of the reduced vocabulary strategy by the apparatus;
      (4) sets of suggestions and interaction rules for the further implementation of the reduced vocabulary strategy by the user;
   (b) a reduced vocabulary database;
   (c) means for linking the reduced vocabulary database to the central concordance;
   (d) a database of instructions on relationships between the strings of digitized data;
   (e) a database of sets of additional translation rules for the specific implementation of the reduced vocabulary strategy, wherein the translation rules allow for translation between the source language, the linked alternative language, a reduced vocabulary version of the source language, and a reduced vocabulary version of the linked alternative language; and
   (f) means for applying the reduced vocabulary database, the database of instructions on relationships, and the database of sets of additional translation rules to the text of data.

4. The apparatus, as recited in claim 2, further comprising a means for translating between a source language and a target language by using a linked alternative language mapped to the source language as a pivot language for translation.

5. The apparatus, as recited in claim 2, further comprising a means for translating between a source language and a target language by using a linked alternative language mapped to a second source language as a pivot language for translation.

6. The apparatus, as recited in claim 2, further comprising a means for translating between any of a plurality of languages by creating a linked alternative language for each of the plurality of languages and then translating between those linked alternative languages.

7. The apparatus, as recited in claim 1, further comprising:

(a) a database comprising a list of semantic concepts and categories;
   (b) a dictionary database in thesaurus form, organized in accordance with the list of semantic concepts and categories;
   (c) a database of annotation rules for tagging words and strings in the source language in order to describe their range of grammatical usage in the source language, and to delimit their semantic content in accordance with the list of semantic concepts and categories;
   (d) means for storing within the central concordance the words and strings in the linked alternative language which map to the annotated words and strings in the source language;
   (e) means for indexing the words and strings comprising the dictionary database to entries in the central concordance; and
   (f) means for searching for and locating strings of digitized data listed in the central concordance in terms of the basic concepts and categories in the dictionary database.

8. The apparatus, as recited in claim 1, wherein the means for entering the text of data, comprises:

(a) means for inputting voice as audio data;

(b) means for converting the audio data into the form of a digitized audio file; and (c) means for storing the digitized audio file.

9. The apparatus, as recited in claim 1, wherein the means for entering the text of data comprises a means for downloading the text from an Internet connection.

10. The apparatus, as recited in claim 9, wherein the means for outputting translated text comprises a means for outputting the translations within an Internet application.

11. The apparatus, as recited in claim 1, further comprising:

(a) an interface to a controllable machine;

(b) a database of controller vocabulary in the linked alternative language to provide means for directing the controllable machine in a repertoire of manners in which the controllable machine is controllable, the database of the controller comprising:

(1) a set of pronounceable words covering the functions of the controllable machine; and (2) markers for the set of pronounceable words which renders the set of pronounceable fully distinguishable, in both written and audio form, from words in the linked alternative language which do not convey instructions to controllable machines.

12. The apparatus, as recited in claim 1, wherein the means for entering comprises a means for entering the symbols of mathematics and symbolic logic, and strings of the symbols, including mathematical formulae, and further comprising:

(a) a logico-mathematical system database, forming a subsidiary part of the dictionary database for the vocabulary of the linked alternative language and including words in the linked alternative language chosen to equate to the symbols of mathematics and symbolic logic, and including words in the linked alternative language chosen to equate to descriptive strings of words capable of being inserted into sentences in the source language and expressing logical and mathematical relationships;

(b) means for storing the symbols and strings of symbols;

(c) means for indexing the symbols and strings of symbols within the central concordance; and (d) means for translating the symbols and strings of symbols into pronounceable strings of text in a linked alternative language by means of the logico-mathematical system database.

13. The apparatus, as recited in claim 1, further comprising, (a) a mnemonic system database, forming a subsidiary part of the dictionary database for the vocabulary of the linked alternative language and including those words that relate to numbers and colors, so devised as to associate each arabic numeral with a specific set of letters of the alphabet used by the linked alternative language, and through the specific letters, to associate each arabic numeral with the words in the linked alternative language which designate the numbers and the basic colors;

(b) means for linking the mnemonic system database to the central concordance; and (c) means for using the mnemonic system database in the translation process.

14. The apparatus as recited in claim 13, further comprising:

(a) a dictionary database of the most frequently occurring words in the source language and the linked alternative language;

(b) a database of stored abbreviations for a plurality of frequently appearing words in the source language and the linked alternative language, using the mnemonic system database to make abbreviations more readily memorized;

(c) a database of stored abbreviations for a plurality of frequently appearing affixes in the source language and the linked alternative language, using the mnemonic system database to make abbreviations more readily memorized;

(d) means for indexing the abbreviations to the central concordance;

(e) means for querying a user about desired personal adaptations of, and additions to, the abbreviation tables;

(f) means for storing and applying the results of user adaptations;

(g) means for entering abbreviated text into the apparatus; and (h) means for replacing the abbreviations with strings of digitized data linked to the abbreviations, whereby a standard readable text is outputted.

15. The apparatus, as recited in claim 13, wherein the means for entering comprises a color coded digital keyboard using the associations contained in the mnemonic system database to relate the alphanumeric keys to their positions on the keyboard and to fingers used for inputting.

16. The apparatus, as recited in claim 15, wherein the color coded keyboard comprises four horizontal rows of keys with twelve keys per horizontal row, wherein the keys in each row form twelve vertical columns, and wherein, (a) each of the vertical columns of the keyboard has the following color applied to the keys: white 1, gray 2, black 3, red 4, dark blue 5, yellow 6, purple 7, green 8, orange 9, sky-blue 10, pink 11, and tan 12;

(b) the home keys for the four fingers of the left hand and for the four fingers of the right hand are on the third row from top;

(c) the four fingers of the left hand have, in order, the letters U, T, M, and A as their home keys and these keys are associated, respectively, with the colors: white, gray, black, and red;

(d) the four fingers of the right hand have, in order, the letters I, E, N, and O as their home keys, and these keys are associated, respectively, with the colors: purple, green, orange, and light blue, and (e) other letters and numbers are placed on the keyboard with consideration given to their frequency and to mnemonic considerations.

17. The apparatus, as recited in claim 1, wherein the apparatus further provides means for translating, displaying, and outputting at least one page of communicative text by employing at least one template of such a text in a source language and its linked alternative language, the template delimiting the user's input to only such sentences, parts of sentences, words, and other strings of alphanumeric input which are in a sufficiently delimited context as to permit accurate translation of the input from the source language and the linked alternative language into an outputted text in at least one target language other than the source language and the linked alternative language, further comprising:

(a) a database of delimiting templates in the source language, stored in the form of alphanumeric strings of digitized data in the source language, comprising:

(1) delimiting templates for common communicative texts, including optional page formats and loci for the insertion of graphics;

(2) source language wording for entire sentences that appear within the context of the texts;

(3) source language wording for incomplete sentences within the context of the texts and with at least one indicated space into which at least one word from a delimited vocabulary may be inserted by the user; and (4) sets of words forming delimited vocabulary for optional insertion into the indicated space;

(b) a database of delimiting templates in the linked alternative language, structured identically to the database of delimiting templates for the source language so that each alphanumeric string listed in the database of delimiting templates for the linked alternative language is linked to an alphanumeric string in the database of delimiting templates for the source language;

(c) a database of delimiting templates in at least one target language other than the source language and the linked alternative language, structured identically to the database of delimiting templates for the linked alternative language so that each alphanumeric string listed in the database of delimiting templates for the target language may be linked to an alphanumeric string in the database of delimiting templates for the linked alternative language;

(d) means for storing all databases of delimiting templates within the apparatus in a central concordance, the records within the databases of delimiting templates taking the form of alphanumeric strings of digitized data indexed to those strings in the source language;

(e) a database of translation rules for delimiting templates, wherein all of the translation rules and the strings to which they apply allow for a fully accurate automated translation of the delimiting templates and their content among the languages to which they are linked, and wherein the translation rules determine which identified strings of digitized data should be substituted for which other strings of digitized data, and wherein the translation rules establish the order in which the strings of digitized data are to appear in the translated text;

(f) means for storing the database of translation rules for delimiting templates in the central concordance;

(g) an automatic means for translating a communicative text which has been generated within a delimiting template, between the linked alternative language and any target language that has been linked for translation within the constraints of the delimiting template, applying the set of template translation rules and the database of delimiting templates in order to produce a translation; and (h) means for applying the database of translation rules for delimiting templates to a delimiting template of text of data in order to produce a translation of the contents of the delimiting template between any two languages that have been linked within the constraints of the delimiting template.

18. A method for creating and employing a linked alternative language, wherein the linked alternative language is linked to a source language, and is designed to map fully to the source language in terms of structure and strings of digitized data, and wherein the linked alternative language is further designed to provide communicative features and efficiencies on the computer beyond those provided by the source language, the method comprising the steps of:

(a) establishing the parameters of the system, comprising the steps of:
  (1) choosing the source language;
  (2) targeting the user group which the linked alternative language is to serve; and
  (3) choosing the communicative features and the efficiencies on computer systems to be accommodated by the linked alternative language;

(b) entering into a computer a dictionary database of vocabulary in the source language, with collocated information on the usage pattern of each word and on its frequency of use in the source language;

(c) entering a framework for a dictionary database for the vocabulary of the linked alternative language, the framework being structured to map to the dictionary database of vocabulary in the source language;

(d) building the lexical records within the dictionary database for the vocabulary of the linked alternative language, comprising the steps of:
  (1) supplying the linked alternative language with a phonetic system generally reflecting the speech habits of its targeted speakers;
  (2) creating a graphemic system to provide a method for writing the linked alternative language in a manner which reflects its phonetic system and is compatible with computer capabilities;
  (3) using a computer to screen the morphemes tentatively chosen for the linked alternative language to assure that no two morphemes are so close phonetically as to lead to a serious confusion among the targeted speakers; and
  (4) supplying the linked alternative language with a system for establishing sentence structure which is capable of retaining full computer-implemented mapping to the source language;

(e) storing the two dictionary databases within the computer in a central concordance, the records within the dictionary databases taking the form of strings of digitized data in the linked alternative language and in the source language;

(f) entering a database of instructions which index the relationships between the strings of digitized data in the linked alternative language and the strings of digitized data in the source language;

(g) implementing, on a computer, a set of translation rules wherein there is fully accurate automated and lossless translation in both directions between the linked alternative language and the source language; and (h) outputting translated text.

19. The method, as recited in claim 18, further comprising the step of establishing pronunciation standards for the linked alternative language, comprising the steps of:

(a) inputting written texts of data to a computer employing a neural network system;

(b) inputting voice data to the computer in the form of a human generated audio stream representing the same texts of data;

(c) tasking the computer to convert the written texts of data phoneme by phoneme and word by word into an audio stream;

(d) repeatedly comparing the computer generated audio stream and the human generated audio stream by means of a neural network which is trained using the techniques of back propagation;

(e) applying, recursively, the above procedures; and (f) storing the network state when the difference between the computer generated audio stream and the human generated audio stream becomes negligible, and wherein the step of outputting, comprises the step of outputting in the linked alternative language in audio according to the pronunciation standards for the linked alternative language.

20. A method implemented on a computer for translating in both directions between a linked alternative language and a source language, wherein the linked alternative language is designed to map fully to the source language in terms of structure and strings of digitized data, comprising the steps of:

(a) entering a text of data into the computer system;

(b) dividing the text of data into sentences;

(c) consulting a central concordance, wherein the central concordance contains strings of digitized data, including spaces and punctuation marks, in the linked alternative language and in the source language, and instructions on relationships between the strings of digitized data;

(d) identifying within each sentence in the text of data those strings of digitized data, which appear in the central concordance, wherein the concordance contains strings of digitized data in the linked alternative language and the source language, and instructions on relationships between the strings of digitized data entering a database of instructions which index the relationships between the strings of digitized data in the linked alternative language and the strings of digitized data in the source language;

(e) implementing, on the computer, a set of translation rules wherein each of the translation rules allows for a filly accurate automated and lossless translation in both directions between the linked alternative language and the source language to the text, wherein the translation rules determine whether identified strings of digitized data should be substituted with related strings of digitized data in the concordance and wherein the translation rules establish the order in which the strings of digitized data are to appear in the translated text; and (f) outputting translated text.

21. The method according to claim 20, further comprising the steps of:

(a) adding a mnemonic system database, as a subsidiary part of the dictionary database for the vocabulary of the linked alternative language and which includes words that relate to numbers, days of the week, months, directions of the compass, and basic colors;

(b) supplying the mnemonic system database with morphemes, words, and longer digital strings in the linked alternative language vocabulary so formulated as to associate each arabic numeral with a specific set of letters of the alphabet used by the linked alternative language, and through the specific set of letters, to associate each arabic numeral with words in the linked alternative language which designate numbers, days of the week, months, directions of the compass, and basic colors;

(c) providing means for the user to input lists of items, numbers, dates, and other data to be entered into human memory; and (d) outputting to the user suggested mnemonic techniques, based on the mnemonic system database to aid in the retention of such data.

* * * * *

UNITED STATES PATENT AND TRADEMARK OFFICE
CERTIFICATE OF CORRECTION

PATENT NO.   : 6,275,789 B1
DATED        : August 14, 2001
INVENTOR(S)  : Leo Moser and Robert Moser It is certified that error appears in the above-identified patent and that said Letters Patent is hereby corrected as shown below:

Column 9,
Line 15, Table 3, line 310, after the phrase "to be found in the" delete "SLILAL" and replace with -- SL/LAL --
Line 20, Table 3, line 318, delete "SLILAL" and replace with -- SL /LAL --
Line 36, Table 3, line 330, delete "PRBPOSITIONAL" and replace with
-- PREPOSITIONAL --

Column 10,
Line 60, delete "Go and see are both shorter than anyone" and replace with and -- Go and see are both shorter than anyone." --

Column 11,
Line 45, delete "defmed" and replace with -- defined --

Column 13,
Line 19, Table 4, line 420, after the phrase "without applying", delete "M" and replace with
-- AI --
Line 25, Table 4, line 422, after the phrase "quantifying the resultant" delete "GMN" and replace with -- GA1N --
Line 40, Table 4, line 434, after the phrase "If the" delete "RBSULTS" and replace with
-- RESULTS --
Line 57, insert a space before the heading "REDUCED VOCABULARY SYSTEMS"

Column 14,
Line 22, Table 5, line 504, after the phrase "Strategy (VRS), using the" delete "37" and replace with -- " --
Line 32, Table 5, line 509, after the phrase "consulting the", delete "SLILAL" and replace with -- SL/LAL --
Line 45, Table 5, line 530, delete "vocabulary by" and replace with -- vocabulary--by --

Column 15,
Line 17, insert a space above the heading "OPTIONAL ENHANCEMENT"
Line 65, after the phrase, "action to", delete "BB" and replace with -- BE --

UNITED STATES PATENT AND TRADEMARK OFFICE
CERTIFICATE OF CORRECTION

PATENT NO. : 6,275,789 B1
DATED : August 14, 2001
INVENTOR(S) : Leo Moser and Robert Moser It is certified that error appears in the above-identified patent and that said Letters Patent is hereby corrected as shown below:

Column 16,
Table 6-continued, line 638 line 13, delete "636" and replace with -- 648 --
Table 6-continued, line 644, line 23, begin a new instruction line at "646" after "clarified" and then replace instruction line number "646" with -- 666 --
Table 6-continued, line 12, delete instruction numbers "638, 640, 642, 644" and replace with -- 658, 660, 662, 664 -- respectively
Table 6-continued, line 23 delete instruction line numbers "648,650,652" and replace with -- 668, 670, 672 -- respectively
Line 52, insert a space above the heading "TEXT ENHANCEMENT AND TRANSLATION TO THIRD LANGUAGES"

Column 17,
Line 51, insert a space above the heading "THE OPTIMIZING PROCESS"

Column 19,
Line 46, insert a space above the heading "OPTIMIZING BY VOCABULARY EXPANSION"

Column 20,
Line 51, insert a space above the heading "INFORMATION MANAGEMENT FEATURES"

Column 21,
Line 32, insert a space above heading "MNEMONIC FEATURES"

Column 22,
Line 65, insert a space above the heading "COMPLEXITIES IN STRING REPLACEMENT"

Column 23,
Line 40, insert a space above the heading "MULTIPLE EQUIVALENCY STRATEGIES"
Line 49, insert a space above the heading "FIRST PATTERN: TWO OR MORE DIFFERENT SL STRINGS ARE MAPPED TO THE SAME LAL STRING"

Column 24,
Line 45, insert a space above the heading "SECOND PATTERN: A SINGLE SL STRING IS MAPPED TO TWO OR MORE LAL STRINGS"

UNITED STATES PATENT AND TRADEMARK OFFICE
CERTIFICATE OF CORRECTION

PATENT NO.    : 6,275,789 B1
DATED         : August 14, 2001
INVENTOR(S)   : Leo Moser and Robert Moser It is certified that error appears in the above-identified patent and that said Letters Patent is hereby corrected as shown below:

Column 25,
Line 26, insert a space above the heading "THIRD PATTERN"
Line 31, insert a space above the heading "NON-AUTOMATIC MULTIPLE EQUIVALENCY STRATEGIES"

Column 26,
Table 10, line 5, insert a space above the heading "TRANSLATION PARADIGMS"
Table 10, line 24, delete the underline in the phrase "Paradigm: Sentence substitution"
Table 10, line 25, delete the space above the phrase "Example in SL: How do you do?"
Table 10, line 27, delete the underline in the phrase "Paradigm: Sentence Structure Insert (by use of AI.etc.)"
Table 10, line 27, insert a space the phrase "Paradigm: Sentence Structure Insert (by use of AI.etc.)"
Table 10, line 27, delete the space above the phrase "Example in SL: They said they knew."
Table 10, line 31, delete the underline in the phrase "Paradigm: Restructured Sentence (by use of AI.etc.)"
Table 10, line 31, insert a space above the phrase "Paradigm: Restructured Sentence (by use of AI.etc.)"
Table 10, line 32, delete the space above the phrase "Example in SL: Do we know them?"
Table 10, line 35, insert a space above the phrase "Phrase Level:)"
Table 10, line 36, delete the underline from the phrase "Paradigm: Phrasal substitution"
Table 10, line 36, delete the space above the phrase "Examples in SL: They went to and fro, the day before yesterday."
Table 10, line 40, insert a space above the phrase "Paradigm: Coined Phrase (logical functions):"
Table 10, line 40, delete the underline from the phrase "Paradigm: Coined Phrase (logical functions):"
Table 10, line 40, delete the space above the phrase "Example in SL: We will pay if-and-only if..."
Table 10, line 43, insert a space above the phrase "Font Capitalization Level:"
Table 10, line 45, delete the underline from the phrase "Paradigm: Subsequent capitalization dependent"
Table 10, line 45, delete the space above the phrase "Example in SL: The university was the University of Ohio"
Table 10, line 48, delete the underline in the phrase "Paradigm: Italic/Underline Dependent (for Emphasis)"
Table 10, line 48, delete the space above the phrase " Paradigm: Italic/Underline Dependent (for Emphasis)"
Table 10, line 49, delete the space above the phrase "Example in SL: They plan to come"
Table 10, line 49, after the phrase "Example in SL:", delete "plan" and replace with -- plan --
Table 10, line 51, insert a space above the phrase "Punctuation Level:"

UNITED STATES PATENT AND TRADEMARK OFFICE
CERTIFICATE OF CORRECTION

PATENT NO.    : 6,275,789 B1
DATED         : August 14, 2001
INVENTOR(S)   : Leo Moser and Robert Moser It is certified that error appears in the above-identified patent and that said Letters Patent is hereby corrected as shown below:

Column 26 (cont'd),
Table 10, line 52, delete the underline in the phrase "Paradigm: Nearby Punctuation Dependent)"
Table 10, line 54, delete the space above the phrase "Example in SL: Use soap and water, and a new bandage"
Table 10, line 56, insert a space above the phrase "Word Level:"
Table 10, line 57, delete the underline in the phrase "Paradigm: Simple Sequential:"
Table 10, line 58, delete the space above the phrase "Example in SL: They came rapidly:"
Table 10, line 61, delete the underline in the phrase "Paradigm: Transposition of Elements:"
Table 10, line 61, insert a space above the phrase "Paradigm: Transposition of Elements:"
Table 10, line 62, delete the space above the phrase "Example in SL: "They cannot understand.""
Table 10, line 64, delete the underline in the phrase "Paradigm: Merger of Words, Two SL words become one LAL word:"
Table 10, line 64, insert a space the phrase "Paradigm: Merger of Words: Two SL words become one LAL word:"
Table 10, line 64, delete the space below the phrase "Paradigm: Merger of Words: Two SL words become one LAL word:"

Column 27,
Table 10, line 65, delete the space above the phrase "Example in SL: Give me a banana or an apple"
Table 10-continued, line 5, delete the underline in the phrase "Paradigm: Semantic Fission: One SL word becomes two LAL words"
Table 10, line 6, delete the space above the phrase "Example in SL: They visited the newest park"
Table 10-continued, line 9, delete the underline in the phrase "Paradigm: Specification: (SL annotated by word tag.)".
Table 10-continued, line 9, insert a space above the phrase "Paradigm: Specification: (SL annotated by word tag.)"
Table 10-continued, line 12, insert a space above the phrase "Paradigm: Part-of-Speech-Clarification (Annotation by tag.)"
Table 10-continued, line 12, delete the underline in the phrase "Paradigm: Part-of-Speech-Clarification (Annotation by tag.)"
Table 10-continued, line 13, delete the space above the phrase "Example in SL: The crown is of gold"
Table 10-continued, line 16, insert a space above the phrase "Paradigm: Generalization (Word fusion)"
Table 10-continued, line 16, delete the underline in the phrase "Paradigm: Generalization (Word fusion)".

UNITED STATES PATENT AND TRADEMARK OFFICE
CERTIFICATE OF CORRECTION

PATENT NO.     : 6,275,789 B1
DATED          : August 14, 2001
INVENTOR(S)    : Leo Moser and Robert Moser It is certified that error appears in the above-identified patent and that said Letters Patent is hereby corrected as shown below:

Column 26 (cont'd),
Table 10-continued, line 17, delete the space above the phrase "Example in SL: The student must finish her/his paper."

Column 29,
Line 36, delete "defming" and insert -- defining --

Column 31,
Line 16, within item "f." delete "obscene." and insert -- obscene? --

Column 32,
Line 24, delete "finction" and replace with -- function --

Column 39,
Line 15, delete "symbolic logic, It" and replace with -- symbolic logic. It --

Column 53,
Line 35, delete "filly" and replace with -- fully --

Column 34,
Line 36, insert a space above the title "TEXT ENHANCEMENT"

Column 35,
Line 16, insert a space above the title "COMPUTER-STANDARDS FOR THE VOICE OUTPUT SYSTEM"
Line 55, insert a space above the title "NOTE ON TRANSLATION OF VOICE DATA"

Column 36,
Line 29, insert a space above the title "VOICE GUIDANCE SYSTEMS"

Column 37,
Line 45, insert a space above the title "MULTILINGUAL TEMPLATES"

Column 39,
Line 5, insert a space above the title "LOGICO- MATHEMATICAL FEATURES"

Column 40,
Line 17, insert a space above the title "OPTIMIZATION FOR GLOBAL ACCESS TO DATA"

UNITED STATES PATENT AND TRADEMARK OFFICE
CERTIFICATE OF CORRECTION

PATENT NO. : 6,275,789 B1
DATED : August 14, 2001
INVENTOR(S) : Leo Moser and Robert Moser It is certified that error appears in the above-identified patent and that said Letters Patent is hereby corrected as shown below:

Column 41,
Line 50, insert a space above the title "THE COMPREHENSIVE TEXT TRANSLATOR"

Column 42,
Line 61, insert a space above the title "DESIGN OF THE INTERNET TRANSLATOR"

Column 43,
Line 55, insert a space above the title "IMPLEMENTATION ON THE INTERNET"

Column 45,
Line 48, insert a space above the title "TRANSLATION DEVICE"

Signed and Sealed this

Twenty-second Day of March, 2005

JON W. DUDAS
*Director of the United States Patent and Trademark Office*